(12) United States Patent
Silverman et al.

(10) Patent No.: US 12,492,164 B2
(45) Date of Patent: Dec. 9, 2025

(54) FLUORINE SUBSTITUTED CYCLOHEXENE ANALOGUES OF GAMMA-AMINOBUTYRIC ACID (GABA)

(71) Applicant: Northwestern University, Evanston, IL (US)

(72) Inventors: Richard B. Silverman, Winnetka, IL (US); Wei Zhu, Evanston, IL (US)

(73) Assignee: Northwestern University, Evanston, IL (US)

( * ) Notice: Subject to any disclaimer, the term of this patent is extended or adjusted under 35 U.S.C. 154(b) by 760 days.

(21) Appl. No.: 17/771,721

(22) PCT Filed: Oct. 26, 2020

(86) PCT No.: PCT/US2020/057409
§ 371 (c)(1),
(2) Date: Apr. 25, 2022

(87) PCT Pub. No.: WO2021/081523
PCT Pub. Date: Apr. 29, 2021

(65) Prior Publication Data
US 2023/0107230 A1    Apr. 6, 2023

Related U.S. Application Data

(60) Provisional application No. 62/926,120, filed on Oct. 25, 2019.

(51) Int. Cl.
C07C 229/48    (2006.01)
A61K 31/196    (2006.01)

(52) U.S. Cl.
CPC ........ C07C 229/48 (2013.01); *C07C 2601/16* (2017.05)

(58) Field of Classification Search
CPC .... C07C 229/48; A61K 31/196; A61K 31/197
See application file for complete search history.

(56) References Cited

U.S. PATENT DOCUMENTS

| | | | |
|---|---|---|---|
| 5,622,916 | A | 4/1997 | Kunisch et al. |
| 6,998,118 | B2 | 2/2006 | Kaspar et al. |
| 7,101,540 | B2 | 9/2006 | Kaspar et al. |
| 7,122,684 | B2 | 10/2006 | Brown et al. |
| 7,674,455 | B2 | 3/2010 | Kaspar et al. |
| 2003/0118552 | A1 | 6/2003 | Kaspar et al. |
| 2003/0118556 | A1 | 6/2003 | Kaspar et al. |

OTHER PUBLICATIONS

Sayiner, M.; Golabi, P.; Younossi, Z. M. Disease Burden of Hepatocellular Carcinoma: A Global Perspective. Dig. Dis. Sci. 2019, 64, 910-917.
Beaulieu, F.; Beauregard, L. P.; Courchesne, G.; Couturier, M.; LaFlamme, F.; L'Heureux, A. Aminodifluorosulfinium Tetrafluoroborate Salts as Stable and Crystalline Deoxofluorinating Reagents. Org. Lett. 2009, 11, 5050-5053.
Bey, P.; Gerhart, F.; Jung, M. Synthesis of (E)-4-Amino-2,5-Hexadienoic Acid and (E)-4-Amino-5-Fluoro-2-Pentenoic Acid—Irreversible Inhibitors of 4-Aminobutyrate-2-Oxoglutarate Aminotransferase. J. Org. Chem. 1986, 51, 2835-2838.
Qiu, J.; Silverman, R. B. A New Class of Conformationally Rigid Analogues of 4-amino-5-Halopentanoic Acids, Potent Inactivators of gamma-Aminobutyric Acid Aminotransferase. J. Med. Chem. 2000, 43, 706-720.
Brosnan, M. E.; Brosnan, J. T., Hepatic Glutamate Metabolism: a Tale of 2 Hepatocytes. Am. J. Clin. Nutr. 2009, 90, 857S-861S.
Cadoret, A.; Ovejero, C.; Terris, B.; Souil, E.; Levy, L.; Lamers, W. H.; Kitajewski, J.; Kahn, A.; Perret, C. New Targets of beta-Catenin Signaling in the Liver are Involved in the Glutamine Metabolism. Oncogene 2002, 21, 8293-8301.
Sherman, M.; Bruix, J.; Porayko, M.; Tran, T.; Comm, A. P. G. Screening for hepatocellular carcinoma: The Rationale for the American Association for the Study of Liver Diseases Recommendations. Hepatology 2012, 56, 793-796.
Churchich, J. E.; Moses, U., 4-Aminobutyrate Aminotransferase—the Presence of Nonequivalent Binding-Sites. J. Biol. Chem. 1981, 256, 1101-1104.
Colnot, S.; Decaens, T.; Niwa-Kawakita, M.; Godard, C.; Hamard, G.; Kahn, A.; Giovannini, M.; Perret, C. Liver-targeted Disruption of Apc in Mice Activates beta-Catenin Signaling and Leads to Hepatocellular Carcinomas. Proc. Natl. Acad. Sci. U. S. A. 2004, 101, 17216-17221.
De Ingeniis, J.; Ratnikov, B.; Richardson, A. D.; Scott, D. A.; Aza-Blanc, P.; De, S. K.; Kazanov, M.; Pellecchia, M.; Ronai, Z.; Osterman, A. L.; Smith, J. W. Functional Specialization in Proline Biosynthesis of Melanoma. PLoS One 2012, 7, e45190.
De Lope, C. R.; Tremosini, S.; Forner, A.; Reig, M.; Bruix, J. Management of HCC. J. Hepatol. 2012, 56, S75-S87.
De Rosamel, L.; Blanc, J. F. Emerging Tyrosine Kinase Inhibitors for the Treatment of Hepatocellular Carcinoma. Expert Opin. Emerging Drugs 2017, 22, 175-190.
Egli, M.; Sarkhel, S. Lone pair-aromatic Interactions: To Stabilize or not to Stabilize. Acc. Chem. Res. 2007, 40, 197-205.
Phang, J. M.; Liu, W.; Hancock, C.; Christian, K. J. The Proline Regulatory Axis and Cancer. Front. Oncol. 2012, 2, 60.
Faraci, W. S.; Walsh, C. T. Mechanism of Inactivation of Alanine Racemase by β, β, β-Trifluoroalanine. Biochemistry 1989, 28, 431-437.
Phang, J. M.; Donald, S. P.; Pandhare, J.; Liu, Y. M. The Metabolism of Proline, a Stress Substrate, Modulates Carcinogenic Pathways. Amino Acids 2008, 35, 681-690.

(Continued)

*Primary Examiner* — Sikarl A Witherspoon
(74) *Attorney, Agent, or Firm* — Quarles & Brady LLP

(57) ABSTRACT

Disclosed are amino, fluoro-substituted cyclohexene carboxylic acid compounds. The disclosed compounds and compositions thereof may be utilized in methods for modulating ornithine aminotransferase (OAT) activity, including methods for treating diseases or disorders associated with OAT activity or expression such as cell proliferative diseases and disorders.

24 Claims, 10 Drawing Sheets

(56) References Cited

OTHER PUBLICATIONS

Ginguay, A.; Cynober, L.; Curis, E.; Nicolis, I. Ornithine Aminotransferase, an Important Glutamate-Metabolizing Enzyme at the Crossroads of Multiple Metabolic Pathways. Biology (Basel, Switz.) 2017, 6, 18.
Phang, J. M.; Liu, W.; Zabirnyk, O. Proline Metabolism and Microenvironmental Stress. Annu. Rev. Nutr. 2010, 30, 441-463.
Heiden, M. G. V.; Cantley, L. C.; Thompson, C. B. Understanding the Warburg Effect: The Metabolic Requirements of Cell Proliferation. Science 2009, 324, 1029-1033.
Herzfeld, A.; Knox, W. E. The Properties, Developmental Formation, and Estrogen Induction of Ornithine Aminotransferase in Rat Tissues. J. Biol. Chem. 1968, 243, 3327-3332.
Jones, G.; Willett, P.; Glen, R. C.; Leach, A. R.; Taylor, R. Development and Validation of a Genetic Algorithm for Flexible Docking. J. Mol. Biol. 1997, 267, 727-748.
Juncosa, J. I.; Lee, H.; Silverman, R. B., Two Continuous Coupled Assays for Ornithine-delta-aminotransferase. Anal. Biochem. 2013, 440, 145-149.
Juncosa, J. I.; Takaya, K.; Le, H. V.; Moschitto, M. J.; Weerawarna, P. M.; Mascarenhas, R.; Liu, D. L.; Dewey, S. L.; Silverman, R. B., Design and Mechanism of (S)-3-Amino-4-(difluoromethylenyl)cyclopent-1-ene-1-carboxylic Acid, a Highly Potent gamma-Aminobutyric Acid Aminotransferase Inactivator for the Treatment of Addiction. J. Am. Chem. Soc. 2018, 140, 2151-2164.
Leathers, J. S.; Balderramo, D.; Prieto, J.; Diehl, F.; Gonzalez-Ballerga, E.; Ferreiro, M. R.; Carrera, E.; Barreyro, F.; Diaz-Ferrer, J.; Singh, D.; Mattos, A. Z.; Carrilho, F.; Debes, J. D. Sorafenib for Treatment of Hepatocellular Carcinoma a Survival Analysis From the South American Liver Research Network. J. Clin. Gastroenterol. 2019, 53, 464-469.
Lee, H.; Doud, E. H.; Wu, R.; Sanishvili, R.; Juncosa, J. I.; Liu, D. L.; Kelleher, N. L.; Silverman, R. B. Mechanism of Inactivation of gamma-Aminobutyric Acid Aminotransferase by (1S,3S)-3-Amino-4-difluoromethylene-1-cyclopentanoic Acid (CPP-115). J. Am. Chem. Soc. 2015, 137, 2628-2640.
Lee, H.; Juncosa, J. I.; Silverman, R. B. Ornithine Aminotransferase versus GABA Aminotransferase: Implications for the Design of New Anticancer Drugs. Med. Res. Rev. 2015, 35, 286-305.
Liebschner, D.; Afonine, P. V.; Moriarty, N. W.; Poon, B. K.; Sobolev, O. V.; Terwilliger, T. C.; Adams, P. D. Polder Maps: Improving OMIT Maps by Excluding Bulk Solvent. Acta. Crystallogr. D 2017, 73, 148-157.
Liu Wei; Le Anne; Hancock Chad; Lane Andrew N; Dang Chi V; Fan Teresa W-M; Phang James M. Reprogramming of proline and glutamine metabolism contributes to the proliferative and metabolic responses regulated by oncogenic transcription factor c MYC. Proc. Natl. Acad. Sci. USA 2012, 109(23), 8983-8988.
Liu, Y. F.; Wu, L.; Li, K.; Liu, F. R.; Wang, L.; Zhang, D. L.; Zhou, J.; Ma, X.; Wang, S. Y.; Yang, S. Y. Ornithine Aminotransferase Promoted the Proliferation and Metastasis of Non-small cell Lung Cancer via Upregulation of miR-21. J. Cell. Physiol. 2019, 234, 12828-12838.
Lucero OM, Dawson DW, Moon RT, et al. A re-evaluation of the "oncogenic" nature of Wnt/beta-catenin signaling in melanoma and other cancers. Curr Oncol Rep 2010, 12, 314-318.
Markova, M.; Peneff, C.; Hewlins, M. J. E.; Schirmer, T.; John, R. A. Determinants of Substrate Specificity in omega-Aminotransferases. J. Biol. Chem. 2005, 280, 36409-36416.
Mascarenhas, R.; Le, H. V.; Clevenger, K. D.; Lehrer, H. J.; Ringe, D.; Kelleher, N. L.; Silverman, R. B.; Liu, D. Selective Targeting by a Mechanism-Based Inactivator against Pyridoxal 5'-Phosphate-Dependent Enzymes: Mechanisms of Inactivation and Alternative Turnover. Biochemistry 2017, 56, 4951-4961.
Mehta, P. K.; Hale, T. I.; Christen, P. Aminotransferases—Demonstration of Homology and Division into Evolutionary Subgroups. Eur. J. Biochem. 1993, 214, 549-561.
Metro, T. X.; Duthion, B.; Pardo, D. G.; Cossy, J. Rearrangement of beta-Amino Alcohols via Aziridiniums: a review. Chem. Soc. Rev. 2010, 39, 89-102.
Milgrom, D. P.; Maluccio, M. A.; Koniaris, L. G. Management of Hepatocellular Carcinoma (HCC). Curr. Surg. Rep. 2016, 4, 1-8.
Montioli, R.; Paiardini, A.; Giardina, G.; Zanzoni, S.; Cutruzzola, F.; Cellini, B.; Voltattorni, C. B. R180T Variant of delta-Ornithine Aminotransferase Associated with Gyrate Atrophy: Biochemical, Computational, X-ray and NMR Studies Provide Insight into its Catalytic Features. FEBS J. 2019, 286, 2787-2798.
Phang, J. M.; Liu, W.; Hancock, C. N.; Fischer, J. W. Proline Metabolism and Cancer: Emerging Links to Glutamine and Collagen. Curr. Opin. Clin. Nutr. Metab. Care 2015, 18, 71-77.
Moschitto, M. J.; Doubleday, P. F.; Catlin, D. S.; Kelleher, N. L.; Liu, D.; Silverman, R. B. Mechanism of Inactivation of Ornithine Aminotransferase by (1S,3S)-3-Amino-4-(hexafluoropropan-2-ylidenyl)cyclopentane-1-carboxylic Acid. J. Am. Chem. Soc. 2019, 141, 10711-10721.
Pan, Y.; Gerasimov, M. R.; Kvist, T.; Wellendorph, P.; Madsen, K. K.; Pera, E.; Lee, H.; Schousboe, A.; Chebib, M.; Brauner-Osborne, H.; Craft, C. M.; Brodie, J. D.; Schiffer, W. K.; Dewey, S. L.; Miller, S. R.; Silverman, R. B. (1S,3S)-3-Amino-4-difluoromethylenyl-1-cyclopentanoic Acid (CPP-115), a Potent gamma-Aminobutyric Acid Aminotransferase Inactivator for the Treatment of Cocaine Addiction. J. Med. Chem. 2012, 55, 357-366.
Pan, Y.; Qiu, J.; Silverman, R. B. Design, Synthesis, and Biological Activity of a Difluoro-substituted, Conformationally Rigid Vigabatrin Analogue as a Potent gamma-Aminobutyric Acid Aminotransferase Inhibitor. J. Med. Chem. 2003, 46, 5292-5293.
Personeni, N.; Rimassa, L. Hepatocellular Carcinoma: A Global Disease in Need of Individualized Treatment Strategies. J. Oncol. Pract. 2017, 13, 368-370.
Wang Z et al: "Syntheses and evaluation of fluorinated conformationally restricted analogues of GABA as potential inhibitors of GABA aminotransferase", Bioorganic & Medicinal Chemistry, vol. 14, No. 7, Apr. 1, 2006 (Apr. 1, 2006), pp. 2242-2252.
Silverman, R. B. Design and Mechanism of GABA Aminotransferase Inactivators. Treatments for Epilepsies and Addictions. Chem. Rev. 2018, 118, 4037-4070.
Silverman, R. B. Mechanism-Based Enzyme Inactivators. Methods Enzymol. 1995, 249, 240-283.
Storici, P.; Capitani, G.; Muller, R.; Schirmer, T.; Jansonius, J. N. Crystal Structure of Human Ornithine Aminotransferase Complexed with the Highly Specific and Potent Inhibitor 5-Fluoromethylornithine. J. Mol. Biol. 1999, 285, 297-309.
Storici, P.; Qiu, J.; Schirmer, T.; Silverman, R. B. Mechanistic crystallography. Mechanism of inactivation of gamma-Aminobutyric Acid Aminotransferase by (1R,3S,4S)-3-Amino-4-fluorocyclopentane-1-carboxylic Acid as Elucidated by Crystallography. Biochemistry 2004, 43, 14057-14063.
Tang, L.; Zeng, J.; Geng, P. Y.; Fang, C. N.; Wang, Y.; Sun, M. J.; Wang, C. S.; Wang, J.; Yin, P. Y.; Hu, C. X.; Guo, L.; Yu, J. E.; Gao, P.; Li, E. Y.; Zhuang, Z. P.; Xu, G. W.; Liu, Y. Global Metabolic Profiling Identifies a Pivotal Role of Proline and Hydroxyproline Metabolism in Supporting Hypoxic Response in Hepatocellular Carcinoma. Clin. Cancer Res. 2018, 24, 474-485.
Tong, Xuemei; Zhao, Fangping; Thompson, Craig B. The molecular determinants of de novo nucleotide biosynthesis in cancer cells. Curr. Opin. Genet. Devel. 2009, 19(1), 32-37.
Wang, X.; Ma, M. L.; Reddy, A. G. K.; Hu, W. H. An Efficient Stereoselective Synthesis of Six Stereoisomers of 3, 4-diaminocyclohexane carboxamide as Key Intermediates for the Synthesis of Factor Xa inhibitors. Tetrahedron 2017, 73, 1381-1388.
Wang, Z. Y.; Yuan, H.; Nikolic, D.; Van Breemen, R. B.; Silverman, R. B. (±)-(1S, 2R, 5S)-5-amino-2-fluorocyclohex-3-enecarboxylic acid. A Potent GABA Aminotransferase Inactivator that Irreversibly Inhibits via an Elimination- aromatization pathway. Biochemistry 2006, 45, 14513-14522.
Yang, J. D.; Roberts, L. R. Hepatocellular carcinoma: a global view. Nat. Rev. Gastroenterol. Hepatol. 2010, 7, 448-458.
Zhu, Wei et al. A Remarkable Difference That One Fluorine Atom Confers on the Mechanisms of Inactivation of Human Ornithine

(56) References Cited

OTHER PUBLICATIONS

Aminotransferase by Two Cyclohexene Analogues of γ-Aminobutyric Acid. J.Am.Chem.Soc. vol. 142,10: 4892-4903, Mar. 1, 2020.
Zigmond, E.; Ya'acov, A. B.; Lee, H.; Lichtenstein, Y.; Shalev, Z.; Smith, Y.; Zolotarov, L.; Ziv, E.; Kalman, R.; Le, H. V.; Lu, H.; Silverman, R. B.; Ilan, Y. Suppression of Hepatocellular Carcinoma by Inhibition of Overexpressed Ornithine Aminotransferase. ACS Med. Chem. Lett. 2015, 6, 840-844.
PCT International Search Report and Written Opinion, PCT/US2020/057409, Feb. 15, 2021, 7 pages.

FLUORINE SUBSTITUTED CYCLOHEXENE ANALOGUES OF GAMMA-AMINOBUTYRIC ACID (GABA)

CROSS-REFERENCE TO RELATED PATENT APPLICATIONS

The present application claims the benefit of priority under 35 U.S.C. § 119(e) to U.S. Provisional Application No. 62/926,120, filed on Oct. 25, 2019, the content of which is incorporated herein by reference in its entirety.

STATEMENT REGARDING FEDERALLY SPONSORED RESEARCH OR DEVELOPMENT

This invention was made with government support under DA030604 awarded by the National Institutes of Health. The government has certain rights in the invention.

BACKGROUND

Ornithine aminotransferase (OAT) is a pyridoxal 5'-phosphate (PLP)-dependent enzyme[1], which is found in the mitochondrial matrix of most human and animal tissues.[2] OAT catalyzes the conversion of ornithine to Δ1-pyrroline-5-carboxylate (P5C) in the first-half reaction and the conversion of α-ketoglutarate (α-KG) to glutamate in the second-half reaction.[3] Glutamate could be ether degraded back to α-KG by glutamate dehydrogenase[4] (GLUD) or converted to P5C by pyrroline-5-carboxylate synthase[5] (P5CS); P5C generated via ether OAT or P5CS pathways could be further converted to proline mediated by pyrroline-5-carboxylate reductase (PYCR).[6-7] Since proline is usually deposited and stored in the collagen instead of a free amino acid pool,[7-8] the activity of OAT is positively correlated with proline and collagen levels.[9] Collagen is the main component of extracellular matrix (ECM)[10], and changes in the deposition or degradation of collagen can lead to the loss of ECM homeostasis. In past years, dysregulation of ECM dynamics and chemical cues presented by the ECM have been recognized as key drivers for both development and cancer progression.[11] Besides, it is increasingly clear that proline metabolism plays an important role in metabolic reprogramming in cancer.[12-13] Enzymes of proline synthesis were markedly upregulated by two well-recognized oncogenes, c-myc and phosphoinositide 3-kinase (PI3K),[14] leading to the upregulated synthesis of P5C as a central intermediate.[15] The transamination of ornithine by OAT to form P5C is an important pathway between proline metabolism and urea cycle. OAT is found to be strongly activated in liver tumor tissue from PK/c-myc transgenic mice.[16] In hepatocellular carcinoma (HCC) cells, the overexpression of OAT gene is induced by the inappropriate activation of the Wnt/β-catenin pathway.[16-17] The closely-related proline metabolic pathway is activated by the hypoxic microenvironment in HCC, characterized with accumulation of hydroxyproline that promotes tumor progression and sorafenib resistance.[18] The selective inhibition of OAT has been shown to effectively inhibit in vivo HCC tumor growth.[19] Recently, upregulation of OAT was found in non-small cell lung cancer (NSCLC) cells, which contributes to the promotion of the proliferation, invasion, and migration, the inhibition of the apoptosis, and the change of the cell cycle.[20] Furthermore, the knockdown of OAT inhibited the in vitro proliferation of NSCLC cell and suppressed the in vivo tumor growth in a lung cancer xenograft model.[20] Specific OAT knockdown blocks cell division and causes cell death in human cervical carcinoma and osteosarcoma cells.[21] Thus, selective inhibition of OAT could serve as a potential therapeutic strategy for cancer treatment.

SUMMARY

Disclosed are compounds, compositions and related methods of use for the selective inhibition of ornithine aminotransferase. The disclosed compounds, compositions, and methods can be utilized to treat diseases and disorders associated with ornithine aminotransferase activity.

The disclosed compounds may be described as substituted cyclohexene compounds. In particular, the disclosed compounds may be described as amino, fluoro-substituted cyclohexene carboxylic acid compounds. The disclosed compounds and compositions thereof may be utilized in methods for modulating ornithine aminotransferase (OAT) activity, including methods for treating diseases or disorders associated with OAT activity or expression such as cell proliferative diseases and disorders.

The disclosed compounds may be directed to a compound of the following formula or a dissociated form, a non-protonated form, a zwitterion form, or a salt thereof:

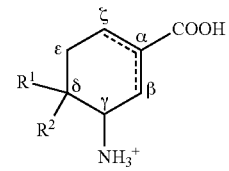

wherein a double bond is present between the α and ζ carbons or a double bond is present between the α and β carbons, and the compound has a formula:

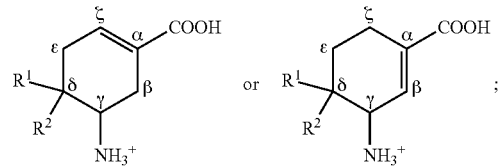

wherein each of $R^1$ and $R^2$ is independently selected from H or a leaving group (e.g., a halide such as F, Cl, Br, and I), providing at least one of $R^1$ and $R^2$ is not H.

In some embodiments, the disclosed compounds may be directed to a compound of the following formula or a dissociated form, a non-protonated form, a zwitterion form, or a salt thereof:

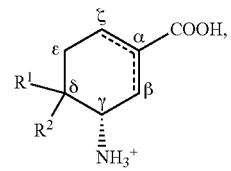

wherein a double bond is present between the α and ζ carbons or between the α and β carbons, wherein each of $R^1$ and $R^2$ is independently selected from H or a leaving group (e.g., a halide such as F, Cl, Br, and I), providing at least one of $R^1$ and $R^2$ is not H.

In certain embodiments, the compound is a compound of the following formula or a dissociated form, a non-protonated form, a zwitterion form, or a salt thereof:

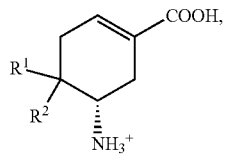

wherein each of $R^1$ and $R^2$ is independently selected from H and F, provided at least one of $R^1$ and $R^2$ is F, or a salt of such compound.

In certain embodiments, the compound is a compound of the following formula or a dissociated form, a non-protonated form, a zwitterion form, or a salt thereof:

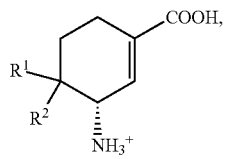

wherein each of $R^1$ and $R^2$ is independently selected from H and F, provided at least one of $R^1$ and $R^2$ is F, or a salt of such compound.

As indicated, the disclosed compounds may be protonated, for example to form an ammonium moiety, optionally where the compound is present as a salt. The disclosed compounds also may be non-protonated and/or dissociated, for example, where the carboxylic acid moiety is dissociated to from a carboxylate moiety, optionally where the compound is present as a salt. The disclosed compounds may be in zwitterionic form where the compound comprises a protonated ammonium moiety and a dissociated carboxylate moiety, optionally where the compound is present as a salt.

The disclosed compounds and compositions may be utilized in methods for modulating ornithine aminotransferase (OAT) activity. Such methods can comprise providing a compound as disclosed herein, such as a compound of the following formula or a dissociated form, a zwitterion form, or a salt thereof, and contacting OAT with the compound:

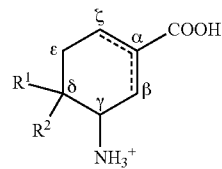

wherein a double bond is present between the α and ζ carbons or between the α and β carbons, wherein each of $R^1$ and $R^2$ is independently selected from H and F, provided at least one of $R^1$ and $R^2$ is not H, or a salt of such compound. In certain embodiments, the double bond is between the α and ζ carbons. In certain embodiments, the double bond is between the α and β carbons. In certain embodiments, $R^1$ and $R^2$ are F.

In certain embodiments, the disclosed methods may be directed to reducing activity of an OAT expressed by a cancer, which may include but is not limited to hepatocellular cancer (HCC) and non-small cell lung cancer (NSCLC), or other cancers that express or overexpress OAT. Such a method can comprise providing a compound as disclosed herein, such as a compound of the following formula or a dissociated form, a non-protonated form, a zwitterion form, or a salt thereof, and contacting the cancer with the compound:

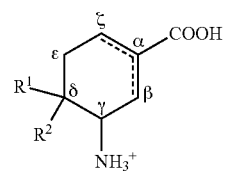

wherein a double bond is present between the α and ζ carbons or between the α and β carbons, wherein each of $R^1$ and $R^2$ is independently selected from H and F, provided at least one of $R^1$ and $R^2$ is not H, or a salt of such compound. In certain embodiments, the double bond is between the α and ζ carbons. In certain embodiments, the double bond is between the α and β carbons. In certain embodiments, $R^1$ and $R^2$ are F.

In certain embodiments, the disclosed methods may be directed to treating a cell proliferative disease or disorder in a subject in need thereof. Suitable cell proliferative diseases and disorders may include cancers that express or overexpress OAT such as, but not limited to, hepatocellular carcinoma (HCC) and non-small cell lung cancer (NSCLC). Such a method can comprise administering to such a subject in need thereof a compound of the following formula or a dissociated form, a non-protonated form, a zwitterion form, or a salt thereof:

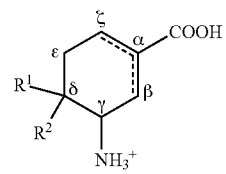

wherein a double bond is present between the α and ζ carbons or between the α and β carbons, wherein each of $R^1$ and $R^2$ is independently selected from H and F, provided at least one of $R^1$ and $R^2$ is not H, or a salt of such compound. In certain embodiments, the double bond is between the α and ζ carbons. In certain embodiments, the double bond is between the α and β carbons. In certain embodiments, $R^1$ and $R^2$ are F.

The compounds disclosed herein are without stereochemical or configurational limitation and encompass all stereochemical or configurational isomers, unless stereochemical or configurational limitations are indicated. As illustrated and discussed below, such compounds and/or their intermediates are available as single enantiomers, racemic mixtures from which isomers can be resolved, or diastereomers from which the corresponding enantiomers can be separated. Accordingly, any stereocenter can be (S) or (R) with respect to any other stereocenter(s). As another separate consideration, various compounds can be present as an acid or base salt, either partially or fully protonated, for example at the amino group to form an ammonium moiety, and/or either partially or fully dissociated, for example at the carboxyl group to form a carboxylate substituent or moiety. In certain such embodiments, with respect to an ammonium substituent or moiety, the counter ion can be a conjugate base of a protic acid. In certain such or other embodiments, with respect to a carboxylate substituent or moiety, the counter ion can be an alkaline, alkaline-earth or ammonium cation. Further, it will be understood by those skilled in the art that any one or more the compounds disclosed herein can be provided as part of a pharmaceutical composition comprising a pharmaceutically-acceptable carrier component for use in conjunction with a treatment method or medicament.

In certain embodiments, the disclosed methods are directed to a disease or disorder associated with OAT activity and/or expression or overexpression, including cell proliferative diseases and disorders such as cancers associated with OAT activity and/or expression or overexpression. Suitable diseases and disorders may include, but are not limited to cell proliferative diseases and disorders, which may include but are not limited to hepatocellular carcinoma (HCC) and non-small cell lung cancer (NSCLC) in a human subject in need of such a treatment. In certain embodiments, such a compound can be provided as part of a pharmaceutical composition.

In certain embodiments, the disclosed methods are directed to reducing or modulating activity of an ornithine aminotransferase expressed by a cancer (e.g., hepatocellular carcinoma (HCC) and non-small cell lung cancer (NSCLC)). Such a method can comprise providing a compound of the sort discussed above or described elsewhere herein, and contacting such a compound with a cellular medium comprising a cancer expressing an ornithine aminotransferase with an amount of such a compound effective to reduce ornithine aminotransferase activity. In certain embodiments, such a compound can be provided as part of a pharmaceutical composition. Regardless, such contact can be in vitro or in vivo.

More generally, the disclosed methods may be directed to inhibiting or inactivating an ornithine aminotransferase. Such a method can comprise providing a compound of the sort discussed above or described below, whether or not part of a pharmaceutical composition, and administering an effective amount of such a compound for contact with an ornithine aminotransferase. Such contact can be, as would be understood in the art, for experimental and/or research purposes or as may be designed to simulate one or more in vivo or physiological conditions. Such compounds can include but are not limited to those illustrated by the following examples, referenced figures, incorporated references and/or accompanying synthetic schemes. In certain such embodiments, such a compound and/or combination thereof can be present in an amount at least partially sufficient to inhibit OAT, cell proliferation and/or tumor growth.

DETAILED DESCRIPTION

Figure 1:
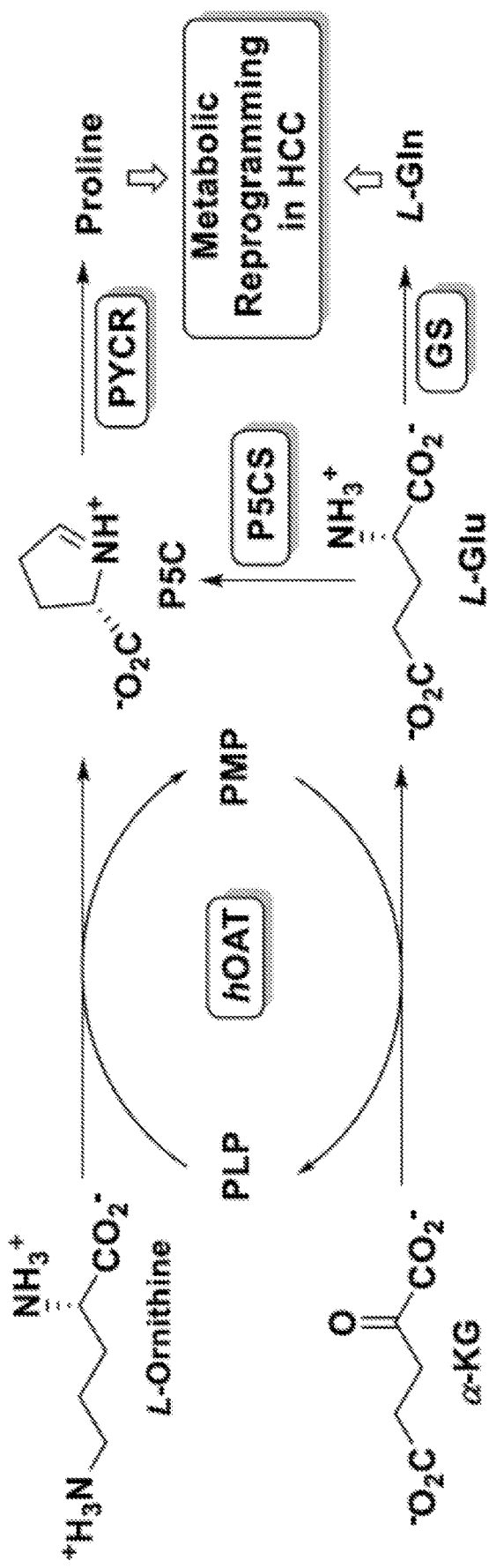
FIG. 1. Metabolic pathway for ornithine.

The disclosed subject matter may be further described using definitions and terminology as follows. The definitions and terminology used herein are for the purpose of describing particular embodiments only, and are not intended to be limiting.

As used in this specification and the claims, the singular forms "a," "an," and "the" include plural forms unless the context clearly dictates otherwise. For example, the term "a substituent" should be interpreted to mean "one or more substituents," unless the context clearly dictates otherwise.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean up to plus or minus 10% of the particular term and "substantially" and "significantly" will mean more than plus or minus 10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

The phrase "such as" should be interpreted as "for example, including." Moreover, the use of any and all exemplary language, including but not limited to "such as", is intended merely to better illuminate the claimed subject matter and does not pose a limitation on the scope of the claimed subject matter.

Furthermore, in those instances where a convention analogous to "at least one of A, B and C, etc." is used, in general such a construction is intended in the sense of one having ordinary skill in the art would understand the convention (e.g., "a system having at least one of A, B and C" would include but not be limited to systems that have A alone, B alone, C alone, A and B together, A and C together, B and C together, and/or A, B, and C together). It will be further understood by those within the art that virtually any disjunctive word and/or phrase presenting two or more alternative terms, whether in the description or figures, should be understood to contemplate the possibilities of including one of the terms, either of the terms, or both terms. For example, the phrase "A or B" will be understood to include the possibilities of "A" or 'B or "A and B."

All language such as "up to," "at least," "greater than," "less than," and the like, include the number recited and refer to ranges which can subsequently be broken down into ranges and subranges. A range includes each individual member. Thus, for example, a group having 1-3 members refers to groups having 1, 2, or 3 members. Similarly, a group having 6 members refers to groups having 1, 2, 3, 4, or 6 members, and so forth.

The modal verb "may" refers to the preferred use or selection of one or more options or choices among the several described embodiments or features contained within the same. Where no options or choices are disclosed regarding a particular embodiment or feature contained in the same, the modal verb "may" refers to an affirmative act regarding how to make or use and aspect of a described embodiment or feature contained in the same, or a definitive decision to use a specific skill regarding a described embodiment or feature contained in the same. In this latter context, the modal verb "may" has the same meaning and connotation as the auxiliary verb "can."

As used herein, a "subject in need thereof" may include a human and/or non-human animal. A "subject in need thereof" may include a subject having a disease or disorder associated with ornithine aminotransferase (OAT) activity. A "subject in need thereof" may include a subject having a cell proliferative disease or disorder, which may include, but is not limited to hepatocellular carcinoma (HCC)

Chemical Entities

New chemical entities and uses for chemical entities are disclosed herein. The chemical entities may be described using terminology known in the art and further discussed below.

As used herein, a dash "-" an asterisk "*" or a plus sign "+" may be used to designate the point of attachment for any radical group or substituent group.

The term "alkyl" as contemplated herein includes a straight-chain or branched alkyl radical in all of its isomeric forms, such as a straight or branched group of 1-12, 1-10, or 1-6 carbon atoms, referred to herein as C1-C12 alkyl, C1-C10-alkyl, and C1-C6-alkyl, respectively.

The term "alkylene" refers to a diradical of straight-chain or branched alkyl group (i.e., a diradical of straight-chain or branched $C_1$-C6 alkyl group). Exemplary alkylene groups include, but are not limited to —$CH_2$—, —$CH_2CH_2$—, —$CH_2CH_2CH_2$—, —$CH(CH_3)CH_2$—, —$CH_2CH(CH_3)$ $CH_2$—, —$CH(CH_2CH_3)CH_2$—, and the like.

The term "halo" refers to a halogen substitution (e.g., —F, —Cl, —Br, or —I). The term "haloalkyl" refers to an alkyl group that is substituted with at least one halogen. For example, —$CH_2F$, —$CHF_2$, —$CF_3$, —$CH_2CF_3$, —$CF_2CF_3$, and the like.

The term "heteroalkyl" as used herein refers to an "alkyl" group in which at least one carbon atom has been replaced with a heteroatom (e.g., an O, N, or S atom). One type of heteroalkyl group is an "alkoxy" group.

The term "alkenyl" as used herein refers to an unsaturated straight or branched hydrocarbon having at least one carbon-carbon double bond, such as a straight or branched group of 2-12, 2-10, or 2-6 carbon atoms, referred to herein as C2-C12-alkenyl, C2-C10-alkenyl, and C2-C6-alkenyl, respectively.

The term "alkynyl" as used herein refers to an unsaturated straight or branched hydrocarbon having at least one carbon-carbon triple bond, such as a straight or branched group of 2-12, 2-10, or 2-6 carbon atoms, referred to herein as C2-C12-alkynyl, C2-C10-alkynyl, and C2-C6-alkynyl, respectively.

The term "cycloalkyl" refers to a monovalent saturated cyclic, bicyclic, or bridged cyclic (e.g., adamantyl) hydrocarbon group of 3-12, 3-8, 4-8, or 4-6 carbons, referred to herein, e.g., as "C4-8-cycloalkyl," derived from a cycloalkane. Unless specified otherwise, cycloalkyl groups are optionally substituted at one or more ring positions with, for example, alkanoyl, alkoxy, alkyl, haloalkyl, alkenyl, alkynyl, amido or carboxyamido, amidino, amino, aryl, arylalkyl, azido, carbamate, carbonate, carboxy, cyano, cycloalkyl, ester, ether, formyl, halo, haloalkyl, heteroaryl, heterocyclyl, hydroxyl, imino, ketone, nitro, phosphate, phosphonato, phosphinato, sulfate, sulfide, sulfonamido, sulfonyl or thiocarbonyl. In certain embodiments, the cycloalkyl group is not substituted, i.e., it is unsubstituted.

The term "cycloheteroalkyl" refers to a monovalent saturated cyclic, bicyclic, or bridged cyclic hydrocarbon group of 3-12, 3-8, 4-8, or 4-6 carbons in which at least one carbon of the cycloalkane is replaced with a heteroatom such as, for example, N, O, and/or S.

The term "cycloalkylene" refers to a cycloalkyl group that is unsaturated at one or more ring bonds.

The term "partially unsaturated carbocyclyl" refers to a monovalent cyclic hydrocarbon that contains at least one double bond between ring atoms where at least one ring of the carbocyclyl is not aromatic. The partially unsaturated carbocyclyl may be characterized according to the number oring carbon atoms. For example, the partially unsaturated carbocyclyl may contain 5-14, 5-12, 5-8, or 5-6 ring carbon atoms, and accordingly be referred to as a 5-14, 5-12, 5-8, or 5-6 membered partially unsaturated carbocyclyl, respectively. The partially unsaturated carbocyclyl may be in the form of a monocyclic carbocycle, bicyclic carbocycle, tricyclic carbocycle, bridged carbocycle, spirocyclic carbocycle, or other carbocyclic ring system. Exemplary partially unsaturated carbocyclyl groups include cycloalkenyl groups and bicyclic carbocyclyl groups that are partially unsaturated. Unless specified otherwise, partially unsaturated carbocyclyl groups are optionally substituted at one or more ring positions with, for example, alkanoyl, alkoxy, alkyl, haloalkyl, alkenyl, alkynyl, amido or carboxyamido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl or thiocarbonyl. In certain embodiments, the partially unsaturated carbocyclyl is not substituted, i.e., it is unsubstituted.

The term "aryl" is art-recognized and refers to a carbocyclic and/or heterocyclic aromatic group. Representative aryl groups include phenyl, naphthyl, anthracenyl, pyridinyl, quinolinyl, furanyl, thionyl, and the like. The term "aryl" includes polycyclic ring systems having two or more carbocyclic rings in which two or more carbons are common to two adjoining rings (the rings are "fused rings") wherein at least one of the rings is aromatic and, e.g., the other ring(s) may be cycloalkyls, cycloalkenyls, cycloalkynyls, and/or aryls. Unless specified otherwise, the aromatic ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido or carboxyamido, carboxylic acid, —C(O)alkyl, -CO₂alkyl, carbonyl, carboxyl, alkylthio, sulfonyl, sulfonamide, sulfonamide, ketone, aldehyde, ester, heterocyclyl, aryl or heteroaryl moieties, —CF₃, —CN, or the like. In certain embodiments, the aromatic ring is substituted at one or more ring positions with halogen, alkyl, hydroxyl, or alkoxyl. In certain other embodiments, the aromatic ring is not substituted, i.e., it is unsubstituted. In certain embodiments, the aryl group is a 6-10 membered ring structure.

The terms "heterocyclyl" and "heterocyclic group" are art-recognized and refer to saturated, partially unsaturated, or aromatic 3- to 10-membered ring structures, alternatively 3- to 7-membered rings, whose ring structures include one to four heteroatoms, such as nitrogen, oxygen, and sulfur. The number of ring atoms in the heterocyclyl group can be specified using 5 Cx-Cx nomenclature where x is an integer specifying the number of ring atoms. For example, a C3-C7 heterocyclyl group refers to a saturated or partially unsaturated 3- to 7-membered ring structure containing one to four heteroatoms, such as nitrogen, oxygen, and sulfur. The designation "C3-C7" indicates that the heterocyclic ring contains a total of from 3 to 7 ring atoms, inclusive of any heteroatoms that occupy a ring atom position.

The terms "amine" and "amino" are art-recognized and refer to both unsubstituted and substituted amines (e.g., mono-substituted amines or di-substituted amines), wherein substituents may include, for example, alkyl, cycloalkyl, heterocyclyl, alkenyl, and aryl.

The terms "alkoxy" or "alkoxyl" are art-recognized and refer to an alkyl group, as defined above, having an oxygen radical attached thereto. Representative alkoxy groups include methoxy, ethoxy, tert-butoxy and the like.

An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, and the like.

The term "carbonyl" as used herein refers to the radical —C(O)—.

The term "oxo" refers to a divalent oxygen atom —O—.

The term "carboxy" or "carboxyl" as used herein refers to the radical —COOH or its corresponding salts, e.g. —COONa, etc. A carboxy alkyl ester refers to a compound having a moiety —C(O)O—R, where R is alkyl.

The term "carboxamido" as used herein refers to the radical —C(O)NRR', where R and R' may be the same or different. R and R', for example, may be independently hydrogen, alkyl, aryl, arylalkyl, cycloalkyl, formyl, haloalkyl, heteroaryl, or heterocyclyl.

The term "amide" or "amido" or "amidyl" as used herein refers to a radical of the form —R¹C(O)N(R²)—, —R¹C(O)N(R²)R³—, —C(O)NR²R³, or —C(O)NH₂, wherein R¹, R² and R³, for example, are each independently hydrogen, alkyl, alkoxy, alkenyl, alkynyl, amide, amino, aryl, arylalkyl, carbamate, cycloalkyl, ester, ether, formyl, halogen, haloalkyl, heteroaryl, heterocyclyl, hydrogen, hydroxyl, ketone, or nitro.

The compounds of the disclosure may be isomeric. In some embodiments, the disclosed compounds may be isomerically pure, wherein the compounds represent greater than about 99% of all compounds within an isomeric mixture of compounds. Also contemplated herein are compositions comprising, consisting essentially of, or consisting of an isomerically pure compound and/or compositions that are isomerically enriched, which compositions may comprise, consist essential of, or consist of at least about 50%, 60%, 70%, 80%, 90%, 95%, 96%, 97%, 98%, 99%, or 100% of a single isomer of a given compound.

The compounds of the disclosure may contain one or more chiral centers and/or double bonds and, therefore, exist as stereoisomers, such as geometric isomers, enantiomers or diastereomers. The term "stereoisomers" when used herein consist of all geometric isomers, enantiomers or diastereomers. These compounds may be designated by the symbols "R" or "S," or "+" or "−" depending on the configuration of substituents around the chiral or stereogenic carbon atom and or the optical rotation observed. The disclosed compounds encompasses various stereo isomers and mixtures thereof. Stereoisomers include enantiomers and diastereomers. Mixtures of enantiomers or diastereomers may be designated (±)" in nomenclature, but the skilled artisan will recognize that a structure may denote a chiral center implicitly. It is understood that graphical depictions of chemical structures, e.g., generic chemical structures, encompass all stereoisomeric forms of the specified compounds, unless indicated otherwise. Also contemplated herein are compositions comprising, consisting essentially of, or consisting of an enantiopure compound and/or compositions that are enantiomer enriched, which compositions may comprise, consist essential of, or consist of at least about 50%, 60%, 70%, 80%, 90%, 95%, 96%, 97%, 98%, 99%, or 100% of a single enantiomer of a given compound (e.g., at least about 95% of an R enantiomer of a given compound).

Various non-limiting embodiments of the disclosed compounds and methods of use can be considered with an understanding of a catalytic mechanism of OAT and mechanism of inactivation of GABA-AT and OAT. In a some embodiments, the disclosed subject matter relates to one or more OAT inhibitors, as set forth above, formulated into compositions together with one or more physiologically tolerable or acceptable diluents, carriers, adjuvants or vehicles that are collectively referred to herein as carriers. Compositions suitable for such contact or administration can comprise physiologically acceptable aqueous or nonaqueous solutions, dispersions, suspensions or emulsions, whether or not sterile. The resulting compositions can be, in conjunction with the various methods described herein, for administration or contact with an ornithine aminotransferase. Whether or not in conjunction with a pharmaceutical composition, "contacting" means that an ornithine aminotransferase and one or more inhibitor compounds are brought together for purpose of binding and/or complexing such an inhibitor compound to the enzyme. Amounts of a compound effective to inhibit an ornithine aminotransferase may be determined empirically, and making such determinations is within the skill in the art. Inhibition or otherwise affecting an ornithine aminotransferase activity includes reduction, mitigation and/or modulation, as well as elimination of OAT activity, glutamate production, glutamine synthesis, cell proliferation and/or tumor growth.

It is understood by those skilled in the art that dosage amount will vary with the activity of a particular inhibitor compound, disease state, route of administration, duration of treatment, and like factors well-known in the medical and pharmaceutical arts. In general, a suitable dose will be an amount which is the lowest dose effective to produce a therapeutic or prophylactic effect. If desired, an effective dose of such a compound, pharmaceutically-acceptable salt thereof, or related composition may be administered in two or more sub-doses, administered separately over an appropriate period of time.

Methods of preparing pharmaceutical formulations or compositions include the step of bringing an inhibitor compound into association with a carrier and, optionally, one or more additional adjuvants or ingredients. For example, standard pharmaceutical formulation techniques can be employed, such as those described in Remington's Pharmaceutical Sciences, Mack Publishing Company, Easton, PA.

Regardless of composition or formulation, those skilled in the art will recognize various avenues for medicament administration, together with corresponding factors and parameters to be considered in rendering such a medicament suitable for administration. Accordingly, with respect to one or more non-limiting embodiments, the disclosed compounds may be utilized as inhibitor compounds for the manufacture of a medicament for therapeutic use in the treatment or prevention of a disease or disorder associated with OAT activity, expression, or overexpression. Suitable diseases or disorders may include cell proliferative diseases or disorders, which may include but are not limited to hepatocellular carcinoma (HCC) and non-small cell lung cancer (NSCLC).

Generally, with respect to various embodiments, the disclosed subject matter can be directed to method(s) for the treatment of a pathologic proliferative disorder. As used herein, the term "disorder" refers to a condition in which there is a disturbance of normal functioning. A "disease" is any abnormal condition of the body or mind that causes discomfort, dysfunction, or distress to the person affected or those in contact with the person. Sometimes the term is used broadly to include injuries, disabilities, syndromes, symptoms, deviant behaviors, and atypical variations of structure and function, while in other contexts these may be considered distinguishable categories. It should be noted that the terms "disease", "disorder", "condition" and "illness", are equally used herein.

According to certain embodiments, the disclosed methods can be specifically applicable for the treatment of malignant proliferative disorders, including malignant proliferative disorders that express ornithine aminotransferase (OAT). As used herein, "cancer", "tumor" and "malignancy" all relate equivalently to a hyperplasia of a tissue or organ. If the tissue is a part of the lymphatic or immune systems, malignant cells may include non-solid tumors of circulating cells. Malignancies of other tissues or organs may produce solid tumors. Accordingly, the compounds, compositions, and methods disclosed herein may be used in the treatment of non-solid and solid tumors.

Malignancy, as contemplated herein, may be selected from the group consisting of melanomas, carcinomas, leukemias, lymphomas and sarcomas, which express OAT. Malignancies that can be treated by the methods disclosed herein, including malignancies that express OAT can comprise but are not limited to hematological malignancies (including leukemia, lymphoma and myeloproliferative disorders), hypoplastic and aplastic anemia (both virally induced and idiopathic), myelodysplastic syndromes, all types of paraneoplastic syndromes (both immune mediated and idiopathic) and solid tumors (including bladder, rectum, stomach, cervix, ovarian, renal, lung, liver, breast, colon, prostate, GI tract, pancreas and Karposi). More particularly, according to certain embodiments, the compounds and compositions used in conjunction can be used in methods for the treatment or inhibition of non-solid cancers, e.g. hematopoietic malignancies such as all types of leukemia, e.g. acute lymphocytic leukemia (ALL), acute myelogenous leukemia (AML), chronic lymphocytic leukemia (CLL), chronic myelogenous leukemia (CML), myelodysplastic syndrome (MDS), mast cell leukemia, hairy cell leukemia, Hodgkin's disease, non-Hodgkin's lymphomas, Burkitt's lymphoma and multiple myeloma, as well as for the treatment or inhibition of solid tumors such as tumors in lip and oral cavity, pharynx, larynx, paranasal sinuses, major salivary glands, thyroid gland, esophagus, stomach, small intestine, colon, colorectum, anal canal, liver, gallbladder, extraliepatic bile ducts, ampulla of Vater, exocrine pancreas, lung, pleural mesothelioma, bone, soft tissue sarcoma, carcinoma and malignant melanoma of the skin, breast, vulva, vagina, cervix uteri, corpus uteri, ovary, fallopian tube, gestational trophoblastic tumors, penis, prostate, testis, kidney, renal pelvis, ureter, urinary bladder, urethra, carcinoma of the eyelid, carcinoma of the conjunctiva, malignant melanoma of the conjunctiva, malignant melanoma, retinoblastoma, carcinoma of the lacrimal gland, sarcoma of the orbit, brain, spinal cord, vascular system, hemangiosarcoma and Kaposi's sarcoma.

The compounds and compositions disclosed herein may be administered in methods of treatment as known in the art. Accordingly, various such compounds and compositions can be administered in conjunction with such a method in any suitable way. For example, administration may comprise oral, intravenous, intraarterial, intramuscular, subcutaneous, intraperitoneal, parenteral, transdermal, intravaginal, intranasal, mucosal, sublingual, topical, rectal or subcutaneous administration, or any combination thereof.

According to some embodiments, the treated subject may be a mammalian subject. Although the methods disclosed herein are particularly intended for the treatment of proliferative disorders in humans, other mammals are included. By way of non-limiting examples, mammalian subjects include monkeys, equines, cattle, canines, felines, mice, rats and pigs.

The terms "treat, treating, treatment" as used herein and in the claims mean ameliorating one or more clinical indicia of disease activity in a subject having a pathologic disorder. "Treatment" refers to therapeutic treatment. Those in need of treatment are mammalian subjects suffering from any pathologic disorder. By "patient" or "subject in need" is meant any mammal for which administration of a compound or any pharmaceutical composition of the sort described herein is desired, in order to prevent, overcome, modulate or slow down such infliction. To provide a "preventive treatment" or "prophylactic treatment" is acting in a protective manner, to defend against or prevent something, especially a condition or disease.

More generally, the disclosed methods may be directed to affecting, modulate, reducing, inhibiting and/or preventing the initiation, progression and/or metastasis (e.g., from the liver elsewhere or to the liver from any other organ or tissue) of a malignant pathologic proliferative disorder associated with OAT activity. (See, e.g., Lucero O M, Dawson D W, Moon R T, et al. A re-evaluation of the "oncogenic" nature of Wnt/beta-catenin signaling in melanoma and other cancers. *Curr Oncol Rep* 2010, 12, 314-318; Liu Wei; Le Anne; Hancock Chad; Lane Andrew N; Dang Chi V; Fan Teresa W-M; Phang James M. Reprogramming of proline and glutamine metabolism contributes to the proliferative and metabolic responses regulated by oncogenic transcription factor c-MYC. *Proc. Natl. Acad. Sci. USA* 2012, 109(23), 8983-8988; and Tong, Xuemei; Zhao, Fangping; Thompson, Craig B. The molecular determinants of de novo nucleotide biosynthesis in cancer cells. *Curr. Opin. Genet. Devel.* 2009, 19(1), 32-37.)

ILLUSTRATIVE EMBODIMENTS

The following Embodiments are illustrative and should not be interpreted to limit the scope of the claimed subject matter.

Embodiment 1. A compound of the following formula or a dissociated form, zwitterion form, or a salt thereof:

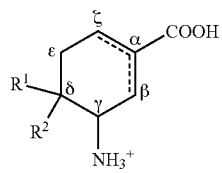

wherein a double bond is present between the α and ζ carbons or between the α and β carbons, and wherein each of $R^1$ and $R^2$ is independently selected from H or a leaving group such as F, Cl, Br, and I, providing at least one of $R^1$ and $R^2$ is not H.

Embodiment 2. The compound of embodiment 1 in zwitterion form comprising an ammonium moiety and a carboxylate moiety.

Embodiment 3. The compound of embodiment 1 or 2, wherein the double bond is between the α and ζ carbons.

Embodiment 4. The compound of embodiment 1 or 2, wherein the double bond is between the α and β carbons.

Embodiment 5. The compound of any of the foregoing embodiments, wherein at least one of $R^1$ and $R^2$ is F.

Embodiment 6. The compound of any of the foregoing embodiments, wherein the compound is a salt comprising a substituent selected from an ammonium substituent, a carboxylate substituent, and a combination thereof.

Embodiment 7. The compound of embodiment 6, wherein the ammonium salt has a counter ion that is the conjugate base of a protic acid.

Embodiment 8. The compound of any of the foregoing embodiments in a pharmaceutical composition comprising a pharmaceutically-acceptable carrier component.

Embodiment 9. The compound of any of the foregoing embodiments of a formula:

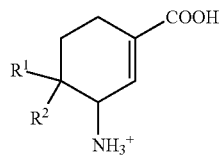

and optionally

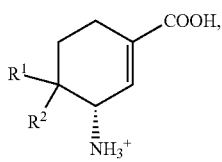

wherein each of $R^1$ and $R^2$ is independently selected from H and F, provided at least one of $R^1$ and $R^2$ is F, or a salt thereof, and the compound optionally has a formula

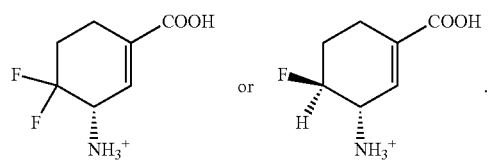 [SMILES: [NH3+][C@H]1C=C(C(=O)O)CCC1(F)F ; [NH3+][C@H]1C=C(C(=O)O)CC[C@@H]1F]

Embodiment 10. The compound of embodiment 9, wherein each of $R^1$ and $R^2$ is F.

Embodiment 11. The compound of embodiment 9, wherein the compound is a salt comprising a substituent selected from an ammonium substituent, a carboxylate substituent, and a combination thereof.

Embodiment 12. The compound of embodiment 11, wherein the ammonium salt has a counter ion that is the conjugate base of a protic acid.

Embodiment 13. The compound of embodiment 9 in a pharmaceutical composition comprising a pharmaceutically-acceptable carrier component.

Embodiment 14. The compound of any of the foregoing embodiments of a formula:

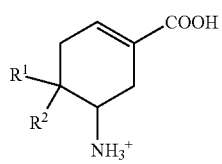

and optionally
wherein each of $R^1$ and $R^2$ is independently selected from H and F, provided at least one of $R^1$ and $R^2$ is F, or a salt thereof, and the compound optionally has a formula

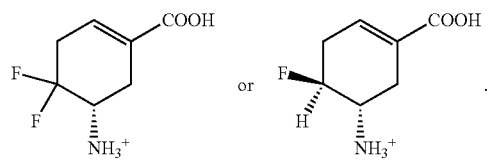

Embodiment 15. The compound of embodiment 14, wherein each of $R^1$ and $R^2$ is F.

Embodiment 16. The compound of embodiment 14, wherein the compound is a salt comprising a substituent selected from an ammonium substituent, a carboxylate substituent, and a combination thereof.

Embodiment 17. The compound of embodiment 16, wherein the ammonium salt has a counter ion that is the conjugate base of a protic acid.

Embodiment 18. The compound of embodiment 14 in a pharmaceutical composition comprising a pharmaceutically-acceptable carrier component.

Embodiment 19. A pharmaceutical composition comprising: (i) the compound of any of the foregoing embodiments; and (ii) a pharmaceutically suitable carrier, diluent, or excipient.

Embodiment 20. A pharmaceutical composition comprising: (i) the compound of embodiment 9; and (ii) a pharmaceutically suitable carrier, diluent, or excipient.

Embodiment 21. A pharmaceutical composition comprising: (i) the compound of embodiment 14; and (ii) a pharmaceutically suitable carrier, diluent, or excipient.

Embodiment 22. A method of modulating ornithine aminotransferase (OAT) activity, the method comprising: (i) optionally providing the compound of any of claims 1-18; and (ii) contacting the compound of any of claims 1-18 with a medium comprising OAT, the compound in an amount sufficient to modulate OAT activity.

Embodiment 23. The method of embodiment 22, wherein the double bond is between the α and ζ carbons.

Embodiment 24. The method of embodiment 22, wherein the double bond is between the α and β carbons.

Embodiment 25. The method of any of embodiments 22-24, wherein at least one of $R^1$ and $R^2$ is F.

Embodiment 26. The method of any of embodiments 22-25, wherein the compound is a salt comprising a substituent selected from an ammonium substituent, a carboxylate substituent, and a combination thereof.

Embodiment 27. The method of embodiment 26, wherein the ammonium salt has a counter ion that is the conjugate base of a protic acid.

Embodiment 28. The method of any of embodiments 22-27, wherein the contact is in vivo.

Embodiment 29. A method of reducing activity of an OAT expressed by a human cancer, the method comprising: (i) optionally providing the compound of any of claims 1-18; and (ii) contacting the compound of any of claims 1-18 with a cellular medium comprising the cancer expressing an OAT with an amount of the compound effective to reduce OAT activity.

Embodiment 30. The method of embodiment 29, wherein the double bond is between the α and ζ carbons.

Embodiment 31. The method of embodiment 29, wherein the double bond is between the α and β carbons.

Embodiment 32. The method of any of embodiments 29-31, wherein at least one of $R^1$ and $R^2$ is F.

Embodiment 33. The method of any of embodiments 29-32, wherein the compound is provided in a pharmaceutical composition.

Embodiment 34. The method of any of embodiments 29-33, wherein the contact is in vivo.

Embodiment 35. The method of any of embodiments 29-33, wherein the contact is with a human subject in need thereof.

Embodiment 36. A method for treating cancer in a subject in need thereof, the method comprising administering to the subject a therapeutically effective amount of the compound of any of embodiments 1-18.

Embodiment 37. The method of embodiment 36, wherein the double bond is between the α and ζ carbons.

Embodiment 38. The method of embodiment 36, wherein the double bond is between the α and β carbons.

Embodiment 39. The method of any of embodiments 36-38, wherein at least one of $R^1$ and $R^2$ is F.

Embodiment 40. The method of any of embodiments 36-39, wherein the cancer is characterized by expression or overexpression of ornithine aminotransferase (OAT).

Embodiment 41. The method of any of embodiments 36-40, wherein the cancer is hepatocellular carcinoma (HCC).

Embodiment 42. The method of any of embodiments 36-41, wherein the cancer is non-small cell lung cancer (NSCLC).

EXAMPLES

The following Examples are illustrative and should not be interpreted to limit the scope of the claimed subject matter. The following non-limiting Examples and data illustrate various aspects and features relating to the disclosed compounds, compositions, and methods including the treatment of diseases and disorders associated with OAT activity, expression, or overexpression, and/or reduction of ornithine aminotransferase activity, such as cell proliferative diseases and disorders including, but not limited to hepatocellular carcinoma (HCC) and non-small cell lung cancer (NSCLC). While the utility of this invention is illustrated through the use of several compounds and compositions which can be used therewith, it will be understood by those skilled in the art that comparable results are obtainable with various other compound(s), as are commensurate with the scope of this invention.

Example 1—a Remarkable Difference that One Fluorine Atom Confers on the Mechanisms of Inactivation of Human Ornithine Aminotransferase by Two Cyclohexene Analogues of γ-Aminobutyric Acid Reference is made to the manuscript Zhu, Wei et al. "A Remarkable Difference That One Fluorine Atom Confers on the Mechanisms of Inactivation of Human Ornithine Aminotransferase by Two Cyclohexene Analogues of γ-Aminobutyric Acid." *J. Am. Chem. Soc.* vol 142, 10: 4892-4903, Mar. 1, 2020, the content of which is incorporated by reference in its entirety.

Abstract

Human ornithine aminotransferase (hOAT), a pyridoxal 5-phosphate-dependent enzyme, plays a critical role in the progression of hepatocellular carcinoma (HCC). Pharmacological selective inhibition of hOAT has been shown to be a potential therapeutic approach for HCC. Inspired by the discovery of the nonselective aminotransferase inactivator (1R,3S,4S)-3-amino-4-fluoro cyclopentane-1-carboxylic acid (1), in this work, we rationally designed, synthesized, and evaluated a novel series of fluorine-substituted cyclohexene analogues, thereby identifying 8 and 9 as novel selective hOAT time-dependent inhibitors. Intact protein mass spectrometry and protein crystallography demonstrated 8 and 9 as covalent inhibitors of hOAT, which exhibit two distinct inactivation mechanisms resulting from the difference of a single fluorine atom. Interestingly, they share a similar turnover mechanism, according to the mass spectrometry-based analysis of metabolites and fluoride ion release experiments. Molecular dynamics (MD) simulations and electrostatic potential (ESP) charge calculations were conducted, which elucidated the significant influence of the one-fluorine difference on the corresponding intermediates, leading to two totally different inactivation pathways. The novel addition aromatization inactivation mechanism for 9 contributes to its significantly enhanced potency, along with excellent selectivity over other aminotransferases.

Introduction

Hepatocellular carcinoma (HCC), which accounts for 90% of primary liver cancer, is the second most common cause of cancer death worldwide.[1-4] To date, there is no effective treatment for HCC, as it is typically diagnosed at advanced disease stages and tumors are typically refractory to systemic treatment with the standard-of-care receptor tyrosine kinase inhibitor, sorafenib, and radiotherapy.[5-8] Human ornithine aminotransferase (hOAT) is a pyridoxal 5'-phosphate (PLP)-dependent enzyme[9] with roles in inborn errors of metabolism[10] and hepatocellular carcinoma (HCC) progression.[11] Mechanistically, two coupled half-reactions are involved in the transamination cycle of hOAT (FIG. 1). In the first-half reaction, hOAT catalyzes the conversion of PLP and ornithine to pyridoxamine phosphate (PMP) and glutamyl-5-semialdehyde, which spontaneously cyclizes to Δ1-pyrroline-5-carboxylate (P5C).[12] The P5C generated can be further converted to proline by pyrroline-5-carboxylate reductase (PYCR).[13,14] In the second-half reaction, PMP and α-ketoglutarate (α-KG) are converted to PLP and L-glutamate (L-Glu), which also can be converted to P5C by pyrroline-5-carboxylate synthase (P5CS). Mounting evidence indicates that proline metabolism plays an important role in metabolic reprogramming to sustain cancer proliferation along with the upregulated synthesis of P5C as a central intermediate.[15-17] Metabolic reprogramming in HCC is characterized by the activation of the proline/hydroxyproline metabolic pathway, which supports HIF1a-dependent tumor progression and sorafenib resistance.[18] Furthermore, the glutamate generated by hOAT can be converted to glutamine by glutamine synthetase (GS) (FIG. 1), which supports anabolic and proliferative cell programs.[19] hOAT and glutaminogenic enzymes are found to be strongly activated and commonly overexpressed in HCC because of aberrant, oncogenic Wnt/β-catenin signaling.[20,21] The selective inhibition of hOAT has been shown to effectively suppress HCC tumor growth in vivo.[11] More recently, the specific knockdown of hOAT was also found to suppress the growth of nonsmall cell lung cancer (NSCLC) in vitro and in vivo.[22] Taken together, hOAT plays an important role in the metabolic reprograming of HCC via proline and glutamine metabolic pathways, and the selective inhibition of hOAT serves as a promising therapeutic strategy for the treatment of HCC and other related cancers. Among 14 known aminotransferases, hOAT belongs to the same subgroup as γ-aminobutyric acid aminotransferase (GABA-AT) because of their similarities in primary structures.[23] hOAT and GABA-AT have very similar active sites,[24] so it is not surprising that some potent inhibitors of GABA-AT also inhibit hOAT.[11] Over many years, our laboratory has been focusing on the rational design of mechanism-based inactivators (MBIs) of GABA-AT.[25] MBIs are unreactive alternate substrates for target enzymes, which are converted to active species in the catalytic site and then lead to inactivation via covalent bonding with the enzyme, tight-binding inhibition, or any functionally irreversible inhibition mechanism.[26] For example, (1R,3S,4S)-3-amino-4-fluorocyclopentane-1-carboxylic acid (1) was reported to inactivate hOAT[27] and GABA-AT[28] via the same enamine mechanism, as shown in Scheme 1. The proposed inactivation mechanism is initiated by the formation of Schiff base 2, which is subjected to rate-determining deprotonation and in situ elimination of fluoride ion to afford intermediate 4. Active enamine 5 is formed via a Schiff base exchange reaction, and the subsequent nucleophilic addition of 5 to the Lys-bound PLP complex yields covalent adduct 6.

Scheme 1. Mechanism of Inaction of hOAT and GABA-AT by 1

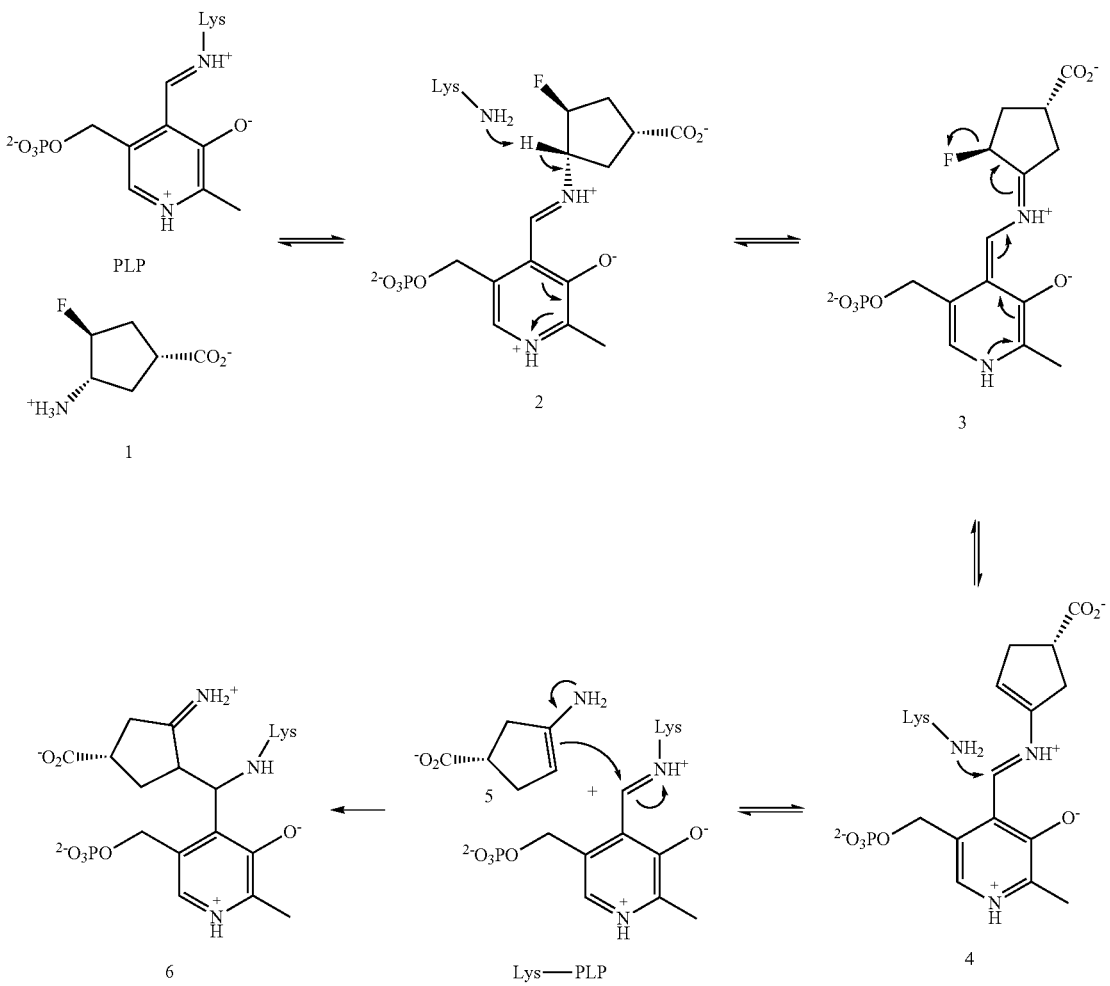

Because MBIs are inert until they are activated in the active site, undesirable off-target effects can be greatly reduced. More importantly, these inactivators can demonstrate higher potency and selectivity than traditional inhibitors even at a lower dosage.[11,29,30] In 2015, GABA analogue 7 (FIG. 2) was reported as a selective MBI of hOAT, which dramatically reduced α-fetoprotein levels (a biomarker for HCC) and suppressed in vivo HCC tumor growth at doses of 0.1 and 1.0 mg/kg.[11] Very recently, the inactivation mechanism of 7 was also revealed.[31]

We have been interested in discovering potent and selective hOAT inactivators that have novel inactivation mechanisms. Herein, we rationally designed and synthesized fluorine-substituted cyclohexene-based GABA analogues 8-11 (FIG. 2) based on the cyclopentane-based analogue 1. Among them, compound (9) is 23 times more efficient as an inactivator of hOAT than 7, along with excellent selectivity over other aminotransferases (e.g., GABA-AT). We also elucidated the inactivation and turnover mechanisms for 8 and 9 through mass spectrometry, crystallography, and various other biochemical methods and can conclude that a difference of a single fluorine atom dramatically alters the inactivation mechanism.

Results and Discussion

Figure 2:
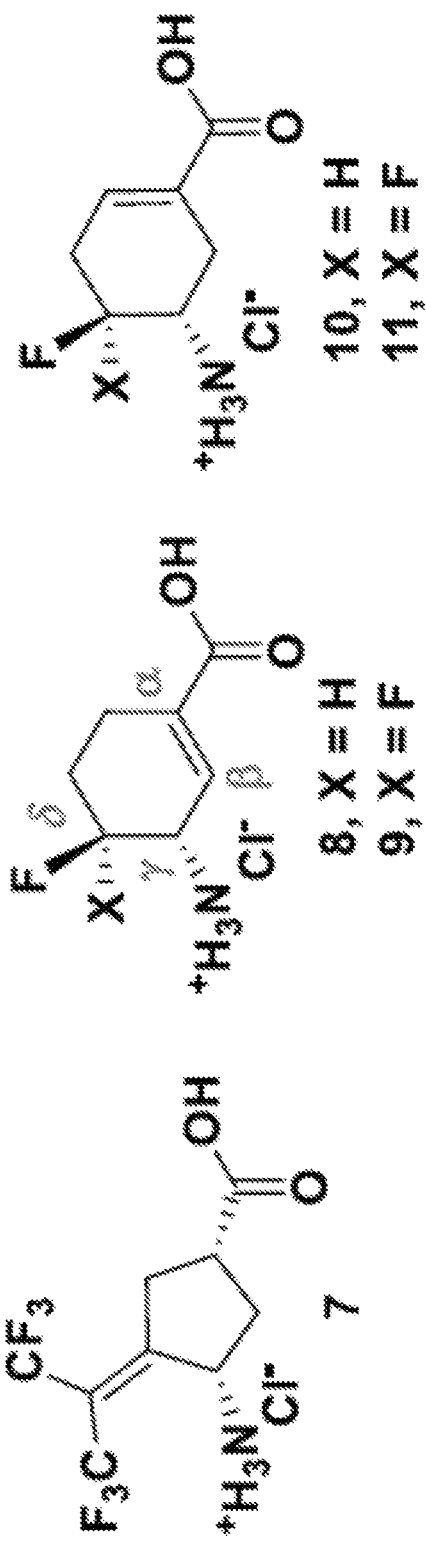
FIG. 2. Structures of selective hOAT inactivators 7 and fluorine-substituted cyclohexene analogues 8-11.

Design of Novel OAT Inactivators. Similar binding pockets are observed in hOAT and GABA-AT, which produce virtually identical distances between the anchor points of the ligands. Interestingly, Tyr55 in hOAT partially occupies a similar steric space as does Phe351 in GABA-AT. The more hydrophobic Phe351 residue intrudes into the active site of GABA-AT so that only the smaller GABA molecule can fit; the hOAT catalytic site is more flexible and larger to accommodate ornithine that is one carbon longer than GABA.[32] Furthermore, the unique Tyr55 residue provides the potential of forming extra hydrogen bonds with the more hydrophilic substrate in the active site of hOAT.[31] Previously, cyclopentane-based GABA analogue 1 was identified as a dual inhibitor against hOAT and GABA-AT. Because of the relatively small size of 1, it can fit into the catalytic pockets of hOAT and GABA-AT, consistent with its poor selectivity.[27] Thus, we hypothesized that the relatively larger sizes of cyclohexene derivatives 8-11 could potentially improve their hOAT selectivity over GABA-AT (FIG. 2). In addition, the incorporation of a double bond at the α/β-position (8/9) could possibly enhance the inhibitory activity[33] compared with the double bond isomers 10/11, potentially by increasing the acidity of the proton adjacent to the amino group.

MBIs usually act as substrates initially, followed by the formation of active intermediates at the catalytic site, which then inactivate the enzymes through different mechanistic pathways. Therefore, a proposal of the inactivation mechanism plays an important role in the early stage of rational design of potential MBIs. Three possible inactivation mechanisms for 8/9 are proposed in Scheme 2. All of the mechanisms are initiated by Schiff base formation (12a/12b) with subsequent HF elimination to give reactive species 14a/14b, based on the known mechanism of 1 (Scheme 1). Mechanistic pathway a is similar to the inactivation mechanism of 1, in which active enamine 15a/15b could be released after transimination of 14a/14b with Lys292. The subsequent enamine addition could lead to inactivation with the formation of adducts 16a/16b. The second fluoride ion of adduct 16b could be further released to afford aromatic adduct 17. Mechanistic pathway b is a direct aromatization of 14a/14b to yield a tight binding adduct 20a/20b, which is similar to the inactivation mechanism of another fluorinated cyclohexene analogue.[34] Mechanistic pathway c involves nucleophilic addition of Lys292 to conjugated olefin 14a/14b, yielding adducts 21a/21b.

Scheme 2. Possible Inactivation Mechanisms for 8 and 9

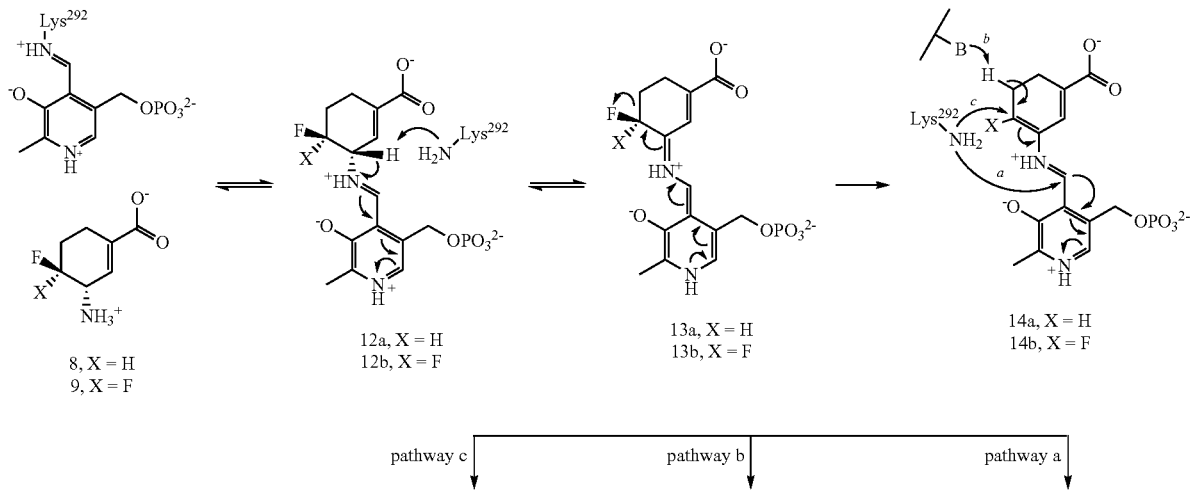

-continued

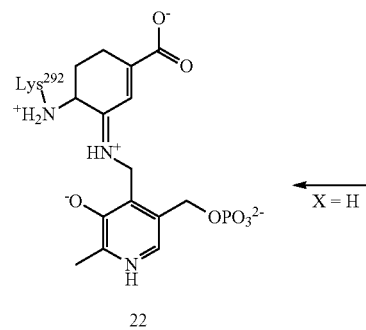

22

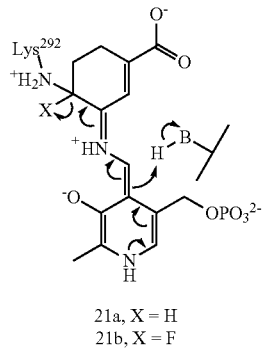

21a, X = H
21b, X = F

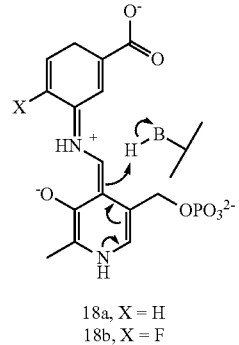

18a, X = H
18b, X = F

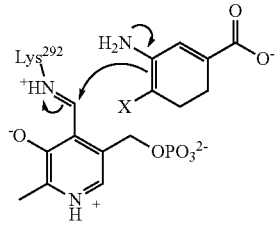

15a, X = H
15b, X = F

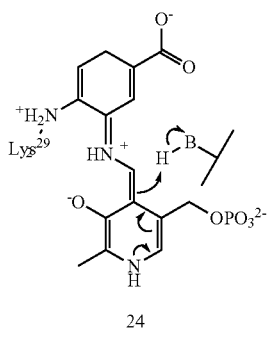

24

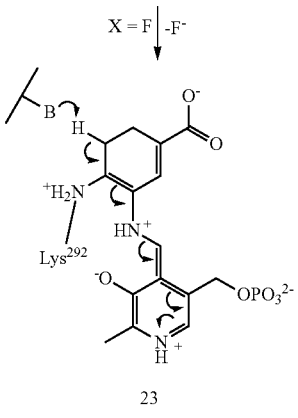

23

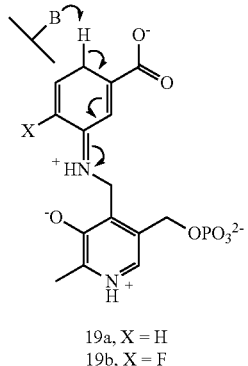

19a, X = H
19b, X = F

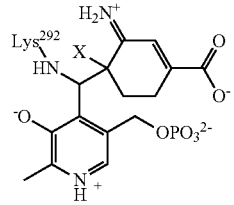

16a, X = H
16b, X = F

X = F | -HF
       | -H⁺

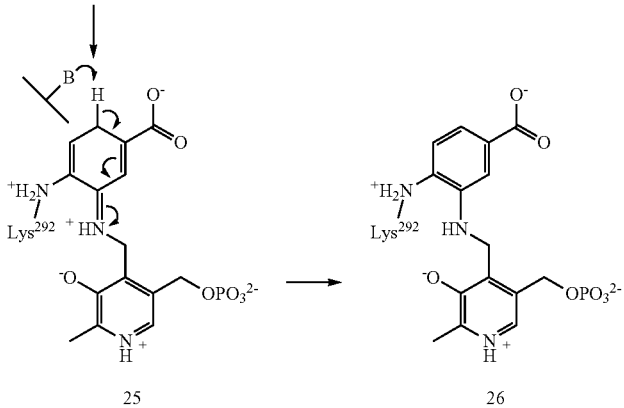

25          26

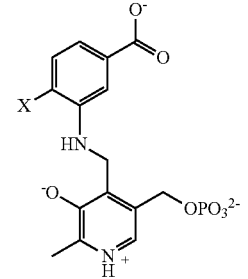

20a, X = H
20b, X = F

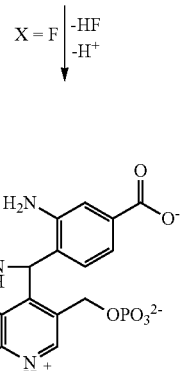

17

In the case of 21b, it is possible to form a more stable covalent aromatic adduct (26) after the elimination of the second fluoride ion.

Molecular Docking. To better understand the difference in steric hindrance between ring sizes, molecular docking studies[35] for 1 and 8 were employed to mimic their binding poses at the active sites of GABA-AT and hOAT, compared with the native substrates. Based on molecular docking studies, GABA binds in the active site of GABA-AT and establishes hydrogen bonds with residues Arg192, Tyr69, and Glu270 (data not shown). This putative binding pose of GABA positions its γ-amino group close to the Lys329-PLP complex and facilitates the subsequent Schiff base exchange. The binding model of 1 demonstrates similar hydrogen bonds with these residues (data not shown). However, molecular docking shows 8 forms a more stable hydrogen bond with His206 to avoid the potential clash with residue Phe351 (data not shown), which potentially impedes its initial reaction with Lys329-PLP complex. Comparably, the binding model of ornithine with hOAT shows the 6-amino group goes deep into the active site and forms a distinct hydrogen bond with Thr322 (data not shown), which positions it close to the Lys292-PLP complex. The amino group of 8 forms a similar hydrogen bond with Thr322 in the docking model (data not shown), while the docking pose of 1 indicates it forms a hydrogen bond with Glu325 instead (data not shown). These docking results indicate that the larger cyclohexene analogues as substrates are favored in the hOAT active site but disfavored in the GABAAT active site when compared with 1, which matches our design strategy described above.

The chirality of the γ-position of MBIs was found to be very important for the inactivation process and for retaining their inhibitory activity.[25] Interestingly, the enantiomer of 8 shows a similar binding pose in the active site of hOAT (data not shown). Lys-assisted deprotonation at the γ-position proved to be the rate-determining step in earlier analogues.[36] Thus, the molecule docking study was also conducted to predict the binding poses of active intermediates 12a (data not shown) and its enantiomer (data not shown) at the catalytic pocket of hOAT. Both carboxylate moieties of these intermediates establish hydrogen bonds with Tyr55 and Arg180, while the different chirality of the 12a-enantiomer forces its γ-proton to face the other side, which points away from the catalytic Lys292 (3.0 Avs 5.3 Å). This docking simulation is also consistent with the observation of earlier inactivators and supports the synthesis of chirally pure analogues.

Syntheses of Fluorine-Substituted Cyclohexene Analogues 8-11. The synthetic route for 8-11 is shown in Scheme 3. The di-PMB intermediate (29) was afforded from chirally pure starting material 27 by three sequential steps: intramolecular annulation, stereoselective epoxide ring-opening, and reductive amination with excess anisaldehyde. The obtained intermediate (29) was treated with XtalFluor-M and (HF)$_3$Et$_3$N to exclusively yield trans-isomer 30 in moderate yields in which an aziridinium mechanism pathway might be involved.[37] The direct conversion from di-PMB protected intermediate[30] to Boc-protected intermediate[31] was achieved by Pd(OH)$_2$ catalyzed hydrogenation in the presence of Boc$_2$O. Intermediate 31 was treated with PhSeCl and KHMDS, followed by oxidative elimination with m-CPBA to yield olefin isomers 32a and 32b, which were separated by chromatography and then deprotected to 8 and 10, respectively. On the basis of a previous report, alcohol 33[38] can be prepared from chirally pure 27; 33 was then oxidized by PCC to give ketone 34. After screening various fluorination reagents and reaction temperatures, key intermediate 35 was afforded in moderate yields, which avoided the production of monofluoroalkene impurities.[39] Using the same method used to make 8 and 10, intermediate 35 was converted to difluoroolefin isomers 36a and 36b, which were further deprotected to 9 and 11, respectively.

Scheme 3. Synthesis of Fluorine-Substituted Cyclohexene Derivatives 8-11[a]

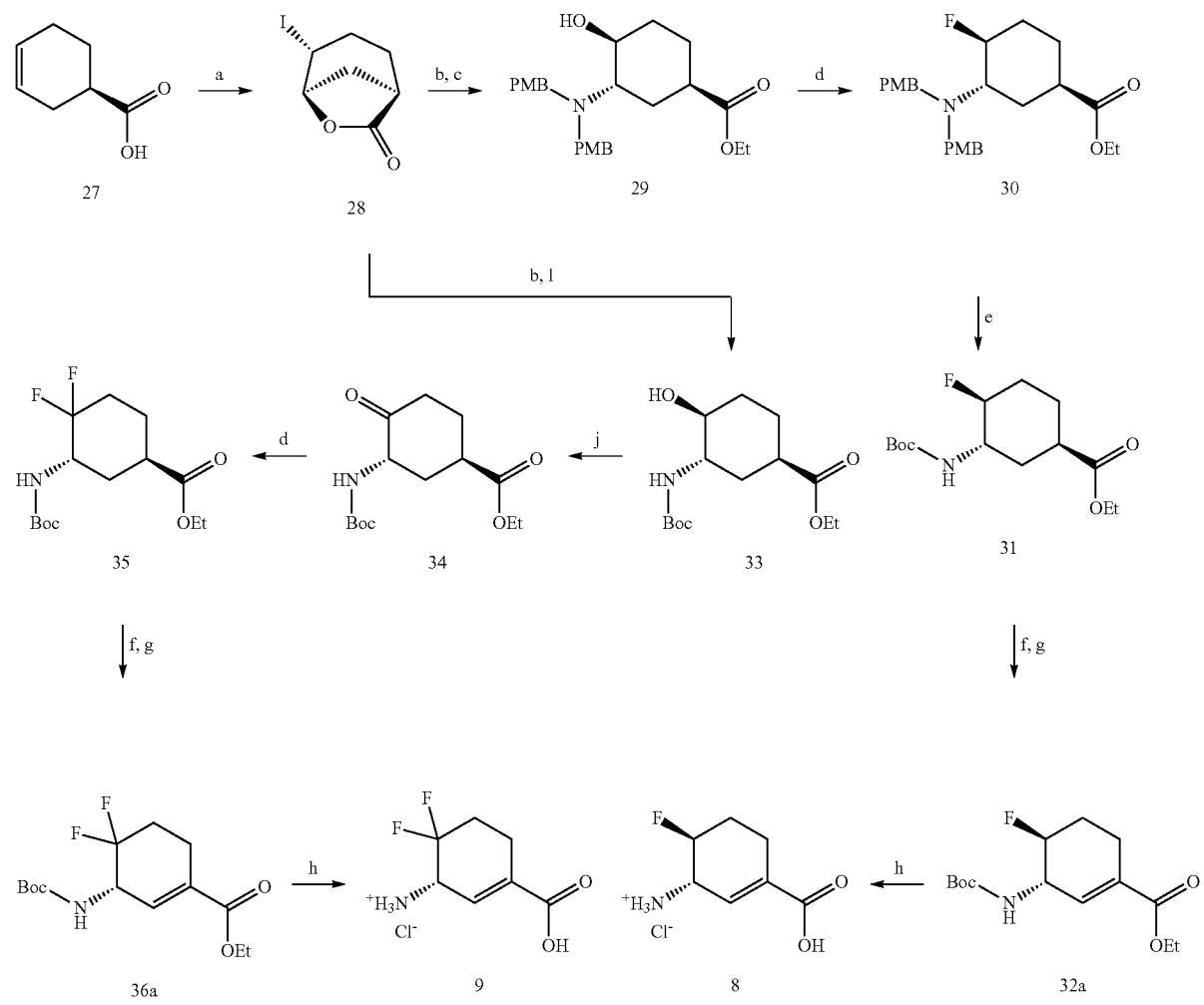

-continued

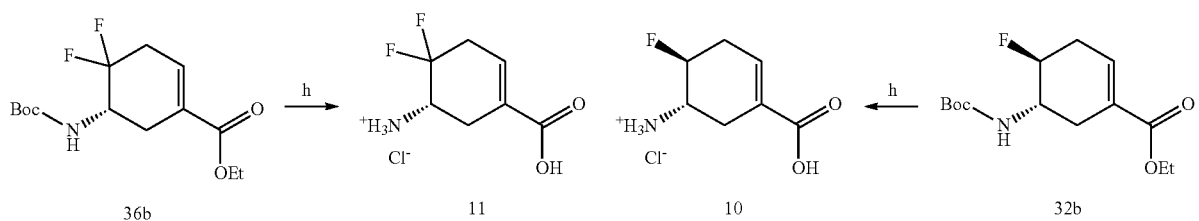

<sup>a</sup>Conditions: (a) NaHCO₃, I₂, KI, H₂O, 0° C. to r.t., overnight; (b) NaOH, EtOH, 0° C. to r.t., 3 h; then ammonia solution (28-30%), EtOH, 45° C., overnight; (c) 4-anisaldehyde, AcOH, NaBH(OAc)₃, DCE, 75° C., overnight; (d) XtalFluor-M, (HF)₃Et₃N, DCM, in a plastic container, r.t., overnight; (e) Pd(OH)₂, Boc₂O, MeOH, EtOAc, r.t., overnight; (f) PhSeCl, KHMDS (1M in THF), -78° C.; (g) m-CPBA, DCM, r.t., 2 h; (h) HCl (4M), AcOH, 80° C., overnight; (i) Boc₂O, EtOH, 0° C. to r.t., 5 h; (j) PCC, DCM, r.t., overnight.

Kinetic Studies of Fluorine-Substituted Cyclohexene Analogues. In vitro studies showed that fluorine-substituted cyclohexene analogues 8-11 inhibited hOAT with good selectivity over GABA-AT (Table 1). The results show that the six-membered ring analogues have a lower binding affinity to GABA-AT than 1 with much greater KI values, indicating that the larger ring size potentially interferes with binding interactions between the analogues and GABA-AT, which has a relatively small and rigid active site. The selectivity is consistent with our initial design strategy and docking results for the initial binding step (data not shown).

TABLE 1

Kinetic Constants for the Inactivation of hOAT and GABA-AT by 1, 7-11, and (S)-Vigabatrin[a]

| | hOAT | | | GABA-AT | | |
|---|---|---|---|---|---|---|
| Compound | $K_I$ (mM) | $k_{inact}$ (min⁻¹) | $k_{inact}/K_I$ (mM⁻¹min⁻¹) | $K_I$ (mM) | $k_{inact}$ (min⁻¹) | $k_{inact}/K_I$ (mM⁻¹min⁻¹) |
| 8 | 0.031 ± 0.007 | 0.080 ± 0.007 | 2.56 | 2.53 ± 0.71 | 0.098 ± 0.011 | 0.039 |
| 9 | 0.0023 ± 0.0007 | 0.048 ± 0.004 | 20.33 | >0.12[b] | >0.18[b] | 1.52 ± 0.09[b] |
| | | | | 1.1 ± 0.14[c] | 0.20 ± 0.001[c] | 0.18[c] |
| 10 | 4.38 ± 0.86 | 0.075 ± 0.005 | 0.017 | 4.28 ± 2.05 | 0.028 ± 0.005 | 0.0065 |
| 11 | 0.54 ± 0.017 | 0.083 ± 0.013 | 0.15 | >9.63[b] | >0.29[b] | 0.030 ± 0.001[b] |
| 1 | 1.40 ± 0.041 | 0.086 ± 0.01 | 0.06 | 0.078 ± 0.04 | 0.017 ± 0.002 | 0.22 |
| 7 | 0.065 ± 0.010 | 0.057 ± 0.003 | 0.87 | | | |
| (S)-vigabatrin | | | | 0.29 ± 0.09 | 0.21 ± 0.03 | 0.72 |
| | | | | 3.2[c,d] | 0.37[c,d] | 0.11[c,d] |

[a]$k_{inact}$ and $K_I$ values were determined by the equation: $k_{obs} = k_{inact}*[I]/(K_I + [I])$ and are presented as means and standard errors.
[b]Ratio of $k_{inact}/K_I$ was determined by the slope of $k_{obs} = k_{inact}*[I]/(K_I + [I])$. $k_{inact}$ is greater than maximum $k_{obs}$, which was determined in a time-dependent assay; $K_I$ is greater than $k_{obs}$ (max)/ratio.
[c]Assays tested at pH 6.5.
[d]Reference 40.

TABLE 2

Mass Difference of Proposed Adducts between Experimental and Theoretical Mass Values of Native/Modified hOAT

| Cmpd. | Mechanistic pathways | Adducts | Theoretical mass difference | Experimental mass of native hOAT[a] | Experimental mass of modified hOAT[a] | Experimental mass difference |
|---|---|---|---|---|---|---|
| 8 | a | 16a | 369.08 | 46136.79 ± 0.27 | 46506.08 ± 0.21 | 369.29 |
| | b | 20a | 0 | | | |
| | c | 22 | 368.06 or 138.03 | | | |
| 9 | a | 16b | 387.05 | 46138.32 ± 0.10 | 46504.66 ± 0.13 | 366.34 |
| | | 17 | 366.06 | | | |
| | b | 20b | 0 | | | |
| | c | 26 | 366.06 | | | |

[a]Values are presented as means and standard errors.

Figure 4:
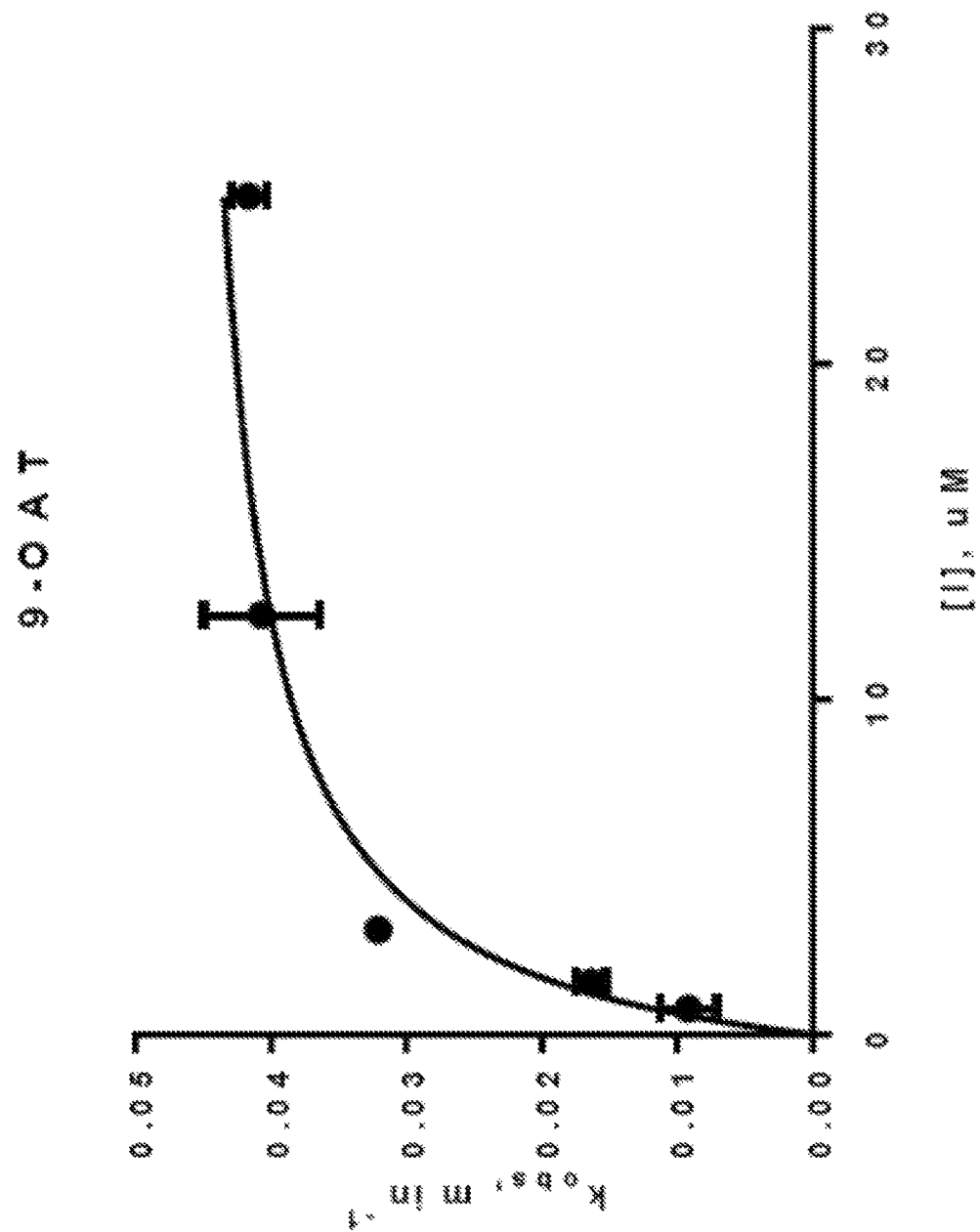
FIG. 4. Inhibitory activity of 9 against ornithine aminotransferase (OAT).
Figure 5:
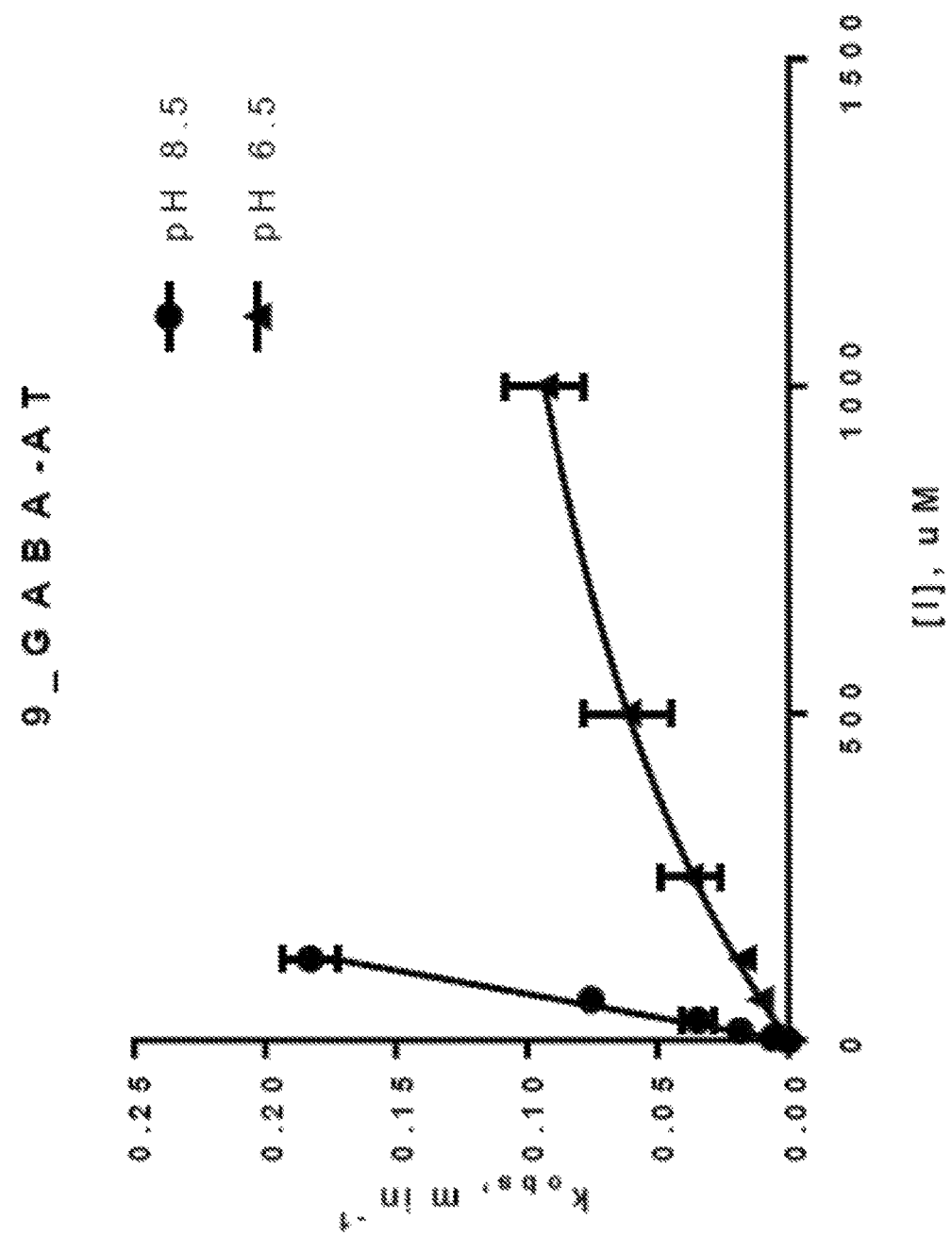
FIG. 5. Inhibitory activity of 9 against gamma-aminobutyric acid aminotransferase (GABA-AT).
Figure 6:
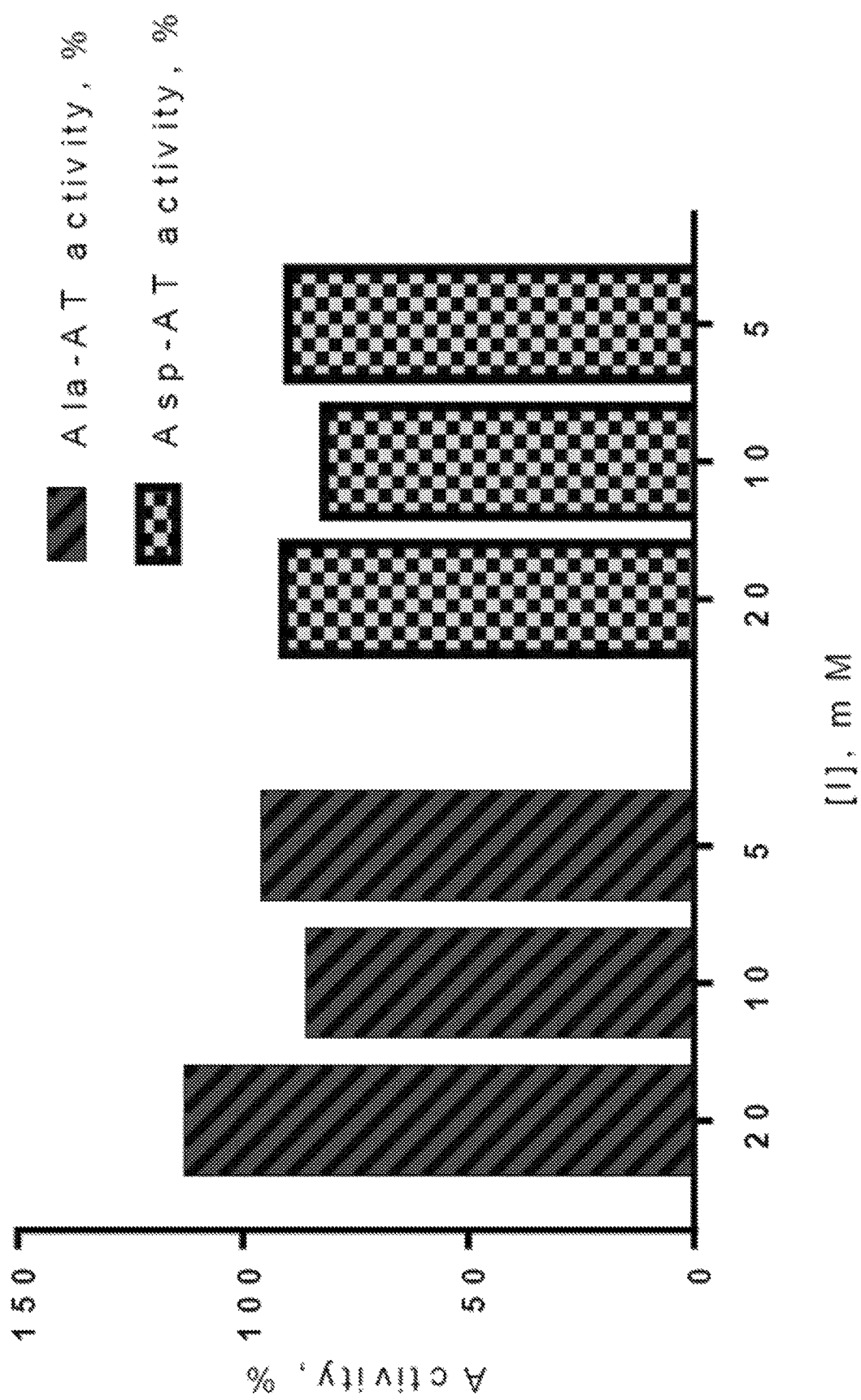
FIG. 6. Inhibitory activity of 9 against alanine aminotransferase and aspartic acid aminotransferase.

The introduction of a double bond at the α/β-position or another fluorine at the δ-position significantly enhances the inactivation efficiency against both hOAT and GABA-AT, which could possibly result from the reduced acidity of the γ-position or the change in inactivation mechanisms. Among them, the best compound (9, $k_{inact}/K_I=20.33$ min$^{-1}$mM$^{-1}$) is 23 times more efficient as an inactivator of hOAT than 7 ($k_{inact}/K_I=0.87$ min$^{-1}$mM$^{-1}$), which exhibited potent in vivo antitumor efficacy.[11] Moreover, 9 displayed good selectivity over GABA-AT with lower efficiency constants (pH 8.0, $k_{inact}/K_I=1.52$ min$^{-1}$mM$^{-1}$; pH 6.5, $k_{inact}/K_I=0.18$ min$^{-1}$mM$^{-1}$) and little or no inhibitory activities against aspartate aminotransferase (Asp-AT) and alanine aminotransferase (Ala-AT), even at high concentrations (5-20 mM, FIGS. 4, 5, and 6).

Inactivation mechanisms of 8 and 9 were studied for a better understanding of the capabilities of the aminotransferase and for future rational design of new inactivators. To determine if any of the aforementioned mechanisms (Scheme 2) are responsible for the inactivation of hOAT by 8 and 9, we carried out a series of experiments, including dialysis and fluoride ion release studies, and obtained protein mass spectra and crystal structures of the inactivated enzymes.

Figure 7:
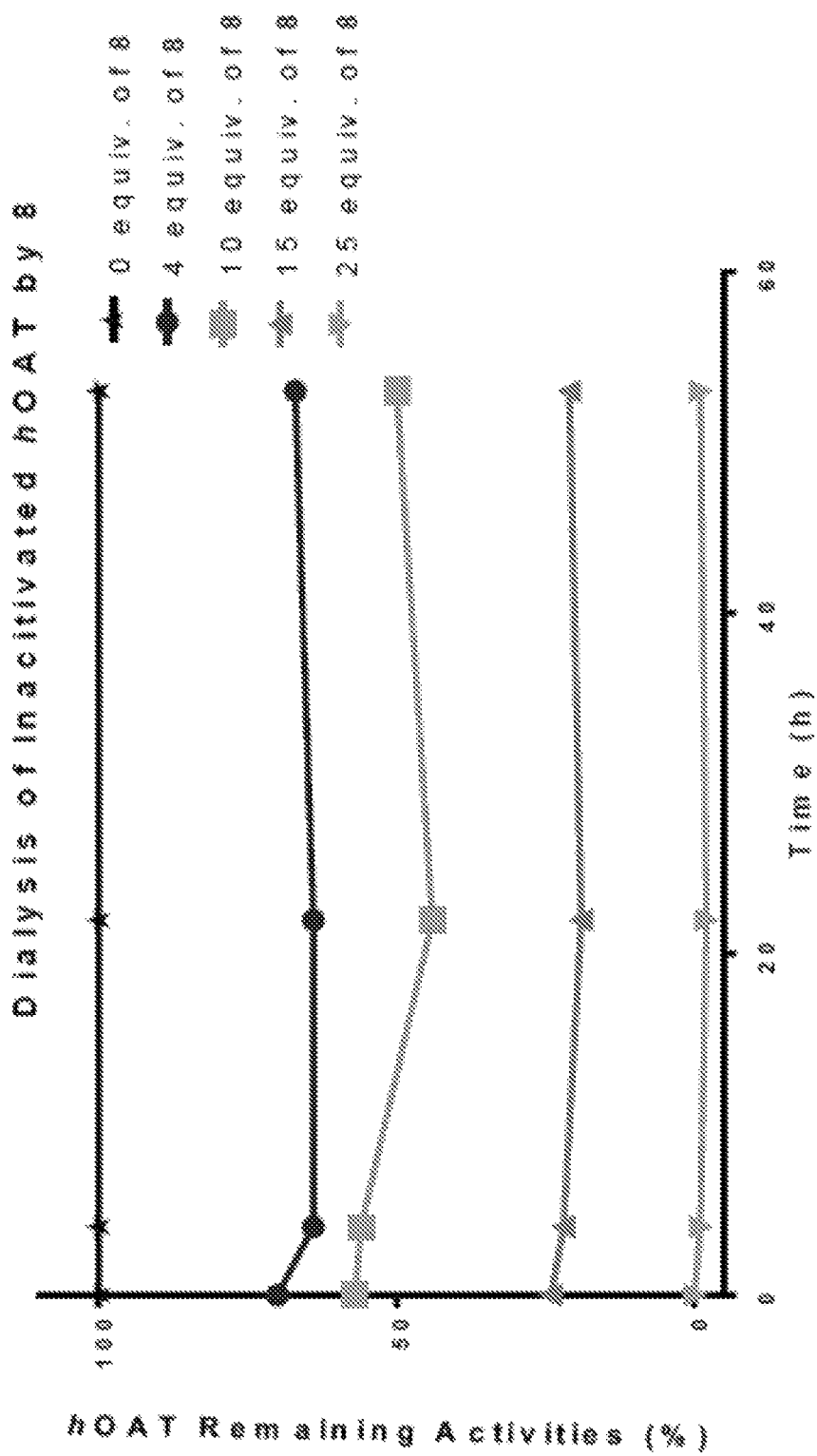
FIG. 7. Time-dependent dialysis of partially or fully inhibited hOAT by varying concentrations of 8.
Figure 8:
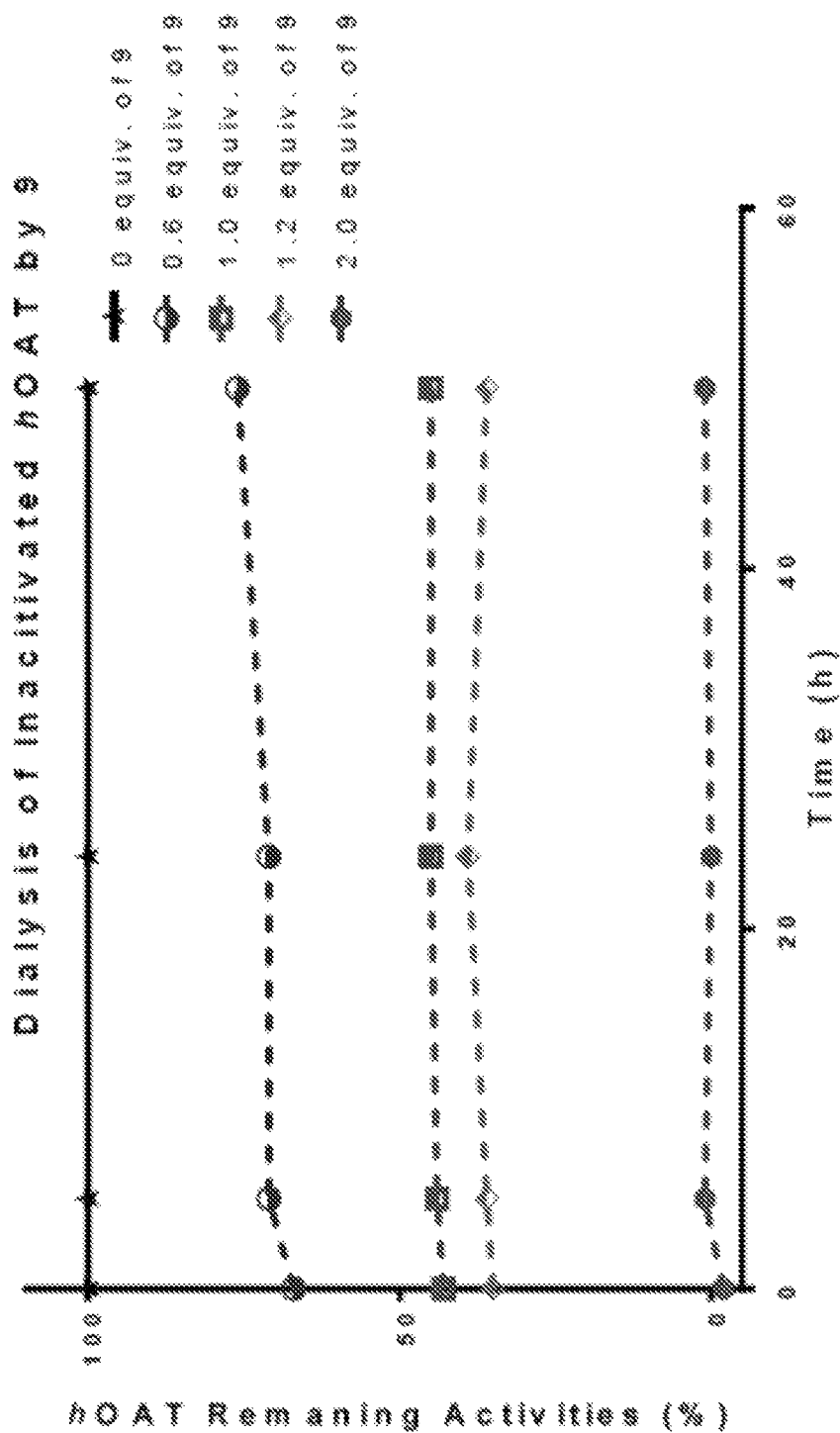
FIG. 8. Time-dependent dialysis of partially or fully inhibited hOAT by varying concentrations of 9.

Dialysis. Although 8 and 9 were designed to inactivate hOAT via a covalent or tight-binding mechanism, time-dependent reactivation of hOAT was carried out to determine if reversible components were also involved during the inactivation.[30] After hOAT activity was partially or fully abolished by 4-25 equiv of 8 or 0.6-2.0 equiv of 9, they were dialyzed, and aliquots at different time intervals were collected and assayed for return of enzyme activity. No enzyme activity was recovered after 48 h of dialysis (FIGS. 7 and 8), indicating complete irreversible inhibition of hOAT.

Intact Protein Mass Spectrometry of hOAT Modified by 8 or 9. Intact protein mass spectrometry has served as an efficient tool to determine the covalent adducts or tight binding adducts of modified aminotransferases.[31,41] Notably, the hydrolysis of imine groups and loss of PLP or PMP were commonly observed.[31] With the existing unstable groups in native hOAT or potential covalent adducts being taken into account, the theoretical mass differences were calculated as shown in Table 2. When hOAT was inactivated by 8, one modified species (46506.08±0.21 Da) was observed by mass spectrometry. A mass shift of +369.29 Da was observed, which corresponds to adduct 16a in pathway a (Scheme 2). In the case of 9, a mass shift of +366.34 Da was observed from the native enzyme (46138.32±0.10 Da) and one modified species (46504.66±0.13 Da) detected by mass spectrometry. This mass shift corresponds to either adduct 17 in pathway a or adduct 26 in pathway c (Scheme 2).

X-ray Crystallography of hOAT Inactivated by 8 or 9. Although a highly accurate mass shift of +369.29 Da was observed in the intact protein mass spectrum of hOAT inactivated by 8, there is only a 1.02 Da difference between adducts 16a and 22. In addition, it is difficult to distinguish adducts 17 and 26 by intact protein mass spectrometry of inactivated hOAT by 9. To better interpret the inactivation mechanism(s) for 8/9, protein crystallography of hOAT inactivated by 8/9 was conducted to confirm the adducts formed in the active site, respectively.

The structure of hOAT inactivated by 8/9 was solved by molecular replacement using a monomer from a previously reported structure of hOAT (PDB code 1OAT), after all water molecules and ligand atoms were deleted. For hOAT-8, in space group C121, one asymmetric unit was found to contain 3 monomers. Two monomers in the asymmetric unit formed a biological assembly as a homodimer. The third monomer formed a homodimer with another monomer present in another asymmetric unit. For hOAT-9, in space group P3112, one asymmetric unit was also found to contain 3 monomers. The biological assemblies can be observed through crystallographic symmetry. Final models for hOAT-8 and hOAT-9 were refined to a resolution of 2.20 and 1.90 Å, with RFree/Rwork values of 15.70%/19.90% and 27.49%/23.98%, respectively. Final refinement statistics are presented in Example 2, Table 3. A polder map[42] for each structure was generated by omitting PLP, ligand, and Lys292 (data not shown). The density for PLP was clearly represented in the polder map for both structures. Densities for 8 and 9 were also observed, clearly showing the presence of a ring and carboxylate moiety, as expected for the final adducts. The solved structures of hOAT-8/9 have been deposited in the PDB bank (PDB codes: 6V8D and 6V8C).

Ternary adducts were observed within both active sites of hOAT-8 and hOAT-9. Based on active sites comparison of inactivated hOAT-8 and hOAT-9, 8 and 9 react with and covalently link to both PLP and Lys292, albeit at different positions, each forming ternary adducts. In the hOAT-8 crystal structure, PLP and Lys292 are linked with the inactivator at a central carbon atom, affording 16a. This result agrees with the MS data and rules out 22 as the final adduct, where PLP and Lys292 form covalent bonds at different positions with the inactivator. Therefore, pathway a is the most probable mechanism of inactivation by 8, rather than pathway c (Scheme 2). In the hOAT-9 crystal structure, Lys292 and PLP form covalent bonds with the inactivator to give 26. No density was observed to suggest a fluorine atom remained on the adduct. The complete loss of fluorine and the presence of covalent bonds on the adduct thereby excludes pathway b (Scheme 2) as a possible mechanism for inactivation, as was concluded by intact protein mass spectrometry. The ternary adduct in the active site of hOAT-9 is linked at two separate positions along the ring, rather than at a central atom as in 17. The electron density generated by the polder map (Fo-Fc) completely encloses the C—N bond formed between the lysine and PLP, suggesting 9 inactivates hOAT via pathway c to 26 (Scheme 2). Furthermore, Thr322 is positioned at the center of the six-membered ring and appears to form a lone-pair-aromatic interaction[43] (2.9 Å) with the adduct (data not shown), which supports the formation of 26.

Figure 3:
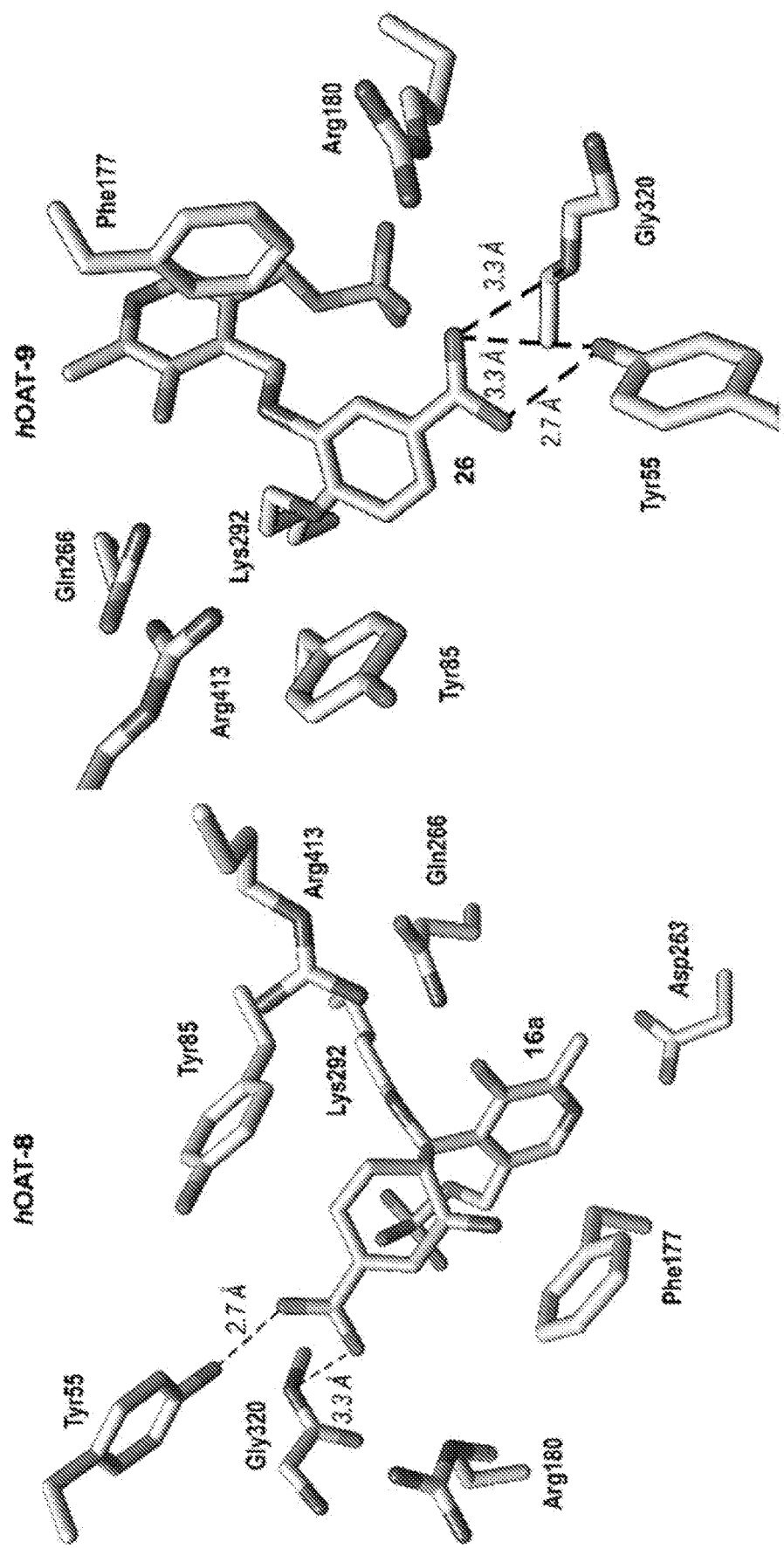
FIG. 3. Co-crystal structures of hOAT inactivated by 8 (left) and 9 (right)

As shown in FIG. 3 (right), both oxygen atoms on the carboxylate of 26 establish hydrogen bonds with Tyr55 (2.7 and 3.3 Å), whereas only one oxygen atom on the carboxylate of 16a (FIG. 3, left) was observed to engage in a hydrogen bond with Tyr55 (2.7 Å). The interaction with Tyr55 has precedence; there is a similar interaction in the crystal structure of inactivated hOAT-7.[31] The carboxylates of both 16a and 26 were observed to form an n-π* interaction with the peptide backbone of Gly320 (both 3.3 Å) but no interaction with Arg180, which is essential for native substrate recognition.[43] Tyr55 is a unique residue in the active site of hOAT, compared with that of GABA-AT, which is assumed to form a hydrogen bond with the α-amino group of ornithine.[44,45] The interaction of GABA analogues 8 and 9 with Tyr55 contributes to their high potency, even though they are one carbon less than the native substrate ornithine.

Turnover Mechanism. Previously, it was found that 1 can be converted to metabolites by aminotransferases, with the release of PLP or PMP.[27] Considering the structural similarity between 1 and 8/9, two possible turnover pathways are proposed, as shown in Scheme 4. Schiff base formation of PLP with 8/9 and subsequent lysine-assisted deprotonation yields intermediates 13a/13b. Intermediates 13a/13b could be converted to intermediates 37a/37b via direct protonation of the coenzyme. The formed imines could be further hydrolyzed with the release of PMP and metabolites 38a/38b. This PMP turnover mechanism is similar to the degradation of ornithine by hOAT. Intermediates 13a/13b also could undergo elimination of fluoride ion and hydrolysis of the imine with release of enamines 15a/15b, which could be hydrolyzed to afford ketones 39a/39b. In this PLP turnover mechanism, the regenerated PLP would further form Schiff bases with inactivators even in the absence of α-KG. To determine if any of the above turnover mechanisms are involved during the inactivation process of hOAT by 8 and 9, we carried out a partition ratio experiment, determination of fluoride ion release, and mass spectrometric analysis of metabolites for these two inactivators.

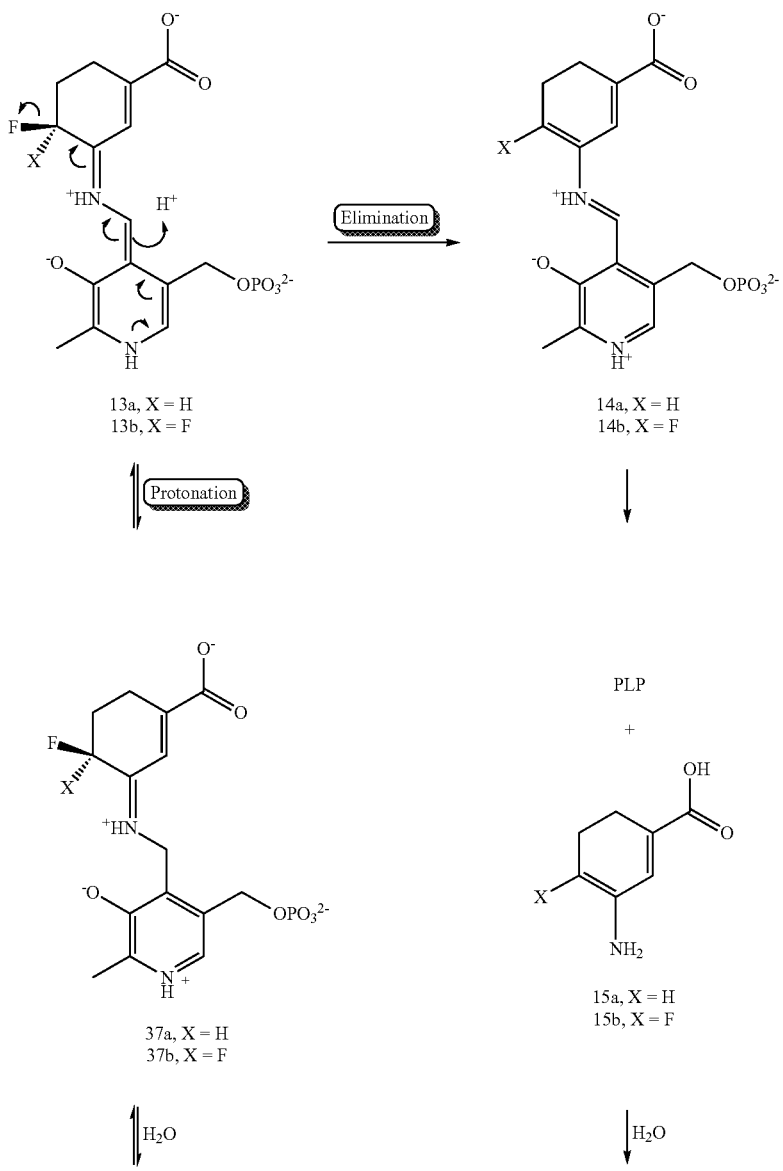

Scheme 4. Proposed Turnover Mechanism for 8 or 9 by hOAT

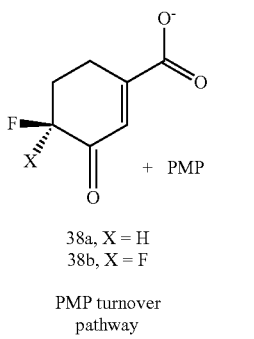

38a, X = H
38b, X = F

PMP turnover pathway

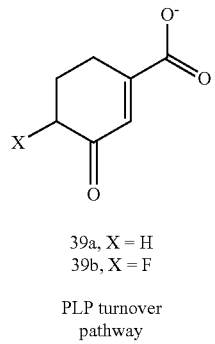

39a, X = H
39b, X = F

PLP turnover pathway

Figure 9:
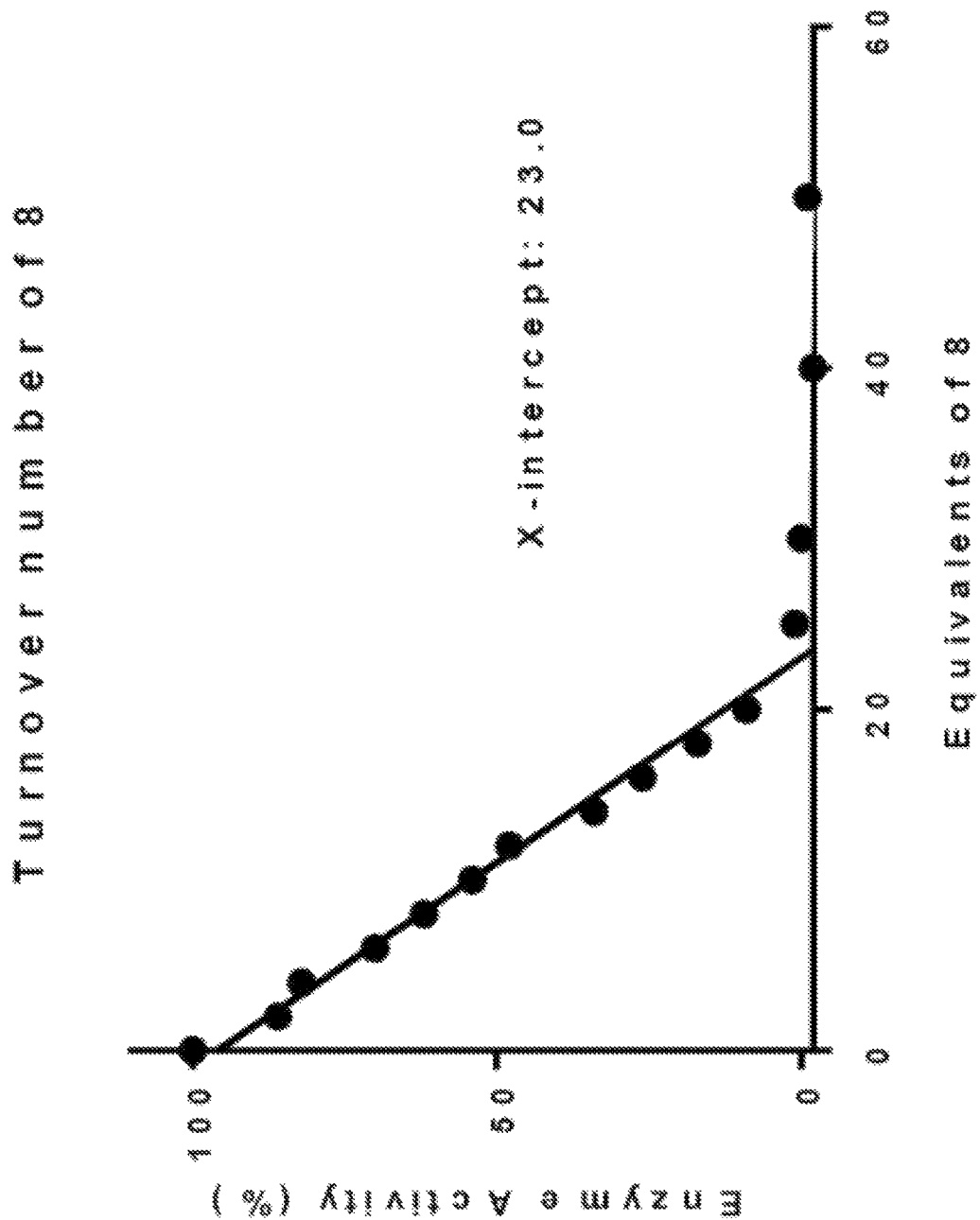
FIG. 9. Titration of an enzyme with a mechanism-based enzyme inactivator. The loss of enzyme activity is measured as a function of the ratio of inactivation to enzyme concentration. Linear regression was used on the linear portion of the curves to obtain the X-intercept, which is the turnover number (partition ratio=turnover number−1). Determination of the turnover number for 8.
Figure 10:
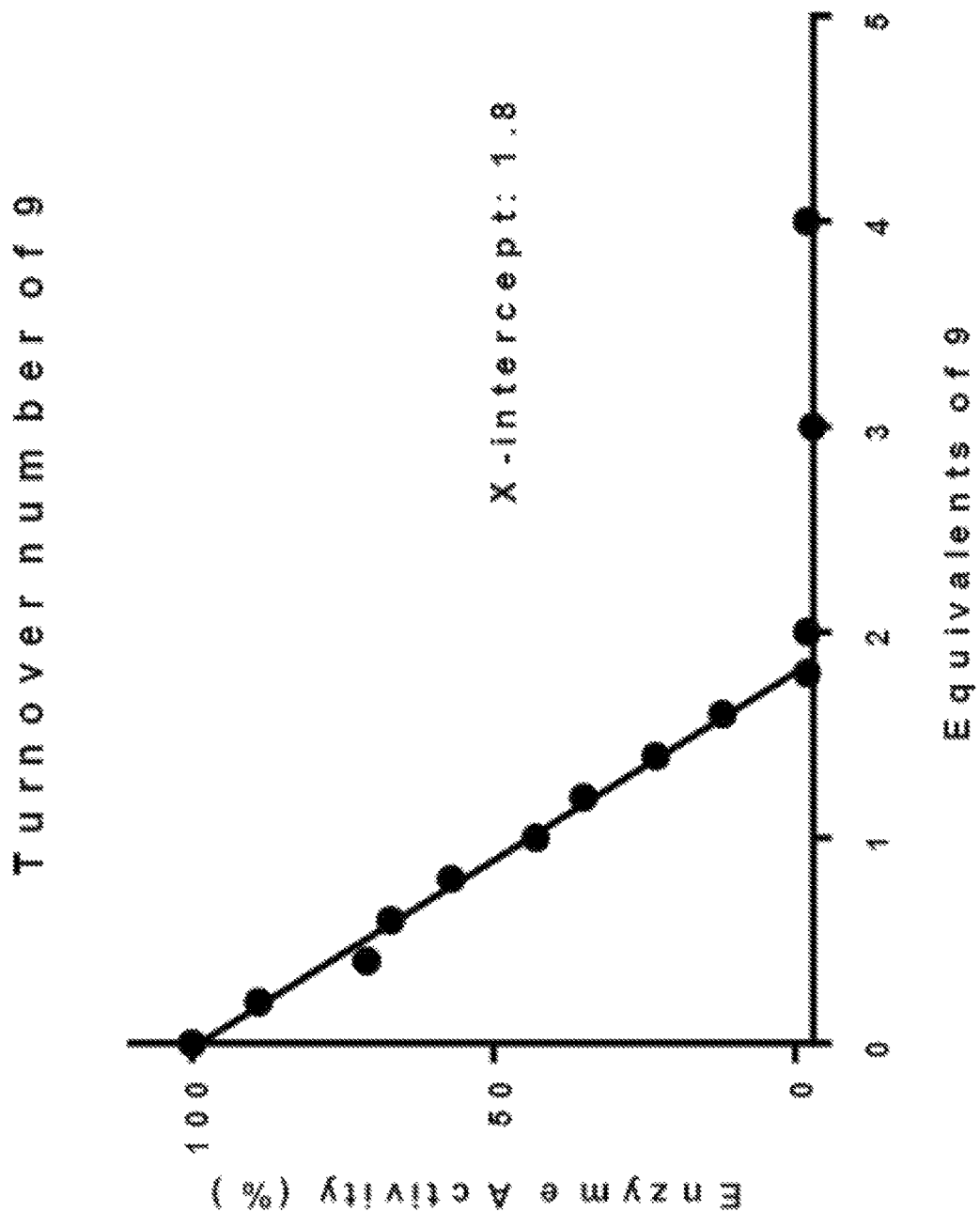
FIG. 10. Titration of an enzyme with a mechanism-based enzyme inactivator. The loss of enzyme activity is measured as a function of the ratio of inactivation to enzyme concentration. Linear regression was used on the linear portion of the curves to obtain the X-intercept, which is the turnover number (partition ratio=turnover number−1). Determination of the turnover number for 9.

Partition Ratio and Fluoride Release. The partition ratio is the ratio of the compound acting as a substrate relative to the compound inactivating the enzyme. Ideally, a plot of enzyme activity remaining vs equivalents of compounds added will give a straight line from 100 to 0% enzyme activity remaining. The intercept with the x-axis gives the number of inactivator molecules required to inactivate each enzyme molecule (the turnover number). This number includes the one molecule of inactivator required to inactivate the enzyme; consequently, the partition ratio is the turnover number minus one (assuming there is a 1:1 stoichiometry of inactivator to enzyme). Therefore, the partition ratios of 8/9 were determined by titrating the enzyme with varying equivalents of inactivator with a known amount of hOAT (FIGS. 9 and 10). The linear relationship was extrapolated to yield the exact equivalents required to inactivate the enzyme completely. From this, we determined the partition ratio of 8 to be 22.0 and the partition ratio of 9 to be 0.8.

Different equivalents of fluoride ions can be released in PLP and PMP turnover pathways.[29,31] In the absence of α-KG, if PMP is formed in the turnover mechanism, it cannot be converted back to PLP, which results in less than one equivalent of fluoride ion released. If PLP is regenerated during the turnover mechanism after fluoride ion is released, multiple equivalents of fluoride ions will be released. The number of fluoride ions released per enzyme turnover can be detected using a fluoride ion selective electrode. When hOAT is inactivated with an excess of 8 in the absence of α-KG, 22.7 equiv of fluoride ions were released per enzyme active site (Example 2, Table 4). In the case of 9, 2.9 equiv of fluoride ions were released per enzyme active site (Example 2, Table 4). These results indicate that turnover mechanisms of 8 and 9 must regenerate PLP as part of the turnover mechanism with the release of additional equivalents of fluoride ion before inactivation, which is consistent with their partition ratios, respectively.

Mass Spectrometry-Based Analysis of Metabolites. After size exclusion filtration of inactivated hOAT samples 8/9, the filtrate was analyzed by untargeted metabolomics (±ESI HRMS) to detect metabolites. Metabolites 39a (m/z 139.0393, [M–H]–1) and 39b (m/z 157.0301, [M–H]–1) in the PLP turnover pathway were detected and confirmed by their fragmentation spectra (data not shown). Standards of PLP and PMP were monitored by HRMS, and the HCD-based fragmentation of precursors was used to confirm metabolite detection and retention time (data not shown). In both samples of 8 and 9, only PLP was detected by mass spectrometry (m/z 248.0316, [M+H]+1); neither PMP nor adducts of PMP were observed (data not shown). Overall, metabolomic results indicate these two compounds undergo a similar PLP regeneration turnover mechanism (Scheme 4).

Plausible Mechanisms for 8 and 9 with hOAT. On the basis of the above inactivation and turnover mechanism studies, a modified mechanism pathway for inactivator 8 is shown in Scheme 5. Schiff base 12a is initially formed and subsequently deprotonated to afford intermediate 13a. On the basis of the fluoride ion release experiment and the metabolomics results, intermediate 13a is fully converted to intermediate 14a. Schiff base 14a is then attacked by Lys 292 at the PLP imine position instead of the conjugate olefin position. According to the partition ratio of 8, only 4% of active enamine 15a attacks the Lys-PLP complex for inactivation (pathway a), and 96% of that is hydrolyzed to yield 39a (pathway b).

Scheme 5. Plausible Mechanism for 8 with hOAT
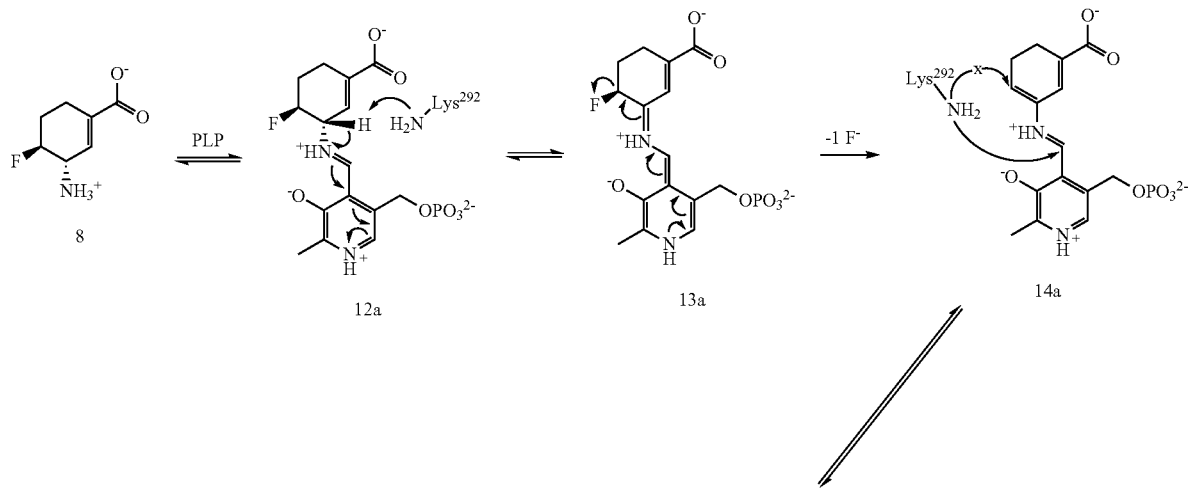
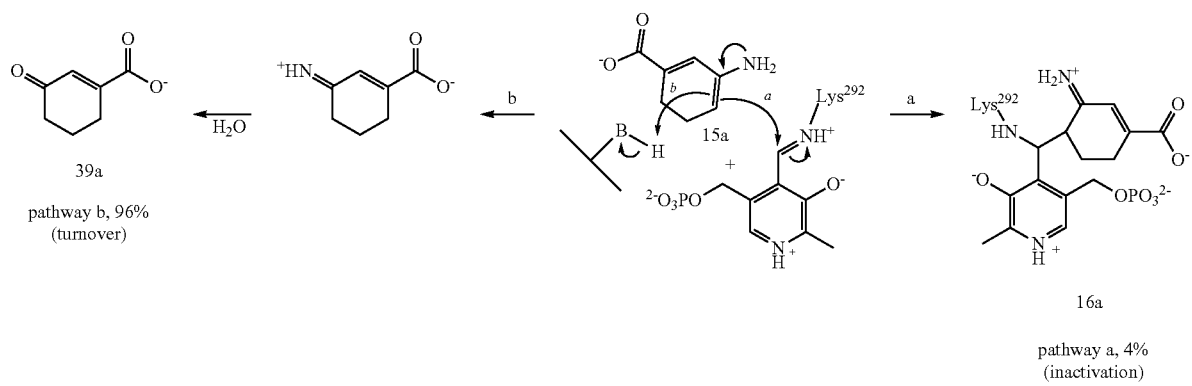
Scheme 6. Plausible Mechanism for 9 with hOAT
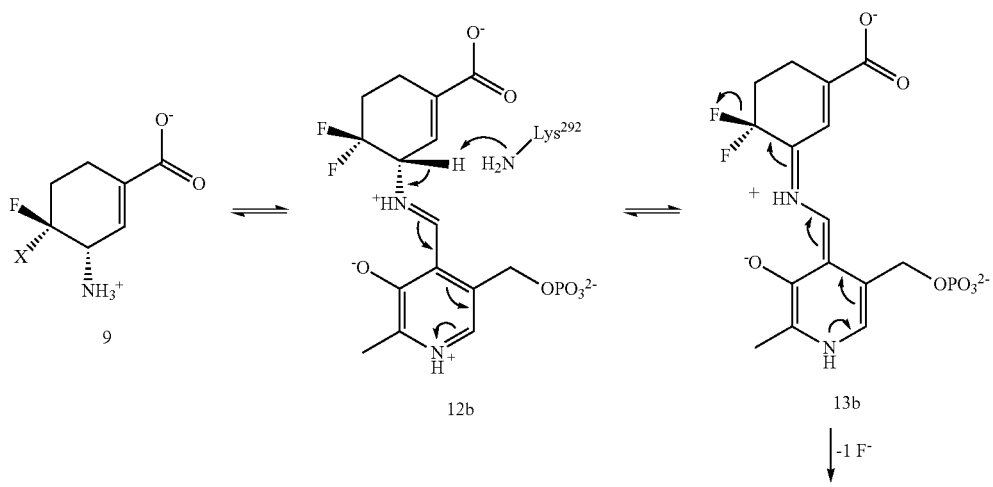

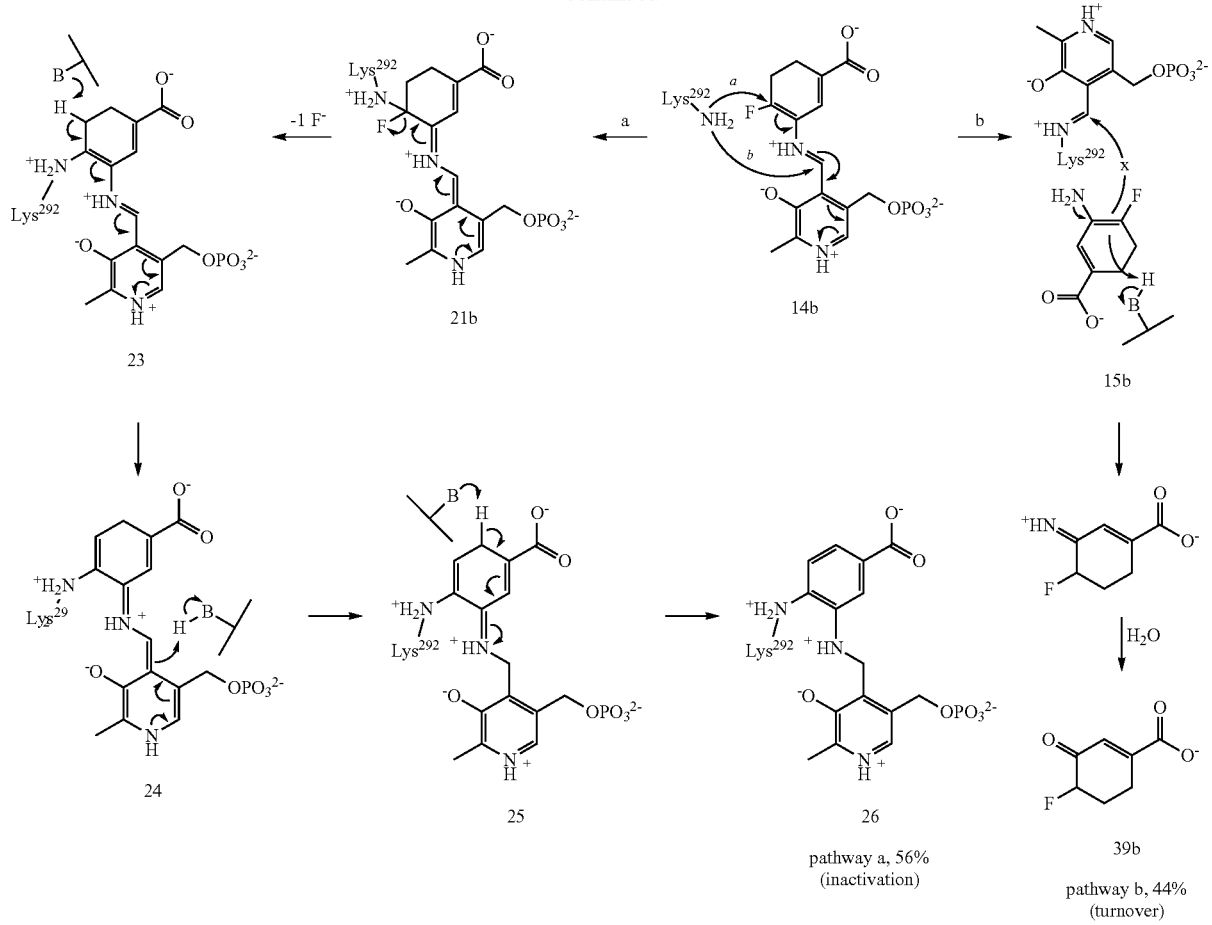

pathway a, 56% (inactivation)

pathway b, 44% (turnover)

As shown in in Scheme 6, a modified mechanism pathway for inactivator 9 is proposed. Although active intermediate 14b is formed via a similar fluoride ion release process, inactivation occurs by lysine addition at the conjugated double bond. The formed adduct is further converted to the more stable aromatic adduct (26; 56%, pathway a), and 44% of intermediate 14b is converted to inert enamine 15b, which does not attack the Lys-PLP complex, and is hydrolyzed to yield metabolite 39b instead (pathway b).

The structure of adduct 16a/26 was confirmed by intact protein MS and its crystal structure complex, and the corresponding metabolite 39a/39b was detected by mass-spectrometry, along with multiple equivalents of fluorine ion released. Taken together, the difference of a single fluorine atom results in different inactivation mechanism pathways for 8 (enamine pathway) and 9 (addition-aromatization pathway) but by the same turnover mechanism (PLP pathway).

Molecular Dynamics (MD) Simulations and Electrostatic Potential (ESP) Charge Calculations. Although very similar intermediates (14a/14b and 15a/15b) are formed during inactivation by 8 and 9, the resulting covalent adducts (16a and 26, respectively) are quite different. Previously, different inactivation mechanisms for alanine racemase inhibitors were demonstrated as a result of a different number of fluorines (one-fluorine vs three-fluorines).[46] For a better understanding of the impact the additional fluorine atom had on these intermediates, molecular docking/dynamics and ESP charge calculations were carried out to demonstrate their binding poses in the catalytic pocket of hOAT and reaction affinity with Lys292 or the Lys292-PLP complex.

Based on molecular docking studies, the docking poses of 14a and 14b are almost identical in the active site of hOAT, where Lys292 lies in the middle of two potential electrophilic sites: the carbon of the PLP imine moiety ($C_{4'}$) and the terminal carbon of the conjugated olefin ($C_\delta$) (data not shown). Molecular dynamics simulations were conducted to calculate the average distance between the nitrogen of the nucleophilic Lys292 ($N_{Lys}$) and the $C_{4'}/C_\delta$ positions of 14a/14b, respectively (data not shown). The average distance of $N_{Lys}$—$C_{4'}$ (4.3 Å) and $N_{Lys}$—$C_\delta$ (4.1 Å) in 14a is very similar, whereas the $C_{4'}$ of 14b is closer to the $N_{Lys}$(5.0 Å) than the $C_\delta$ of 14b (6.6 Å), with an average difference of 1.6 Å. The average dihedral angles between the cyclohexadiene rings and the pyridine rings were also monitored during the molecular dynamics simulations (data not shown). The average dihedral angle of 14b (−148.26°) is much closer to −180° (fully conjugated) than that of 14a (−91.64°; orthogonal and not in conjugation), indicating that the olefin in 14b has a greater propensity to conjugate with the pyridine ring. ESP charges and electron density/electrostatic potential maps for intermediates 14a/b and 15a/b were calculated to evaluate the impact of the additional fluorine atom (data not shown). The significant differences are demonstrated between $C_\delta$-14a (−0.28) and $C_\delta$-14b (+0.49) with the introduction of an additional fluorine atom, as well as $C_\delta$-15a (−0.70) and $C_\delta$-15b (+0.07), while the charge at $C_{4'}$-14a (+0.42) is close to that at $C_{4'}$-14b (+0.45). Therefore, from the molecular dynamics simulation (data not shown), the accessibility of Lys292 to $C_\delta$-14a and $C_{4'}$-14a is similar, but the dihedral angle (−91.64°) and carbon charges (−0.28 vs +0.42) significantly disfavor nucleophilic attack of Lys292 on the olefin of 14a; attack at $C_{4'}$ gives enamine 15a and leads to final adduct 16a (Scheme 5). In the case of 14b, the distance $N_{Lys}$—$C_{4'}$ is favored for nucleophilic attack of Lys at $C_{4'}$ of 14b relative to $C_\delta$ of 14b (5.0 Å vs 6.6 Å), but the electrophilicity of the $C_\delta$ of 14b is greatly enhanced by the additional fluorine atom, resulting in the generation of final adduct 26 and inactive enamine 15b, which gets protonated and hydrolyzed to 39b (Scheme 6). The additional fluorine atom in 15b significantly decreases its nucleophilicity, which prevents the formation of adducts 16b and 17 (Scheme 2). Both molecular docking/dynamics and ESP charge calculations clearly rationalize our observations during the inactivation of hOAT by 8 and 9.

Conclusions

Over the past few years, selective inhibition of human ornithine aminotransferase (hOAT) has been gradually recognized as a potential treatment for cancers, especially hepatocellular carcinoma (HCC).[11] On the basis of the known inactivation mechanism for nonselective inactivator 1,[31] a novel class of fluorine-substituted cyclohexene analogues (8-11) was rationally designed, with the aid of molecular dynamics simulations and docking, synthesized, and evaluated. Among them, analogues 8 and 9 showed significantly improved inhibitory activities against hOAT with excellent selectivity over GABA-AT, compared with 1 (Table 1). Inactivation pathways for 8 and 9 were elucidated by mass spectrometry and crystallography with the aid of a dialysis experiment, total turnover, and measurement of fluoride ion release. While monofluoro substituted analogue 8 inactivates hOAT via an enamine pathway (Scheme 2, pathway a), difluoro analogue 9 inactivates hOAT via a novel addition-aromatization mechanism (Scheme 2, pathway c), contributing to its significantly enhanced potency. Notably, strikingly accurate masses of intact protein were obtained with errors of less than 1 Da, thereby allowing the facile determination of adduct masses prior to their crystal structures (Table 2). Interestingly, despite the difference in inactivation mechanisms, the turnover mechanisms for 8 and 9 by hOAT are almost identical (Scheme 4, the PLP pathway), and the metabolites were identified with the aid of targeted mass spectrometry. The plausible inactivation and turnover mechanisms for 8 and 9, supported and rationalized by the use of molecular dynamics (MD) simulations and electrostatic potential (ESP) charge calculations, indicate that a single fluorine atom difference in molecules can control enzyme inactivation mechanisms.

REFERENCES (1) Sayiner, M.; Golabi, P.; Younossi, Z. M. Disease Burden of Hepatocellular Carcinoma: A Global Perspective. Dig. Dis. Sci. 2019, 64, 910-917.
(2) Personeni, N.; Rimassa, L. Hepatocellular Carcinoma: A Global Disease in Need of Individualized Treatment Strategies. J. Oncol. Pract. 2017, 13, 368-370.
(3) Sherman, M.; Bruix, J.; Porayko, M.; Tran, T.; Comm, A. P. G. Screening for hepatocellular carcinoma: The Rationale for the American Association for the Study of Liver Diseases Recommendations. Hepatology 2012, 56, 793-796.
(4) Yang, J. D.; Roberts, L. R. Hepatocellular carcinoma: a global view. Nat. Rev. Gastroenterol. Hepatol. 2010, 7, 448-458.
(5) Leathers, J. S.; Balderramo, D.; Prieto, J.; Diehl, F.; Gonzalez-Ballerga, E.; Ferreiro, M. R.; Carrera, E.; Barreyro, F.; Diaz-Ferrer, J.; Singh, D.; Mattos, A. Z.; Carrilho, F.; Debes, J. D. Sorafenib for Treatment of Hepatocellular Carcinoma A Survival Analysis From the South American Liver Research Network. J. Clin. Gastroenterol. 2019, 53, 464-469.
(6) de Rosamel, L.; Blanc, J. F. Emerging Tyrosine Kinase Inhibitors for the Treatment of Hepatocellular Carcinoma. Expert Opin. Emerging Drugs 2017, 22, 175-190.
(7) Milgrom, D. P.; Maluccio, M. A.; Koniaris, L. G. Management of Hepatocellular Carcinoma (HCC). Curr. Surg. Rep. 2016, 4, 1-8.
(8) de Lope, C. R.; Tremosini, S.; Forner, A.; Reig, M.; Bruix, J. Management of HCC. J. Hepatol. 2012, 56, S75-S87.
(9) Herzfeld, A.; Knox, W. E. Properties Developmental Formation and Estrogen Induction of Ornithine Aminotransferase in Rat Tissues. Biochem. J. 1968, 243, 3327-3332.
(10) Ginguay, A.; Cynober, L.; Curis, E.; Nicolis, I. Ornithine Aminotransferase, an Important Glutamate-Metabolizing Enzyme at the Crossroads of Multiple Metabolic Pathways. Biology (Basel, Switz.) 2017, 6, 18.
(11) Zigmond, E.; Ya'acov, A. B.; Lee, H.; Lichtenstein, Y.; Shalev, Z.; Smith, Y.; Zolotarov, L.; Ziv, E.; Kalman, R.; Le, H. V.; Lu, H.; Silverman, R. B.; Ilan, Y. Suppression of Hepatocellular Carcinoma by Inhibition of Overexpressed Ornithine Aminotransferase. ACS Med. Chem. Lett. 2015, 6, 840-844.
(12) Herzfeld, A.; Knox, W. E. The Properties, Developmental Formation, and Estrogen Induction of Ornithine Aminotransferase in Rat Tissues. J. Biol. Chem. 1968, 243, 3327-3332.
(13) De Ingeniis, J.; Ratnikov, B.; Richardson, A. D.; Scott, D. A.; Aza-Blanc, P.; De, S. K.; Kazanov, M.; Pellecchia, M.; Ronai, Z.; Osterman, A. L.; Smith, J. W. Functional Specialization in Proline Biosynthesis of Melanoma. PLoS One 2012, 7, e45190.
(14) Phang, J. M.; Donald, S. P.; Pandhare, J.; Liu, Y. M. The Metabolism of Proline, a Stress Substrate, Modulates Carcinogenic Pathways. Amino Acids 2008, 35, 681-690.
(15) Phang, J. M.; Liu, W.; Hancock, C. N.; Fischer, J. W. Proline Metabolism and Cancer: Emerging Links to Glutamine and Collagen. Curr. Opin. Clin. Nutr. Metab. Care 2015, 18, 71-77.
(16) Phang, J. M.; Liu, W.; Zabirnyk, O. Proline Metabolism and Microenvironmental Stress. Annu. Rev. Nutr. 2010, 30, 441-463.
(17) Phang, J. M.; Liu, W.; Hancock, C.; Christian, K. J. The Proline Regulatory Axis and Cancer. Front. Oncol. 2012, 2, 60.
(18) Tang, L.; Zeng, J.; Geng, P. Y.; Fang, C. N.; Wang, Y.; Sun, M. J.; Wang, C. S.; Wang, J.; Yin, P. Y.; Hu, C. X.; Guo, L.; Yu, J. E.; Gao, P.; Li, E. Y.; Zhuang, Z. P.; Xu, G. W.; Liu, Y. Global Metabolic Profiling Identifies a Pivotal Role of Proline and Hydroxyproline Metabolism in Supporting Hypoxic Response in Hepatocellular Carcinoma. Clin. Cancer Res. 2018, 24, 474-485.

(19) Heiden, M. G. V.; Cantley, L. C.; Thompson, C. B. Understanding the Warburg Effect: The Metabolic Requirements of Cell Proliferation. Science 2009, 324, 1029-1033.

(20) Colnot, S.; Decaens, T.; Niwa-Kawakita, M.; Godard, C.; Hamard, G.; Kahn, A.; Giovannini, M.; Perret, C. Liver-targeted Disruption of Apc in Mice Activates beta-Catenin Signaling and Leads to Hepatocellular Carcinomas. Proc. Natl. Acad. Sci. U.S.A 2004, 101, 17216-17221.

(21) Cadoret, A.; Ovejero, C.; Terris, B.; Souil, E.; Levy, L.; Lamers, W. H.; Kitajewski, J.; Kahn, A.; Perret, C. New Targets of beta-Catenin Signaling in the Liver are Involved in the Glutamine Metabolism. Oncogene 2002, 21, 8293-8301.

(22) Liu, Y. F.; Wu, L.; Li, K.; Liu, F. R.; Wang, L.; Zhang, D. L.; Zhou, J.; Ma, X.; Wang, S. Y.; Yang, S. Y. Ornithine Aminotransferase Promoted the Proliferation and Metastasis of Non-small cell Lung Cancer via Upregulation of miR-21. J. Cell. Physiol. 2019, 234, 12828-12838.

(23) Markova, M.; Peneff, C.; Hewlins, M. J. E.; Schirmer, T.; John, R. A. Determinants of Substrate Specificity in omega-Aminotransferases. J. Biol. Chem. 2005, 280, 36409-36416.

(24) Mehta, P. K.; Hale, T. I.; Christen, P. Aminotransferases—Demonstration of Homology and Division into Evolutionary Subgroups. Eur. J. Biochem. 1993, 214, 549-561.

(25) Silverman, R. B. Design and Mechanism of GABA Aminotransferase Inactivators. Treatments for Epilepsies and Addictions. Chem. Rev. 2018, 118, 4037-4070.

(26) Silverman, R. B. Mechanism-Based Enzyme Inactivators. Methods Enzymol. 1995, 249, 240-283.

(27) Mascarenhas, R.; Le, H. V.; Clevenger, K. D.; Lehrer, H. J.; Ringe, D.; Kelleher, N. L.; Silverman, R. B.; Liu, D. Selective Targeting by a Mechanism-Based Inactivator against Pyridoxal 5'-Phosphate-Dependent Enzymes: Mechanisms of Inactivation and Alternative Turnover. Biochemistry 2017, 56, 4951-4961.

(28) Storici, P.; Qiu, J.; Schirmer, T.; Silverman, R. B. Mechanistic crystallography. Mechanism of inactivation of gamma-Aminobutyric Acid Aminotransferase by (1R, 3S,4S)-3-Amino-4-fluorocyclopentane-1-carboxylic Acid as Elucidated by Crystallography. Biochemistry 2004, 43, 14057-14063.

(29) Juncosa, J. I.; Takaya, K.; Le, H. V.; Moschitto, M. J.; Weerawarna, P. M.; Mascarenhas, R.; Liu, D. L.; Dewey, S. L.; Silverman, R. B. Design and Mechanism of (S)-3-Amino-4-(difluoromethylenyl)cyclopent-1-ene-1-carboxylic Acid, a Highly Potent gamma-Aminobutyric Acid Aminotransferase Inactivator for the Treatment of Addiction. J. Am. Chem. Soc. 2018, 140, 2151-2164.

(30) Pan, Y.; Gerasimov, M. R.; Kvist, T.; Wellendorph, P.; Madsen, K. K.; Pera, E.; Lee, H.; Schousboe, A.; Chebib, M.; Brauner-Osborne, H.; Craft, C. M.; Brodie, J. D.; Schiffer, W. K.; Dewey, S. L.; Miller, S. R.; Silverman, R. B. (1S,3S)-3-Amino-4-difluoromethylenyl-1-cyclopentanoic Acid (CPP-115), a Potent gamma-Aminobutyric Acid Aminotransferase Inactivator for the Treatment of Cocaine Addiction. J. Med. Chem. 2012, 55, 357-366.

(31) Moschitto, M. J.; Doubleday, P. F.; Catlin, D. S.; Kelleher, N. L.; Liu, D.; Silverman, R. B. Mechanism of Inactivation of Ornithine Aminotransferase by (1S,3S)-3-Amino-4-(hexafluoropropan-2-ylidenyl)cyclopentane-1-carboxylic Acid. J. Am. Chem. Soc. 2019, 141, 10711-10721.

(32) Lee, H.; Juncosa, J. I.; Silverman, R. B. Ornithine Aminotransferase versus GABA Aminotransferase: Implications for the Design of New Anticancer Drugs. Med. Res. Rev. 2015, 35, 286-305.

(33) Bey, P.; Gerhart, F.; Jung, M. Synthesis of (E)-4-Amino-2,5-Hexadienoic Acid and (E)-4-Amino-5-Fluoro-2-Pentenoic Acid—Irreversible Inhibitors of 4-Aminobutyrate-2-Oxoglutarate Aminotransferase. J. Org. Chem. 1986, 51, 2835-2838.

(34) Wang, Z. Y.; Yuan, H.; Nikolic, D.; Van Breemen, R. B.; Silverman, R. B. (±)-(1S, 2R, 5S)-5-amino-2-fluorocyclohex-3-enecarboxylic acid. A Potent GABA Aminotransferase Inactivator that Irreversibly Inhibits via an Elimination-aromatization pathway. Biochemistry 2006, 45, 14513-14522.

(35) Jones, G.; Willett, P.; Glen, R. C.; Leach, A. R.; Taylor, R. Development and Validation of a Genetic Algorithm for Flexible Docking. J. Mol. Biol. 1997, 267, 727-748.

(36) Qiu, J.; Silverman, R. B. A New Class of Conformationally Rigid Analogues of 4-amino-5-Halopentanoic Acids, Potent Inactivators of gamma-Aminobutyric Acid Aminotransferase. J. Med. Chem. 2000, 43, 706-720.

(37) Metro, T. X.; Duthion, B.; Pardo, D. G.; Cossy, J. Rearrangement of beta-Amino Alcohols via Aziridiniums: a review. Chem. Soc. Rev. 2010, 39, 89-102.

(38) Wang, X.; Ma, M. L.; Reddy, A. G. K.; Hu, W. H. An Efficient Stereoselective Synthesis of Six Stereoisomers of 3, 4-diaminocyclohexane carboxamide as Key Intermediates for the Synthesis of Factor Xa inhibitors. Tetrahedron 2017, 73, 1381-1388.

(39) Beaulieu, F.; Beauregard, L. P.; Courchesne, G.; Couturier, M.; LaFlamme, F.; L'Heureux, A. Aminodifluorosulfinium Tetrafluoroborate Salts as Stable and Crystalline Deoxofluorinating Reagents. Org. Lett. 2009, 11, 5050-5053.

(40) Pan, Y.; Qiu, J.; Silverman, R. B. Design, Synthesis, and Biological Activity of a Difluoro-substituted, Conformationally Rigid Vigabatrin Analogue as a Potent gamma-Aminobutyric Acid Aminotransferase Inhibitor. J. Med. Chem. 2003, 46, 5292-5293.

(41) Lee, H.; Doud, E. H.; Wu, R.; Sanishvili, R.; Juncosa, J. I.; Liu, D. L.; Kelleher, N. L.; Silverman, R. B. Mechanism of Inactivation of gamma-Aminobutyric Acid Aminotransferase by (1S,3S)-3-Amino-4-difluoromethylene-1-cyclopentanoic Acid (CPP-115). J. Am. Chem. Soc. 2015, 137, 2628-2640.

(42) Liebschner, D.; Afonine, P. V.; Moriarty, N. W.; Poon, B. K.; Sobolev, O. V.; Terwilliger, T. C.; Adams, P. D. Polder Maps: Improving OMIT Maps by Excluding Bulk Solvent. Acta. Crystallogr. D 2017, 73, 148-157.

(43) Egli, M.; Sarkhel, S. Lone pair-aromatic Interactions: To Stabilize or not to Stabilize. Acc. Chem. Res. 2007, 40, 197-205.

(44) Montioli, R.; Paiardini, A.; Giardina, G.; Zanzoni, S.; Cutruzzola, F.; Cellini, B.; Voltattorni, C. B. R180T Variant of delta-Ornithine Aminotransferase Associated with Gyrate Atrophy: Biochemical, Computational, X-ray and NMR Studies Provide Insight into its Catalytic Features. FEBS J. 2019, 286, 2787-2798.

(45) Storici, P.; Capitani, G.; Muller, R.; Schirmer, T.; Jansonius, J. N. Crystal Structure of Human Ornithine Aminotransferase Complexed with the Highly Specific and Potent Inhibitor 5-Fluoromethylornithine. J. Mol. Biol. 1999, 285, 297-309.

(46) Faraci, W. S.; Walsh, C. T. Mechanism of Inactivation of Alanine Racemase by β, β, β-Trifluoroalanine. Biochemistry 1989, 28, 431-437.

Example 2—Supplemental Material for Example 1

General Synthetic Methods.

All chemicals were purchased from Sigma Aldrich, Acros Organics, or Combi-block and used without further purification. Anhydrous solvents (THF) were purified before use by passing through a column composed of activated alumina and a supported copper redox catalyst. Yields refer to chromatographically homogeneous materials. Analytical thin-layer chromatography (TLC) was performed using Merck Silica Gel 60 Å F-254 precoated plates (0.25 mm thickness), and components were visualized by ultraviolet light (254 nm) and/or ceric ammonium molybdate stain and/or ninhydrin stain. Flash column chromatography was performed on a Teledyne Combiflash Rf Plus automated flash purification system with various Taledyne cartridges (4-80 g, 40-63 μm, 60 Å). Purifications were performed with hexanes and ethyl acetate unless otherwise noted. 1H and 13C NMR spectra were recorded on a Bruker Avance-III NMR spectrometer at 500 MHz and 126 MHz, respectively, in CDCl3, CD3OD or DMSO-d6. Chemical shifts were reported in ppm; multiplicities are indicated by s=singlet, d=doublet, t=triplet, q=quartet, dd=doublet of doublet, dt=doublet of triplet, dq=doublet of quartet, m=multiplet resonance. Coupling constants 'J' were reported in Hz. High-resolution mass spectral data were obtained on an Agilent 6210 LC-TOF spectrometer in the positive ion mode using electrospray ionization with an Agilent G1312A HPLC pump and an Agilent G1367B autoinjector at the Integrated Molecular Structure Education and Research Center (IMSERC), Northwestern University. Analytical HPLC was performed using a reversed-phase Agilent Infinity 1260 HPLC with a Phenomenex Kintex C-18 column (50×2.1 mm, 2.6 μm), detecting with UV absorbance at 254 nm.

(1R,4R,5R)-4-Iodo-6-oxabicyclo[3.2.1]octan-7-one (28). To a stirred solution of NaHCO$_3$ (15.98 g, 190.74 mmol, 3.0 equiv) in water (200 mL) was added (R)-cyclohex-3-ene-1-carboxylic acid 27 (8 g, 63.41 mmol, 1.0 equiv) slowly in an ice bath. KI (52.36 g, 317.07 mmol, 5.0 equiv) and I2 (17.7 g, 69.76 mmol, 1.1 equiv) were added portionwise. The ice bath was removed after 30 min and stirred at r.t. overnight. The reaction was quenched with sat. Na2S2O3 (aq. 150 mL) and extracted with EtOAc (200 mL) three times. The combined organic phase was washed with brine (10 mL) and dried with anhydrous Na2SO4. The solution was concentrated to give a brown solid, which was dispensed in hexane (100 mL) and stirred for 3 h. The suspension was filtered to give a pale brown powder (29, 15.2 g, 95%). 1H NMR (500 MHz, CDCl3) δ 4.82 (dd, J=5.9, 4.2 Hz, 1H), 4.50 (t, J=5.0 Hz, 1H), 2.79 (d, J=12.3 Hz, 1H), 2.67 (s, 1H), 2.48-2.35 (m, 2H), 2.11 (dd, J=16.5, 5.3 Hz, 1H), 1.90 (tdd, J=13.0, 5.4, 2.1 Hz, 1H), 1.82 (dt, J=12.8, 5.4 Hz, 1H). 13C NMR (126 MHz, CDCl3) δ 177.9, 80.4, 38.7, 34.6, 29.9, 23.9, 23.3. LRMS (APCI) (M+H+). 252.85.

Ethyl (1R,3S,4S)-3-(bis(4-methoxybenzyl)amino)-4-hydroxycyclohexane-1-carboxylate (29). A suspension of 28 (28.7 g, 118.9 mmol, 1.0 equiv) in EtOH (100 mL) was stirred in an ice bath. A solution of NaOH (2M, 65 mL, 130.8 mmol, 1.1 equiv) was added dropwise. The ice bath was removed after the addition, and the solution was stirred at r.t. for 4 h. The solution was concentrated below 40° C., diluted with water (100 mL), and extracted with DCM (200 mL) 3 times. The combined organic phase was washed with water (100 mL) and brine (100 mL) and dried with anhydrous Na2SO4. The solution was concentrated to give a brown oil (15.3 g). To a solution of the obtained brown oil (10.5 g) in EtOH (50 mL) was added aqueous ammonia (28-30%, 100 mL). The solution was heated to 45° C. and stirred overnight. The completion of reaction was determined by LC-MS. The solution was concentrated to give the crude amino alcohol intermediate (11.1 g). To a solution of the crude intermediate (6.0 g, 32.04 mmol, 1.0 equiv) in DCE (200 mL) was added 4-anisaldehyde (13.1 g, 96.13 mmol, 3.0 equiv) and AcOH (5.77 g, 96.13 mmol, 3.0 equiv). The solution was heated to 75° C. and stirred for 1 h. To this solution was added NaBH(OAc)3 (20.37 g, 96.13 mmol, 3.0 equiv) portion wise over 2 h. The resulting mixture was stirred at 75° C. overnight. The completion of the reaction was determined by LC-MS. The mixture was cooled to r.t. and diluted with DCM (200 mL) and water (200 mL). After being stirred for 10 min, the organic phase was separated and then washed sequentially with water (200 mL), NaHCO$_3$ (aq. 200 mL), and brine (100 mL). The organic phase was dried with anhydrous Na2SO4. The solution was concentrated and purified by silica gel chromatography (50% EtOAc in hexane) to afford a white solid (29, 6.297 g, 35% for three steps). 1H NMR (500 MHz, CDCl3) δ 7.17 (d, J=8.5 Hz, 4H), 6.84 (d, J=8.6 Hz, 4H), 4.17 (dq, J=10.8, 7.1 Hz, 1H), 4.07 (dq, J=10.8, 7.1 Hz, 1H), 3.79 (s, 1H), 3.78 (s, 6H), 3.74 (d, J=13.1 Hz, 2H), 3.63 (s, 1H), 3.47 (td, J=10.4, 4.5 Hz, 1H), 3.31 (d, J=13.0 Hz, 2H), 2.80 (dp, J=4.9, 2.2 Hz, 1H), 2.53 (ddd, J=12.7, 9.8, 3.4 Hz, 1H), 2.47 (dq, J=12.9, 2.7 Hz, 1H), 2.17 (dp, J=14.0, 3.1 Hz, 1H), 1.97 (dq, J=11.6, 3.4 Hz, 1H), 1.50-1.42 (m, 2H), 1.23 (t, J=7.1 Hz, 3H). 13C NMR (126 MHz, CDCl3) δ 174.1, 158.8, 131.5, 130.3, 113.9, 68.7, 60.7, 60.3, 55.3, 52.6, 39.6, 30.1, 25.1, 23.5, 14.4. HRMS (ESI) calc'd for C25H34NO5 (M+H+): 428.2431, found: 428.242.

Ethyl (1R,3S,4S)-3-(bis(4-methoxybenzyl)amino)-4-fluorocyclohexane-1-carboxylate (30). To a stirred suspension of XtalFluor-M (7.67 g, 31.65 mmol, 1.5 equiv) in DCM (100 mL) in a plastic container was slowly added a solution of 29 (9.0 g, 21.05 mmol, 1.0 equiv) and (HF) 3Et3N (5.09 g, 31.65 mmol, 1.5 equiv) in DCM (50 mL) under Ar. After the addition was completed, the mixture was stirred at r.t. overnight. The completion of the reaction was determined by TLC (hexane:EtOAc=2:1). The reaction was diluted with DCM (100 mL) and quenched with water (50 mL). The organic phase was separated and then washed sequentially with water (100 mL), NaHCO$_3$ (aq. 100 mL), and brine (100 mL). The organic phase was dried with anhydrous Na2SO4. The solution was concentrated and purified by silica gel chromatography (25% EtOAc in hexane) to afford a colorless oil (30, 6.81 g, 75%). 1H NMR (500 MHz, CDCl3) δ 7.30 (d, J=8.5 Hz, 4H), 6.84 (d, J=8.6 Hz, 4H), 4.62 (dtd, J=50.5, 10.3, 4.8 Hz, 1H), 4.01 (dq, J=10.8, 7.1 Hz, 1H), 3.91 (dq, J=10.8, 7.1 Hz, 1H), 3.78 (s, 6H), 3.73 (d, J=13.6 Hz, 2H), 3.65 (d, J=13.5 Hz, 2H), 2.85 (dddd, J=12.3, 9.7, 8.4, 3.9 Hz, 1H), 2.66 (dh, J=5.5, 2.8 Hz, 1H), 2.32 (ddq, J=12.8, 6.2, 3.0 Hz, 1H), 2.19-2.10 (m, 1H), 2.03 (ddq, J=12.3, 8.2, 4.1 Hz, 1H), 1.64-1.47 (m, 2H), 1.38 (tddd, J=13.7, 5.1, 3.6, 1.4 Hz, 1H), 1.08 (t, J=7.1 Hz, 3H). 13C NMR (126 MHz, CDCl3) δ 173.9, 158.6, 132.5, 129.8, 113.6, 92.5 (d, J=178.1 Hz), 60.6, 57.8 (d, J=16.1 Hz), 55.3, 53.6, 39.0 (d, J=2.0 Hz), 29.2 (d, J=18.7 Hz), 28.6 (d, J=8.4 Hz), 24.9 (d, J=11.2 Hz), 14.1. HRMS (ESI) calc'd for C25H33FNO4 (M+H+): 430.2388, found: 430.238.

Ethyl (1R,3S,4S)-3-((tert-butoxycarbonyl)amino)-4-fluorocyclohexane-1-carboxylate (31). To a solution of 30 (5.0 g, 17.46 mmol, 1.0 equiv) in MeOH (50 mL) and EtOAc (50 mL) was added Boc2O (3.81 g, 11.64 mmol, 1.0 equiv) and Pd(OH)2 (1.0 g, 20% wt) under Ar. The flask was evacuated to remove the Ar and then refilled with a H2 balloon. The mixture was stirred at r.t. overnight. The completion of the reaction was determined by LC-MS. The suspension was filtered through a Celite pad and washed with an additional 100 mL of EtOAc. The filtrate was concentrated and purified by silica gel chromatography (20% EtOAc in hexane) to afford a white solid (31, 2.73 g, 81%). 1H NMR (500 MHz, CDCl3) δ 4.55 (s, 1H), 4.47 (d, J=39.7 Hz, 1H), 4.15 (q, J=7.1 Hz, 2H), 3.89 (s, 1H), 2.49 (s, 1H), 2.23 (ddt, J=13.3, 8.5, 4.1 Hz, 1H), 2.00-1.76 (m, 3H), 1.76-1.64 (m, 2H), 1.44 (s, 10H), 1.26 (t, J=7.1 Hz, 3H). 13C NMR (126 MHz, CDCl3) δ 174.3, 155.2, 90.589.8 (d, J=173.2 Hz), 60.8, 49.3, 38.0, 29.8, 26.7 (d, J=20.2 Hz), 23.4 (d, J=5.4 Hz), 14.4. 19F NMR (564 MHz, CD3OD) δ −181.34 (d, J=50.7 Hz). HRMS (ESI) calc'd for C14H24FNNaO4 (M+Na+): 312.158, found: 312.1582.

Ethyl (4S,5S)-5-((tert-butoxycarbonyl)amino)-4-fluorocyclohex-1-ene-1-carboxylate (32b) & ethyl (3S,4S)-3-((tert-butoxycarbonyl)amino)-4-fluorocyclohex-1-ene-1-carboxylate (32a). To a stirred solution of KHMDS (1M in THF, 10.89 mL, 10.89 mmol, 2.1 equiv) was slowly added dry THE (10 mL), and a solution of 31 (1.5 g, 5.18 mmol, 1.0 equiv) in dry THE (30 mL) was added at −78° C. under Ar over 30 min. The solution was stirred at −78° C. for an additional 3 h, followed by the addition of a solution of PhSeCl (1.09 mg, 5.70 mmol, 1.1 equiv) in THE (10 mL). The solution was then slowly warmed to r.t. and stirred overnight. The reaction was quenched with the addition of sat. NH4Cl (20 mL). The solution was then diluted with EtOAc (200 mL), and the organic phase was separated. The aqueous phase was extracted with EtOAc (100 mL) twice. The combined organic layers were washed with brine (ca. 30 mL) and dried with anhydrous Na2SO4. The solution was concentrated and gave a yellow oil. To a stirred solution of obtained oil (1.55 g, 3.49 mmol, 1.0 equiv) in DCM (50 mL) was added m-CPBA (1.17 g, 5.23 mmol, 1.5 equiv). The solution was stirred at r.t. for 3 h. The completion of the reaction was determined by LC-MS. The reaction was quenched with Na2S2O3 (aq. 10 mL). The organic phase was separated, washed with saturated NaHCO3 (aq. 10 mL) and brine (10 mL), and dried with anhydrous Na2SO4. The solution was concentrated and purified by silica gel chromatography (5-10% EtOAc in hexane) and C-18 chromatography to afford a white solid (32b, 92 mg, 9%), 1H NMR (500 MHz, CDCl3) δ 6.85 (tq, J=3.5, 1.9 Hz, 1H), 4.75 (dq, J=47.5, 4.9, 4.2 Hz, 1H), 4.52 (s, 1H), 4.20 (q, J=7.1 Hz, 2H), 4.07 (s, 1H), 2.83 (d, J=17.9 Hz, 1H), 2.66 (t, J=23.7 Hz, 1H), 2.53 (t, J=19.4 Hz, 1H), 2.33 (ddq, J=18.1, 5.5, 1.9 Hz, 1H), 1.44 (s, 9H), 1.29 (t, J=7.1 Hz, 3H). 13C NMR (126 MHz, CDCl3) δ 166.1, 155.3, 134.5 (d, J=4.2 Hz), 128.0, 87.1 (d, J=176.2 Hz), 60.8, 47.7, 29.5 (d, J=22.6 Hz), 28.3, 27.6 (d, J=3.2 Hz), 14.2. HRMS (ESI) calc'd for C14H22FNNaO4 (M+Na+): 310.1425, found: 310.1416.

Another white solid (32a, 365 mg, 36%) also was obtained. 1H NMR (500 MHz, DMSO-d6) δ 7.27 (d, J=8.4 Hz, 1H), 6.46 (s, 1H), 4.60 (dddd, J=49.1, 9.3, 5.9, 3.1 Hz, 1H), 4.25 (ddq, J=14.5, 9.0, 3.4, 2.9 Hz, 1H), 4.13 (q, J=7.1 Hz, 2H), 2.38-2.20 (m, 2H), 2.05-1.94 (m, 1H), 1.88 (dp, J=14.1, 6.9 Hz, 1H), 1.40 (s, 9H), 1.22 (t, J=7.1 Hz, 3H). 13C NMR (126 MHz, DMSO-d6) δ 165.5, 155.1, 136.2, 136.2, 130.7, 90.0 (d, J=175.2 Hz), 78.4, 60.3, 50.4 (d, J=25.0 Hz), 28.1, 25.3 (d, J=19.4 Hz), 21.5 (d, J=9.5 Hz), 14.1. HRMS (ESI) calc'd for C14H22FNNaO4 (M+Na+): 310.1425, found: 310.1416.; and unseparated mixture (421 mg, 42%).

Ethyl (1R,3S)-3-((tert-butoxycarbonyl)amino)-4-oxocyclohexane-1-carboxylate (33). A suspension of 28 (16 g, 63.41 mmol) was dispensed in EtOH (100 mL) and stirred in an ice bath. A solution of NaOH (2 M, 35 mL, 69.76 mmol, 1.1 equiv) was added dropwise. The ice bath was removed after the addition, and the solution was stirred at r.t. for 4 h. The solution was concentrated below 40° C., diluted with water (100 mL), and extracted with DCM (200 mL) three times. The combined organic phase was washed with water (100 mL) and brine (100 mL) and dried with anhydrous Na2SO4. The solution was concentrated and diluted with EtOH (20 mL) and aqueous ammonia solution (28-30%, 40 mL). The solution was heated to 45° C. and stirred overnight. The completion of the reaction was determined by LC-MS. The solution was concentrated and diluted with EtOH (50 mL). The solution was concentrated, diluted with EtOH (200 mL), and stirred in an ice bath. Boc2O (13.84 g, 63.41 mmol, 1.0 equiv) was added portionwise. The solution was then warmed to r.t. and stirred for 4 h. The solution was concentrated to give crude 33. (Purification for structure determination: 1H NMR (500 MHz, CDCl3) δ 4.61 (d, J=7.0 Hz, 1H), 4.19-4.12 (m, 2H), 3.57 (s, 1H), 3.47-3.28 (m, 2H), 2.62 (p, J=4.5 Hz, 1H), 2.35-2.26 (m, 1H), 2.15-2.07 (m, 1H), 1.90-1.84 (m, 1H), 1.55-1.48 (m, 2H), 1.44 (s, 10H), 1.25 (q, J=7.0 Hz, 3H). 13C NMR (126 MHz, CDCl3) δ 174.2, 171.3, 80.2, 73.8, 60.8, 53.0, 38.9, 31.4, 30.1, 28.5, 24.8, 14.4.). HRMS (ESI) calc'd for C14H25N NaO5 (M+Na+): 310.1625, found: 310.1618.

Crude 33 was dissolved in DCM (300 mL) and stirred in an ice bath. PCC (27.34 g, 126.83 mmol, 2.0 equiv) was added portionwise. The mixture was warmed to r.t. and stirred overnight. The completion of the reaction was determined by TLC (hexane:EtOAc=2:1). The mixture was filtered through a thin pad of silica gel and eluted with DCM (50 mL) three times. The solution was concentrated and purified by silica gel chromatography (40% EtOAc in hexane) to afford a white solid (34, 10.2 g, 56%). 1H NMR (400 MHz, CDCl3) δ 5.36 (s, 1H), 4.48 (s, 1H), 4.25 (q, J=6.7 Hz, 2H), 2.99-2.91 (m, 1H), 2.87 (s, 1H), 2.70 (td, J=13.7, 5.7 Hz, 1H), 2.46 (t, J=14.1 Hz, 2H), 1.87 (tt, J=14.3, 4.8 Hz, 1H), 1.62 (td, J=12.8, 4.9 Hz, 1H), 1.43 (s, 9H), 1.32 (t, J=7.1 Hz, 3H). HRMS (ESI) calc'd for C14H23NNaO5 (M+Na+): 308.1468, found: 308.1459.

Ethyl (1R,3S)-3-((tert-butoxycarbonyl)amino)-4,4-difluorocyclohexane-1-carboxylate (35). To a stirred suspension of XtalFluor-M (2.04 g, 8.41 mmol, 2.0 equiv) in DCM (20 mL) in a plastic container was slowly added a solution of 34 (1.2 g, 4.21 mmol, 1.0 equiv) and (HF)3Et3N (1.36 g, 8.41 mmol, 2.0 equiv) in DCM (10 mL) under Ar. After the addition was completed, the mixture was stirred at r.t. overnight. The completion of reaction was determined by TLC (hexane:EtOAc=2:1). The reaction was diluted with DCM (30 mL) and quenched with water (10 mL). The organic phase was separated and then washed with water (10 mL), NaHCO3 (aq. 10 mL), and brine (10 mL). The organic phase was dried with anhydrous Na2SO4. The solution was concentrated and purified by silica gel chromatography (20% EtOAc in hexane) to afford a white solid (35, 629 mg, 48%). 1H NMR (500 MHz, CDCl3) δ 4.68 (s, 1H), 4.18 (q, J=7.1 Hz, 2H), 4.12 (s, 1H), 2.71 (s, 1H), 2.31 (d, J=12.3 Hz, 1H), 2.14-1.90 (m, 3H), 1.81-1.72 (m, 1H), 1.71-1.65 (m, 1H), 1.45 (s, 9H), 1.28 (t, J=7.1 Hz, 3H). 13C NMR (126 MHz, CDCl3) δ 13C NMR (126 MHz, CDCl3) δ 173.5, 155.2, 121.6 (dd, J=248.2, 242.0 Hz), 80.1, 61.1, 50.1 (dd, J=25.0, 21.0 Hz), 37.9, 31.5, 30.4 (t, J=23.3 Hz), 28.4, 23.8 (d, J=7.9 Hz), 14.4. HRMS (ESI) calc'd for C14H23F2NNaO4 (M+Na+): 330.q1487, found: 330.1479.

Ethyl (S)-3-((tert-butoxycarbonyl)amino)-4,4-difluorocyclohex-1-ene-1-carboxylate (36a) & ethyl (S)-5-((tert-butoxycarbonyl)amino)-4,4-difluorocyclohex-1-ene-1-carboxylate (36b). A stirred solution of KHMDS (1 M in THF, 7.16 mL, 7.16 mmol, 2.2 equiv) was diluted in dry THF (5 mL) and cooled to −78° C. under Ar; then a solution of 35 (1.0 g, 3.25 mmol, 1.0 equiv) in dry THF (10 mL) was slowly added over 30 min. The solution was stirred at −78° C. for an additional 3 h, followed by the addition of a solution of PhSeCl (685 mg, 3.58 mmol, 1.1 equiv) in THF (10 mL). The solution was then slowly warmed to r.t. and stirred overnight. The reaction was quenched with the addition of sat. NH4Cl (20 mL). The solution was then diluted with EtOAc (200 mL), and the organic phase was separated. The aqueous phase was extracted with EtOAc (100 mL) twice. The combined organic phase was washed with brine (ca. 30 mL) and dried with anhydrous Na2SO4. The solution was concentrated to give a yellow oil. To a stirred solution of the oil in DCM (20 mL) was added m-CPBA (555 mg, 2.48 mmol, 1.5 equiv). The solution was stirred at r.t. for 3 h. The completion of the reaction was determined by LC-MS. The reaction was quenched with Na2S2O3 (aq. 10 mL). The organic phase was separated, washed with saturated NaHCO$_3$ (aq. 10 mL) and brine (10 mL), and dried with anhydrous Na2SO4. The solution was concentrated and purified by silica gel chromatography (5-10% EtOAc in hexane) to afford a white solid (36a, 258 mg, 51%), 1H NMR (400 MHz, CDCl3) δ 6.59 (ddt, J=5.2, 2.6, 1.3 Hz, 1H), 4.90-4.168 (m, 2H), 4.21 (q, J=7.1 Hz, 2H), 2.70-2.57 (m, 1H), 2.57-2.43 (m, 1H), 2.28 (tdd, J=16.6, 8.6, 4.5 Hz, 1H), 2.17-1.97 (m, 1H), 1.47 (s, 9H), 1.30 (t, J=7.1 Hz, 3H). 13C NMR (126 MHz, CDCl3) δ 165.8, 155.4, 135.6, 131.9, 120.2 (dd, J=247.1, 241.3 Hz), 80.7, 61.2, 51.4 (t, J=26.8, 22.4 Hz), 29.5 (t, J=23.5 Hz), 28.4, 22.8 (dd, J=7.6, 2.9 Hz), 14.3. 19F NMR (376 MHz, CDCl3) δ −105.13 (d, J=239.4 Hz), −115.81 (d, J=239.3 Hz), HRMS (ESI) calc'd for C14H21F2NNaO4 (M+Na+): 328.1331, found: 328.1324.

Another white solid (36b, 62 mg, 12%) also was obtained. 1H NMR (500 MHz, CDCl3) δ 6.76 (s, 1H), 4.83-4.67 (m, 1H), 4.21 (q, J=7.1 Hz, 2H), 4.18-4.14 (m, 1H), 2.95 (d, J=17.5 Hz, 1H), 2.90-2.70 (m, 2H), 2.40-2.28 (m, 1H), 1.46 (s, 9H), 1.29 (t, J=7.1 Hz, 3H). 13C NMR (126 MHz, CDCl3) δ 165.6, 155.4, 132.8 (d, J=9.1 Hz), 129.0, 120.5 (dd, J=246.9, 242.0 Hz), 80.4, 61.1, 49.5 (t, J=21.5 Hz), 34.8 (t, J=28.1 Hz), 30.3 (t, J=3.6 Hz), 28.4, 14.3, HRMS (ESI) calc'd for C14H21F2NNaO4 (M+Na+): 328.1331, found: 328.1324.; and unseparated mixture of 36a and 36b (94 mg, 19%).

General deprotection procedure A. To a solution of aq. HCl (4 M, 1.5 mL) and AcOH (1.5 mL) was added the ester intermediate under Ar. The solution was sealed and heated to 80° C. and stirred overnight. The completion of the reaction was determined by LC-MS. The solution was concentrated and purified by C-18 chromatography to give the product.

(3S,4S)-3-Amino-4-fluorocyclohex-1-ene-1-carboxylic acid hydrochloride (8). 32a (150 mg, 0.522 mmol) was deprotected by procedure A to give a white solid (8, 94 mg, 92%). 1H NMR (500 MHz, CD3OD) δ 6.67 (dt, J=5.1, 2.5 Hz, 1H), 4.78 (dddd, J=50.5, 11.6, 7.8, 4.0 Hz, 1H), 4.27-4.13 (m, 1H), 2.65 (d, J=20.3 Hz, 1H), 2.50-2.39 (m, 1H), 2.33-2.23 (m, 1H), 1.98 (ddq, J=17.5, 11.9, 6.0 Hz, 1H). 13C NMR (126 MHz, CD3OD) δ 168.2, 137.2 (d, J=2.4 Hz), 130.5 (d, J=7.0 Hz), 90.9 (d, J=177.6 Hz), 53.6 (d, J=23.2 Hz), 27.3 (d, J=18.7 Hz), 24.4 (d, J=11.2 Hz). 13C NMR (126 MHz, CD3OD) δ 168.4, 136.3 (d, J=11.1 Hz), 128.4, 89.8 (d, J=177.5 Hz), 51.7 (d, J=18.1 Hz), 31.8 (d, J=21.7 Hz), 29.2 (d, J=6.1 Hz). HRMS (ESI) calc'd for C7H11FNO2 (M+H+): 160.0768, found: 160.0765.

(S)-3-Amino-4,4-difluorocyclohex-1-ene-1-carboxylic acid hydrochloride (9). 36a (105 mg, 0.34 mmol) was deprotected by procedure A to give a white solid (9, 56 mg, 76%). 1H NMR (500 MHz, CD3OD) δ 6.72 (s, 1H), 4.65-4.52 (m, 1H), 2.71 (ddd, J=18.9, 6.2, 3.0 Hz, 1H), 2.55 (dtd, J=19.0, 6.4, 3.1 Hz, 1H), 2.47-2.22 (m, 2H). 13C NMR (126 MHz, CD3OD) δ 167.9, 136.8, 129.62 (d, J=5.9 Hz), 121.05 (t, J=246.2 Hz), 52.27 (dd, J=29.1, 22.2 Hz), 29.24 (t, J=22.7 Hz), 23.76 (dd, J=7.7, 2.9 Hz). 19F NMR (376 MHz, CD3OD) δ −108.4 (dp, J=240.6, 5.8, 5.3 Hz), −114.2 (dq, J=240.7, 23.2 Hz). HRMS (ESI) calc'd for C7H10F2NO2 (M+H+): 178.0674, found: 178.0672.

(4S,5S)-5-Amino-4-fluorocyclohex-1-ene-1-carboxylic acid hydrochloride (10). 32b (80 mg, 0.278 mmol) was deprotected by procedure A to give a white solid (10, 49 mg, 90%). 1H NMR (500 MHz, CD3OD) δ 6.89 (s, 1H), 5.02-4.95 (m, 1H), 3.65 (tt, J=10.6, 6.2 Hz, 1H), 3.03 (dt, J=17.3, 5.8 Hz, 1H), 2.93 (d, J=18.5 Hz, 1H), 2.65-2.51 (m, 1H), 2.51-2.38 (m, 1H). 13C NMR (126 MHz, CD3OD) δ168.4, 136.3 (d, J=11.1 Hz), 128.4, 89.8 (d, J=177.5 Hz), 51.7 (d, J=18.1 Hz), 31.8 (d, J=21.7 Hz), 29.2 (d, J=6.1 Hz). HRMS (ESI) calc'd for C7H11FNO2 (M+H+): 160.0768, found: 160.0762.

(S)-5-Amino-4,4-difluorocyclohex-1-ene-1-carboxylic acid hydrochloride (11). 36b (30 mg, 0.10 mmol) was deprotected by procedure A to give a white solid (11, 14 mg, 66%). 1H NMR (500 MHz, CD3OD) δ 6.87 (p, J=3.9 Hz, 1H), 4.06-3.95 (m, 1H), 3.15-3.06 (m, 1H), 3.00 (dp, J=21.4, 4.1, 3.2 Hz, 2H), 2.53 (ddd, J=17.1, 10.6, 2.8 Hz, 1H). 13C NMR (126 MHz, CD3OD) δ 167.9, 134.4 (d, J=10.3 Hz), 128.3, 121.1 (dd, J=245.6, 243.5 Hz), 50.9 (t, J=22.5 Hz), 34.9 (t, J=25.6 Hz), 28.6. HRMS (ESI) calc'd for C7H10F2NO2 (M+H+): 178.0674, found: 178.0675.

Docking Simulation.

Docking models of ligands bound to GABA-AT or OAT were developed using the Molecular Operating Environment (MOE) computational suite's Builder utility.1-3 The energy minimization of ligands was conducted in the gas phase using the force field MMFF94X, followed by the Conformational Search protocol to generate structural-conformation databases. The X-ray crystal structures of native GABA-AT (PDB: 1OHV), native hOAT (1OAT), inactivated GABA-AT (4Y0I) and inactivated hOAT (1GBN) were uploaded to MOE respectively, followed by the receptor preparation. The tight-binding products in the active pocket of 5VWO and 4Y0I was deleted, and catalytic Lys was neutralized. The docking sites were specified at the catalytic Lys atoms. Ligand dockings were carried out in the prepared aminotransferase enzyme models with unrelated substrates and the solvent atoms inactivated. Ligand placement employed the Alpha Triangle method with Affinity dG scoring generating 300 data points that were further refined using the induced fit method with GBVI/WSA dG scoring to obtain the top 50 docking results. The docking results of each ligand were analyzed for selection of the best docking pose, based on the score and reported X-ray structures. All renderings were then performed in PyMOL.

Enzyme Assays.

hOAT and PYCR1 were expressed, grown, and purified according to literature procedures.4, 5 GABA-AT was isolated from pig brains and purified according to a literature procedure.6 Coupled enzyme assays for GABA-AT, hOAT, Ala-AT, and Asp-AT were carried out according to previous procedures.7, 8

Dialysis Assay.

The dialysis experiment was conducted using previous protocols.7, 9, 10

Partition Ratio Experiment.

The partition ratio was calculated using previous protocols.7, 9, 10

Fluoride Ion Release.

The fluoride ion release assay was conducted using previous protocols.7 The final concentration of hOAT in the sample was determined to be 16.9±0.04 ug/mL (monomer, 0.37±0.01 µM) via BSA assay and calculation of dilution. A calibration curve of voltage (V, mV) was generated from varying concentrations of NaF (F, µM) to get the equation: $F=10^{\wedge}((V-181.9)/-53.18)$. For accurate detection of fluoride ion concentration, 2.0 µM of fluoride ion was added to each control and sample. The number of fluoride ions released per active site was calculated by the ratio of the fluoride ion release concentration and hOAT concentration.

Intact Protein and Small Molecule Mass Spectrometry.

Recombinant and treated hOAT were desalted ten times with water on Amicon Ultra 30 kDa molecular weight spin filters (Millipore). To chromatographically resolve hOAT, 0.5 g of hOAT was loaded onto a 3 cm PLRP-S (Agilent) trap column using a Dionex Ultimate3000 liquid chromatography system (Thermo Fisher). The protein analyte was washed with a 10-min isocratic gradient of 10% Solvent B (95% MeCN/5% H2O/0.2% FA) and 90% Solvent A (5% MeCN/95% H2O/0.2% FA). hOAT was resolved on an in-house made 75 µm ID×15 cm long nanopore capillary column packed with PLRP-S resin (Agilent). The LC system was operated at a flow rate of 300 nL/min at the following gradient: 0-10 min 10% Solvent B; 10-12 min to 40% Solvent B; 12-22 min to 90% Solvent B; 22-24 min at 90% Solvent B; 24-26 min to 10% Solvent B; 26-30 min isocratic at 10% Solvent B. Positive, full-profile ESI data were acquired in the Orbitrap mass analyzers on a Fusion Lumos Tribrid mass spectrometer (Thermo Fisher) operated in low pressure, protein mode, with a [M+24H+]+24 default charge state. A custom nano-electrospray ionization source was used with a static spray voltage of 1700 V. Data were collected in a 500-2,000 m/z window, averaging 20 micro scans per scan event at a resolving power of 7,500 at (200 m/z) with a maximum injection time of 50 ms and a target value for the automatic gain control (AGC) of 5e6 charges. Averaged summed scans were manually deconvoluted to generate neutral masses. Small molecule and metabolite masses were identified and characterized by high-resolution LC-MS/MS on a Q-Exactive Orbitrap mass spectrometer as previously described.9 hOAT Crystallization

Crystal Structure Growth. The freshly prepared enzyme (200 µg) was dialyzed with 50 mM potassium pyrophosphate which contained 5 mM α-ketoglutarate at pH 8.0. Compound 8/9 (0.5 mg) was added and the enzyme was inactivated in a vial covered with foil for 12 h. The coupled enzyme assay indicated no activity. After complete inactivation of hOAT activity, the enzyme sample was concentrated in 50 mM tricine pH 7.8 to a protein concentration of 6 mg/mL. Crystallization was optimized via the hanging drop vapor diffusion method and was set by varying PEG 1000 (10-20%), NaCl (100-250 mM), glycerol (20%-30%) 50 mM tricine pH 7.8 kept constant as the buffer. For each well, a 1:1 ratio of drop of well:protein solution was set. The crystals with the best morphology and size for data collection grew in wells containing 16.5% PEG 1000, 240 mM NaCl, 25% glycerol. Crystals were transferred to a cryoprotectant solution (well solution supplemented with 30% glycerol) before being flash frozen in liquid nitrogen.

Data Collection and Processing. Monochromatic data were collected at the LS-CAT beamline 21-ID-D, Advanced Photon Source (APS) at Argonne National Laboratory (ANL). Diffraction data were collected at a wavelength of 0.98 Å at 100 K using a Dectris Eiger 9M detector. Data sets were indexed and integrated using the HKL200011 suite. Data statistics are summarized in Table 3.

TABLE 3

Statistics of the crystal structure of hOAT inactivated by 8 and 9

| Table S1: Statistics of crystal structure | hOAT-9 | hOAT-8 |
|---|---|---|
| Data Processing | | |
| Space group | P 3₁ 1 2 | C 1 2 1 |
| Cell dimension | | |
| α, β, γ (deg) | 90, 90, 120 | 90, 104, 90 |
| a, b, c (Å) | 193.8 193.8 57.2 | 202.8 112.1, 57.9 |
| Processed Resolution (Å) | 1.90 | 2.20 |
| Resolution at I/σ (I) = 2$^a$ | 1.90 | 2.20 |
| $R_{merge}^{b}$ (%) | 8.3 (36.5)$^c$ | 7.0 (19.7) |
| $R_{pim}^{d}$ (%) | 2.0 (9.9) | 4.6 (14.0) |
| I/σ (I) | 54.3 (7.7) | 15.0 (6.9) |
| CC ½$^e$ (%) | (98.9) | (99.7) |
| Completeness (%) | 83.5 (98.1) | 90.4 (52.7) |
| Multiplicity | 18.4 | 6.9 |
| No. Reflections | 1725260 | 396889 |
| No. Unique Reflections | 94007 | 57505 |
| Refinement | | |
| $R_{work}^{f}/R_{free}^{g}$ (%) | 23.45/26.70 | 15.92/19.89 |
| No. of Atoms | | |
| protein | 9475 | 9480 |
| ligand | 75 | 78 |
| water | 843 | 403 |
| B factors (Å$^2$) | | |
| protein | 24.2 | 25.6 |
| RMSD$^h$ | | |
| bond lengths (Å) | 0.007 | 0.009 |
| bond angles (deg) | 0.812 | 1.562 |
| Ramachandran plot (%) | | |
| most favored | 95.36 | 95.27 |
| allowed | 4.15 | 4.06 |
| outliers | 0.50 | 0.60 |

$^a$Provided Resolution at I/σ = 2 for conventional assessment of data quality
$^b$R$_{merge}$ = Σ|obs − Iavg|/ΣIavg
$^c$The values for the highest-resolution bin are in parentheses
$^d$Precision-indicating merging R
$^e$Pearson correlation coefficient of two "half" data sets
$^b$R$_{work}$ = Σ|Fobs − Fcalc|/ΣFobs
$^g$Five percent of the reflection data were selected at random as a test set, and only these data were used to calculate R$_{free}$
$^h$Root-mean square deviation

TABLE 4

Calculation of fluoride ion release for 8 and 9

|  | Control Trial 1 | Control Trial 2 | Control Trial 3 | Sample Trial 1 | Sample Trial 2 | Sample Trial 3 |
|---|---|---|---|---|---|---|
| Compound 8 | | | | | | |
| Test-1 (mV) | 163.6 | 163.3 | 165.8 | 127.8 | 127.8 | 127.2 |
| Test-2 (mV) | 163.5 | 163.6 | 165.7 | 127.6 | 127.6 | 127.4 |
| Test-3 (mV) | 163.8 | 163.5 | 165.5 | 127.1 | 127.4 | 127.6 |
| Ave(mV) | 163.63 | 163.47 | 165.67 | 127.5 | 127.6 | 127.4 |
| F⁻ Detected (μM) | 2.21 | 2.22 | 2.02 | 10.54 | 10.50 | 10.59 |
| F⁻ Detected Ave (μM) | Control: 2.15 ± 0.092 | | | Sample: 10.54 ± 0.037 | | |
| F⁻ Release (μM) | 8.39 | | | | | |
| Enzyme Concentration | 0.37 ± 0.01 μM (Monomer) | | | | | |
| Fluoride ions released per active site (8) | 22.7 equiv | | | | | |
| Compound 9 | | | | | | |
| Test-1 (mV) | 164.0 | 163.2 | 165.4 | 155.5 | 155 | 155.4 |
| Test-2 (mV) | 164.2 | 163.1 | 165 | 155.0 | 154.8 | 155.0 |
| Test-3 (mV) | 164.4 | 162.6 | 165.2 | 154.8 | 154.5 | 155.1 |
| Ave(mV) | 164.2 | 162.97 | 154.2 | 155.1 | 154.77 | 155.17 |
| F⁻ Detected (μM) | 2.15 | 2.27 | 2.06 | 3.19 | 3.28 | 3.18 |
| F⁻ Detected Ave (μM) | Control: 2.16 ± 0.086 | | | Sample: 3.22 ± 0.045 | | |
| F⁻ Release (μM) | 1.06 | | | | | |
| Enzyme Concentration | 0.37 ± 0.01 μM (Monomer) | | | | | |
| Fluoride ions released per active site (9) | 2.9 equiv | | | | | |

Model Building and Refinement. The hOAT structure was solved by molecular replacement using PHASEER in the Phenix software suite. 12 The first search model was based on a previously published structure of hOAT (PDB code: 1OAT). The model was rebuilt using COOT, 13 refined using Phenix, and analyzed in COOT and USCF Chimera. 14 Final refinement statistics are reported in Table 3. Structural figures were made in USCF Chimera.

Molecular Dynamics Simulation

A docking protocol was employed to generate the initial hOAT complex corresponding to 14a and 14b for the classical MD simulation. The protein structure chosen for this study was the X-ray crystal structure of inactivated hOAT (PDB ID: 1GBN) with a resolution of 2.3 Å. The protonation states of the amino acid residues were determined using the H++ server. The structures of 14a and 14b were optimized using Gausian09 software at a HF/6-31+(G) level of theory.15 The inhibitor and protein structures were further refined using AutoDockTools-1.5.6 available with the MGL-Tools software package.16 Refined inhibitor structures were docked into the OAT active site using Autodock 4.2 software. A gridbox centered on the active site was generated using Autogrid 4.2 software with a grid spacing of 0.375 Å and dimensions of 55×55×55 points along the x, y, and z axes. Lamarckian genetic algorithm (GA) was used for the conformational search with a GA population size of 150 and a maximum number of evaluations of 2 500 000. The 100 generated poses were clustered according to their rmsd values (1.5 Å cutoff), and the lowest energy conformation of the best cluster was selected for the MD simulation. The electrostatic potential energies (ESP) of the geometrically optimized inhibitors (HF/6-31+G) were calculated at the HF/6-31+G level of theory. Then these energies were used to derive the partial atomic charges of the inhibitors using the electrostatic potential square fit (ESP) method employed in the antechamber module available in the Amber12 program.17 This is the method used to derive the partial atomic charges of the original Amber forcefields. The inhibitor atoms were treated with general Amber force field (GAFF) and the automatically assigned GAFF atom types were manually adjusted to accurately represent their chemical environment before deriving the parameters. The parameters and topology files were generated using tLEaP and antechamber modules of the Amber12 program. Then these parameters and topology files were converted to GROMACS compatible format using ACPYPE.18 The forcefield parameters and the topology for covalently bound PLP were derived similarly. The modified Amberff99SB-ILDN forcefield with parameters for covalently bound PLP were used to simulate the protein. Parameters for the OAT dimer were derived using the PDB2gmx module available in the GROMACS 5.1.2 software package. All of the MD simulations were performed using GROMACS 5.1.2 software.19 The TIP3P model was used as the water model. The protein-inhibitor complex was immersed in a dodecahedron box filled with TIP3P water where the boundaries are extending at least 1.8 nm in all directions from the edges of the protein. Then, NaCl was added to the system up to a concentration of 0.15 M (physiological NaCl concentration) to neutralize the charge of the system. The solvated system was energy minimized with the steepest descent followed by the conjugate gradient method until it converged with a maximum force no greater than 500 KJ mol-1 nm-1.

The resulting energy minimized periodic system was the starting configuration for the MD simulation, which was carried out with the aid of the Extreme Science and Engineering Discovery Environment (XSEDE).20 Prior to the production MD simulation, the system was subjected to equilibration in two steps. First, it was equilibrated at constant NVT (number of particles, volume, and temperature) ensemble for 1 ns. Then the resulting system was equilibrated at constant NPT (number of particles, pressure, and temperature) ensemble for 3 ns. Temperature and pressure were controlled at 310 K and 1 bar by the V-rescale thermostat (time constant of 0.4 ps) and the Parrinello-Rahmanbarostat (time constant of 2 ps), respectively. In both equilibration steps, positions of the heavy atoms were restrained by applying a force constant of 1000 KJ mol-1 nm-2. After that, the position restraints were gradually reduced from 500 to 100 KJ mol-1 nm-2 over two runs (1 ns each). Finally, a production MD simulation of the equilibrated system was carried out under the NPT condition for 15 ns (time step of 2 fs) without positional restraints. During the NPT equilibration, the V-rescale thermostat was replaced by the most accurate Nose-Hoover thermostat and used for the rest of the simulation protocol. The long-range electrostatic interactions were treated with the particle mesh Ewald (PME) method, while Coulomb and van der Waals interactions were cut off at 1.2 nm. Bond lengths of the atoms were restrained using the Linear Constraint Solver (LINCS) algorithm.

Important distance and dihedral angle measurements were taken using distance, mindist and angle tools available in the GROMACS software package.

Electrostatic Potential (ESP) Charge Calculation

The electrostatic potential (ESP) energies and the charges of the geometrically optimized inhibitors (14a and 14b) (HF/6-31+G) in gas phase were calculated at the HF/6-31+G level of theory. Cubegen utility of the Gaussain09 program was used to generate the electron density and electrostatic potential maps and visualized using VMD 1.9.2 molecular visualization program.

REFERENCES

1. Heath, T. K.; Lutz, M. R.; Reidl, C. T.; Guzman, E. R.; Herbert, C. A.; Nocek, B. P.; Holz, R. C.; Olsen, K. W.; Ballicora, M. A.; Becker, D. P., Practical Spectrophotometric Assay for the dapE-encoded N-succinyl-L, L-diaminopimelic Acid Desuccinylase, a Potential Antibiotic Target. Plos One 2018, 13.
2. Vilar, S.; Cozza, G.; Moro, S., Medicinal Chemistry and the Molecular Operating Environment (MOE): Application of QSAR and Molecular Docking to Drug Discovery. Curr. Top. Med. Chem. 2008, 8, 1555-1572.
3. Boyd, S., Molecular operating environment. Chem. World 2005, 2, 66-66.
4. Christensen, E. M.; Patel, S. M.; Korasick, D. A.; Campbell, A. C.; Krause, K. L.; Becker, D. F.; Tanner, J. J., Resolving the Cofactor-binding Site in the Proline Biosynthetic Enzyme Human Pyrroline-5-carboxylate reductase 1. J. Biol. Chem. 2017, 292, 7233-7243.
5. Mascarenhas, R.; Le, H. V.; Clevenger, K. D.; Lehrer, H. J.; Ringe, D.; Kelleher, N. L.; Silverman, R. B.; Liu, D., Selective Targeting by a Mechanism-Based Inactivator against Pyridoxal 5'-Phosphate-Dependent Enzymes: Mechanisms of Inactivation and Alternative Turnover. Biochemistry 2017, 56, 4951-4961.
6. Churchich, J. E.; Moses, U., 4-Aminobutyrate Aminotransferase—the Presence of Nonequivalent Binding-Sites. J. Biol. Chem. 1981, 256, 1101-1104.
7. Lee, H.; Doud, E. H.; Wu, R.; Sanishvili, R.; Juncosa, J. I.; Liu, D. L.; Kelleher, N. L.; Silverman, R. B., Mechanism of Inactivation of gamma-Aminobutyric Acid Aminotransferase by (1S,3S)-3-Amino-4-difluoromethylene-1-cyclopentanoic Acid (CPP-115). J. Am. Chem. Soc. 2015, 137, 2628-2640.
8. Juncosa, J. I.; Lee, H.; Silverman, R. B., Two Continuous Coupled Assays for Ornithine-delta-aminotransferase. Anal. Biochem. 2013, 440, 145-149.
9. Moschitto, M. J.; Doubleday, P. F.; Catlin, D. S.; Kelleher, N. L.; Liu, D.; Silverman, R. B., Mechanism of Inactivation of Ornithine Aminotransferase by (1S,3S)-3-Amino-4-(hexafluoropropan-2-ylidenyl)cyclopentane-1-carboxylic Acid. J. Am. Chem. Soc. 2019, 141, 10711-10721.
10. Juncosa, J. I.; Takaya, K.; Le, H. V.; Moschitto, M. J.; Weerawarna, P. M.; Mascarenhas, R.; Liu, D. L.; Dewey, S. L.; Silverman, R. B., Design and Mechanism of (S)-3-Amino-4-(difluoromethylenyl)cyclopent-1-ene-1-carboxylic Acid, a Highly Potent gamma-Aminobutyric Acid Aminotransferase Inactivator for the Treatment of Addiction. J. Am. Chem. Soc. 2018, 140, 2151-2164.
11. Brosnan, M. E.; Brosnan, J. T., Hepatic Glutamate Metabolism: a Tale of 2 Hepatocytes. Am. J. Clin. Nutr. 2009, 90, 857S-861S.
12. Adams, P. D.; Afonine, P. V.; Bunkoczi, G.; Chen, V. B.; Davis, I. W.; Echols, N.; Headd, J. J.; Hung, L. W.; Kapral, G. J.; Grosse-Kunstleve, R. W.; McCoy, A. J.; Moriarty, N. W.; Oeffner, R.; Read, R. J.; Richardson, D. C.; Richardson, J. S.; Terwilliger, T. C.; Zwart, P. H., PHENIX: a Comprehensive Python-based System for Macromolecular Structure Solution. Acta. Crystallogr. D 2010, 66, 213-221.
13. Emsley, P.; Lohkamp, B.; Scott, W. G.; Cowtan, K., Features and Development of Coot. Acta Crystallogr. D Biol. Crystallogr. 2010, 66, 486-501.
14. Pettersen, E. F.; Goddard, T. D.; Huang, C. C.; Couch, G. S.; Greenblatt, D. M.; Meng, E. C.; Ferrin, T. E., UCSF Chimera—a Visualization System for Exploratory Research and Analysis. J. Comput. Chem. 2004, 25, 1605-1612.
15. Gaussian 09, Revision A.02, M. J. Frisch, G. W. Trucks, H. B. Schlegel, G. E. Scuseria, M. A. Robb, J. R. Cheeseman, G. Scalmani, V. Barone, G. A. Petersson, H. Nakatsuji, X. Li, M. Caricato, A. Marenich, J. Bloino, B. G. Janesko, R. Gomperts, B. Mennucci, H. P. Hratchian, J. V. Ortiz, A. F. Izmaylov, J. L. Sonnenberg, D. Williams-Young, F. Ding, F. Lipparini, F. Egidi, J. Goings, B. Peng, A. Petrone, T. Henderson, D. Ranasinghe, V. G. Zakrzewski, J. Gao, N. Rega, G. Zheng, W. Liang, M. Hada, M. Ehara, K. Toyota, R. Fukuda, J. Hasegawa, M. Ishida, T. Nakajima, Y. Honda, O. Kitao, H. Nakai, T. Vreven, K. Throssell, J. A. Montgomery, Jr., J. E. Peralta, F. Ogliaro, M. Bearpark, J. J. Heyd, E. Brothers, K. N. Kudin, V. N. Staroverov, T. Keith, R. Kobayashi, J. Normand, K. Raghavachari, A. Rendell, J. C. Burant, S. S. Iyengar, J. Tomasi, M. Cossi, J. M. Millam, M. Klene, C. Adamo, R. Cammi, J. W. Ochterski, R. L. Martin, K. Morokuma, O. Farkas, J. B. Foresman, and D. J. Fox, Gaussian, Inc., Wallingford CT, 2016.
16. Morris, G. M.; Huey, R.; Lindstrom, W.; Sanner, M. F.; Belew, R. K.; Goodsell, D. S.; Olson, A. J., AutoDock4 and AutoDockTools4: Automated Docking with Selective Receptor Flexibility. J. Comput. Chem. 2009, 30, 2785-2791.
17. Wang, J. M.; Wang, W.; Kollman, P. A.; Case, D. A., Automatic Atom Type and Bond Type Perception in Molecular Mechanical Calculations. J Mol Graph Model 2006, 25, 247-260.
18. Sousa da Silva, A. W.; Vranken, W. F., ACPYPE—AnteChamber PYthon Parser interfacE. BMC Res. Notes. 2012, 5, 367.
19. Pronk, S.; Pall, S.; Schulz, R.; Larsson, P.; Bjelkmar, P.; Apostolov, R.; Shirts, M. R.; Smith, J. C.; Kasson, P. M.; van der Spoel, D.; Hess, B.; Lindahl, E., GROMACS 4.5: a High-throughput and Highly Parallel Open Source Molecular Simulation Toolkit. Bioinformatics 2013, 29, 845-854.
20. Towns, J.; Cockerill, T.; Dahan, M.; Foster, I.; Gaither, K.; Grimshaw, A.; Hazlewood, V.; Lathrop, S.; Lifka, D.; Peterson, G. D.; Roskies, R.; Scott, J. R.; Wilkins-Diehr, N., XSEDE: Accelerating Scientific Discovery. Comput. Sci. Eng. 2014, 16, 62-74.

In accordance with this disclosure, various other compounds, varied structurally, stereochemically and/or con-

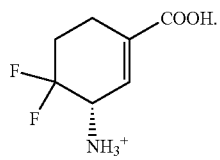

24. The method of claim 16, wherein the compound is of a formula:
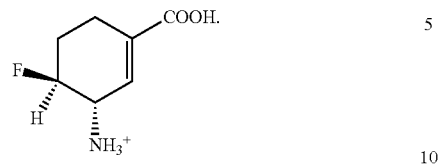

We claim:

1. A compound of the following formula or a dissociated form, a non-protonated form, a zwitterion form, or a salt thereof:

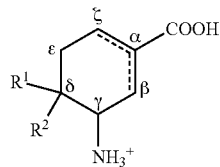

wherein a double bond is present between the α and ζ carbons or between the α and β carbons, and wherein each of $R^1$ and $R^2$ is independently selected from H or a leaving group, providing at least one of $R^1$ and $R^2$ is not H.

2. The compound of claim 1 in zwitterion form comprising an ammonium moiety and a carboxylate moiety.

3. The compound of claim 1, wherein the double bond is between the α and ζ carbons.

4. The compound of claim 1, wherein the double bond is between the α and β carbons.

5. The compound of claim 1, wherein at least one of $R^1$ and $R^2$ is F.

6. The compound of claim 5, wherein the compound is a salt comprising a substituent selected from an ammonium substituent, a carboxylate substituent, and a combination thereof.

7. The compound of claim 6, wherein the ammonium salt has a counter ion that is the conjugate base of a protic acid.

8. The compound of claim 1 in a pharmaceutical composition comprising a pharmaceutically-acceptable carrier component.

9. The compound of claim 1 of a formula:

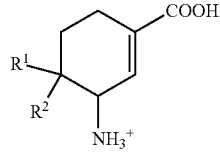

wherein each of $R^1$ and $R^2$ is independently selected from H and F, provided at least one of $R^1$ and $R^2$ is F.

10. The compound of claim 9, wherein each of $R^1$ and $R^2$ is F.

11. The compound of claim 1 of a formula:

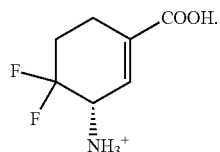

12. The compound of claim 1 of a formula:

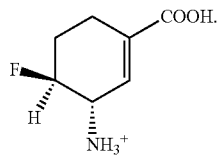 [SMILES: [NH3+][C@H]1C=C(C(=O)O)CC[C@@H]1F]

13. A pharmaceutical composition comprising: (i) the compound of claim 1; and (ii) a pharmaceutically suitable carrier, diluent, or excipient.

14. A method of modulating ornithine aminotransferase (OAT) activity, the method comprising contacting the compound of claim 1 with a medium comprising OAT, wherein the compound is present in an amount sufficient to modulate OAT activity.

15. The method of claim 14, wherein the contact is in vivo.

16. A method of reducing activity of an OAT expressed by a human cancer, the method comprising contacting the compound of claim 1 with the cancer expressing an OAT, wherein the compound is present in an amount that is effective to reduce OAT activity.

17. A method for treating cancer in a subject in need thereof, the method comprising administering to the subject a therapeutically effective amount of the compound of claim 1.

18. The method of claim 17, wherein the cancer is characterized by expression or overexpression of ornithine aminotransferase (OAT).

19. The method of claim 17, wherein the cancer is hepatocellular carcinoma (HCC).

20. The method of claim 17, wherein the cancer is non-small cell lung cancer (NSCLC).

21. The method of claim 16, wherein the compound is of formula

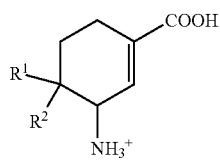

wherein each of $R^1$ and $R^2$ is independently selected from H and F, provided at least one of $R^1$ and $R^2$ is F.

22. The method of claim 21, wherein each of $R^1$ and $R^2$ is F.

23. The method of claim 16, wherein the compound is of formula: